United States Patent
Ikarashi

(10) Patent No.: US 11,675,847 B2
(45) Date of Patent: Jun. 13, 2023

(54) RETRIEVAL DEVICE, RETRIEVAL METHOD, PROGRAM, AND RECORDING MEDIUM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 78 days.

(21) Appl. No.: 16/954,247

(22) PCT Filed: Dec. 10, 2018

(86) PCT No.: PCT/JP2018/045254
§ 371 (c)(1),
(2) Date: Jun. 16, 2020

(87) PCT Pub. No.: WO2019/124134
PCT Pub. Date: Jun. 27, 2019

(65) Prior Publication Data
US 2021/0011953 A1    Jan. 14, 2021

(30) Foreign Application Priority Data
Dec. 19, 2017    (JP) .............................. JP2017-242830

(51) Int. Cl.
*G06F 16/903* (2019.01)
*H04L 9/00* (2022.01)

(52) U.S. Cl.
CPC ........ *G06F 16/90335* (2019.01); *H04L 9/008* (2013.01)

(58) Field of Classification Search
None
See application file for complete search history.

(56) References Cited

U.S. PATENT DOCUMENTS 9,613,292 B1 *   4/2017   El Defrawy ............ H04L 67/10
2004/0243816 A1 * 12/2004 Hacigumus ....... G06F 16/24561
                                                         713/193
(Continued)

OTHER PUBLICATIONS

International Search Report dated Mar. 5, 2019 in PCT/JP2018/045254 filed Dec. 10, 2018.
(Continued)

*Primary Examiner* — Augustine K. Obisesan
(74) *Attorney, Agent, or Firm* — Oblon, McClelland, Maier & Neustadt, L.L.P.

(57) ABSTRACT

An equality determination unit obtains $[e_i]$ in which $e_i=(e_{i,1}, \ldots, e_{i,N})$ is concealed, $e_i$ in which $e_{i,j}=a_1$ is established when $x_{i,j}$ is $k_j$ and $e_{i,j}=a_0$ is established when $x_{i,j}$ is not $k_j$, by secure computation using a concealed search target word $[x_i]$ and a concealed search word $[k]$. A wildcard determination unit obtains $[w]$ in which $w=(w_1, \ldots, w_N)$ is concealed, $w$ in which $w_j=b_1$ is established when $k_j$ is a wildcard character and $w_j=b_0$ is established when $k_j$ is not a wildcard character, by secure computation using $[k]$. An OR operation unit obtains $[y_i]$ in which $y_i=(y_{i,1}, \ldots, y_{i,N})$ is concealed, $y_i$ in which $y_{i,j}=d_1$ is established when at least one of $e_{i,j}=a_1$ and $w_j=b_1$ is satisfied and $y_{i,j}=d_0$ is established when at least one of $e_{i,j}=a_1$ and $w_j=b_1$ is not satisfied, by secure computation using $[e_i]$ and $[w]$.

24 Claims, 28 Drawing Sheets

(56) References Cited

U.S. PATENT DOCUMENTS

| | | | | |
|---|---|---|---|---|
| 2009/0138698 A1* | 5/2009 | Chang | ................. | G06F 21/6218 |
| | | | | 713/150 |
| 2013/0238646 A1* | 9/2013 | Maro | ................. | G06F 21/6227 |
| | | | | 707/E17.135 |
| 2014/0280342 A1* | 9/2014 | Litherland | ............ | G06F 21/602 |
| | | | | 707/780 |
| 2015/0371062 A1* | 12/2015 | Ito | ........................... | G06F 21/72 |
| | | | | 713/164 |
| 2017/0026350 A1* | 1/2017 | Dawoud | ............... | H04L 63/067 |
| 2017/0078251 A1* | 3/2017 | Grubbs | ................. | G06F 16/951 |
| 2018/0039792 A1* | 2/2018 | Ohara | ..................... | G06F 16/00 |

OTHER PUBLICATIONS

Hamada et al., "A Round-Efficient Pattern Matching Algorithm for Secure Multi-Party Computation", Computer Security Symposium (CSS), 2014, pp. 674-681 (with English Abstract).

Damgard et al., "Unconditionally Secure Constant-Rounds Multi-Party Computation for Equality, Comparison, Bits and Exponentiation", TCC 2006, pp. 285-304, 20 total pages.

Chida et al., "A Three-Party Secure Function Evaluation with Lightweight Verifiability Revisited ", In CSS, 2010, 6 total pages (with English Abstract.

Nishide et al., "Multiparty Computation for Interval, Equality, and Comparison without Bit-Decomposition Protocol", PKC, 2007, pp. 343-360, 19 total pages (1-19).

\* cited by examiner

FIG. 4

| | $k_1$ | $k_2$ | ... | $k_{r-1}$ | $k_r$ | $k_{r+1}$ | ... | $k_n$ |
|---|---|---|---|---|---|---|---|---|
| k | $k_1$ | $k_2$ | ... | $k_{r-1}$ | * | $k_{r+1}$ | ... | $k_n$ |

| | $x_{2,1}$ | $x_{2,2}$ | ... | $x_{2,r-1}$ | $x_{2,r}$ | $x_{2,r+1}$ | ... | $x_{2,n}$ |
|---|---|---|---|---|---|---|---|---|
| $x_2$ | $x_{2,1}$ | $x_{2,2}$ | ... | $x_{2,r-1}$ | $x_{2,r}$ | $x_{2,r+1}$ | ... | $x_{2,n}$ |

| | $e_{2,1}$ | $e_{2,2}$ | ... | $e_{2,r-1}$ | $e_{2,r}$ | $e_{2,r+1}$ | ... | $e_{2,n}$ |
|---|---|---|---|---|---|---|---|---|
| $e_2$ | 0 | 1 | ... | 1 | 0 | 1 | ... | 1 |

| | $w_1$ | $w_2$ | ... | $w_{r-1}$ | $w_r$ | $w_{r+1}$ | ... | $w_n$ |
|---|---|---|---|---|---|---|---|---|
| w | 0 | 0 | ... | 0 | 1 | 0 | ... | 0 |

| | $y_{2,1}$ | $y_{2,2}$ | ... | $y_{2,r-1}$ | $y_{2,r}$ | $y_{2,r+1}$ | ... | $y_{2,n}$ |
|---|---|---|---|---|---|---|---|---|
| $y_2=(e_2 \vee w)$ | 0 | 1 | ... | 1 | 1 | 1 | ... | 1 |

|   | $k_1$ | $k_2$ |     | $k_r$ |     | $k_n$ | $k_{n+1}$ | $k_{n+2}$ | ... | $k_N$ |
|---|-------|-------|-----|-------|-----|-------|-----------|-----------|-----|-------|
| k | $k_1$ | $k_2$ | ... | *     | ... | $k_n$ | null      | null      | ... | null  |

|       | $x_{i,1}$ | $x_{i,2}$ | ... | $x_{i,r}$ |     |           | $x_{i,n}$   | $x_{i,n+1}$ | $x_{i,n+2}$ | ... | $x_{i,N}$ |
|-------|-----------|-----------|-----|-----------|-----|-----------|-------------|-------------|-------------|-----|-----------|
| $x_1$ | $x_{1,1}$ | $x_{1,2}$ | ... | $x_{1,r}$ | ... |           | $x_{1,n}$   | null        | null        | ... | null      |
| $x_2$ | $x_{2,1}$ | $x_{2,2}$ | ... | $x_{2,r}$ | ... |           | $x_{2,n}$   | $x_{2,n+1}$ | null        | ... | null      |
| $x_3$ | $x_{3,1}$ | $x_{3,2}$ | ... | $x_{3,r}$ | ... | $x_{3,n-1}$ | null      | null        | null        | ... | null      |
| ⋮     |           |           |     |           | ⋮   |           |             |             |             |     |           |
| $x_m$ | $x_{m,1}$ | $x_{m,2}$ | ... | $x_{m,r}$ | ... |           | $x_{m,n}$   | null        | null        | ... | null      |

DB

| | $k_1$ | $k_2$ | ... | $k_r$ | ... | $k_n$ | $k_{n+1}$ | $k_{n+2}$ | ... | $k_N$ |
|---|---|---|---|---|---|---|---|---|---|---|
| k | $k_1$ | $k_2$ | ... | * | ... | $k_n$ | null | null | ... | null |

| | $x_{1,1}$ | $x_{1,2}$ | ... | $x_{1,r}$ | ... | $x_{1,n}$ | $x_{1,n+1}$ | $x_{1,n+2}$ | ... | $x_{1,N}$ |
|---|---|---|---|---|---|---|---|---|---|---|
| $x_1$ | $x_{1,1}$ | $x_{1,2}$ | ... | $x_{1,r}$ | ... | $x_{1,n}$ | null | null | ... | null |

| | $e_{1,1}$ | $e_{1,2}$ | ... | $e_{1,r}$ | ... | $e_{1,n}$ | $e_{1,n+1}$ | $e_{1,n+2}$ | ... | $e_{1,N}$ |
|---|---|---|---|---|---|---|---|---|---|---|
| $e_1$ | 1 | 1 | ... | 0 | ... | 1 | 1 | 1 | ... | 1 |

| | $w_1$ | $w_2$ | ... | $w_r$ | ... | $w_n$ | $w_{n+1}$ | $w_{n+2}$ | ... | $w_N$ |
|---|---|---|---|---|---|---|---|---|---|---|
| w | 0 | 0 | ... | 1 | ... | 0 | 0 | 0 | ... | 0 |

| | $y_{1,1}$ | $y_{1,2}$ | ... | $y_{1,r}$ | ... | $y_{1,n}$ | $y_{1,n+1}$ | $y_{1,n+2}$ | ... | $y_{1,N}$ |
|---|---|---|---|---|---|---|---|---|---|---|
| $y_1=(e_1 \vee w)$ | 1 | 1 | ... | 1 | ... | 1 | 1 | 1 | ... | 1 |

FIG. 7

| | $k_1$ | $k_2$ | ... | $k_r$ | ... | $k_n$ | $k_{n+1}$ | $k_{n+2}$ | ... | $k_N$ |
|---|---|---|---|---|---|---|---|---|---|---|
| k | $k_1$ | $k_2$ | ... | * | ... | $k_n$ | null | null | ... | null |

| | $x_{2,1}$ | $x_{2,2}$ | ... | $x_{2,r}$ | ... | $x_{2,n}$ | $x_{2,n+1}$ | $x_{2,n+2}$ | ... | $x_{2,N}$ |
|---|---|---|---|---|---|---|---|---|---|---|
| $x_2$ | $x_{2,1}$ | $x_{2,2}$ | ... | $x_{2,r}$ | ... | $x_{2,n}$ | $x_{2,n+1}$ | null | ... | null |

| | $e_{2,1}$ | $e_{2,2}$ | ... | $e_{2,r}$ | ... | $e_{2,n}$ | $e_{2,n+1}$ | $e_{2,n+2}$ | ... | $e_{2,N}$ |
|---|---|---|---|---|---|---|---|---|---|---|
| $e_2$ | 1 | 1 | ... | 0 | ... | 1 | 0 | 1 | ... | 1 |

| | $w_1$ | $w_2$ | ... | $w_r$ | ... | $w_n$ | $w_{n+1}$ | $w_{n+2}$ | ... | $w_N$ |
|---|---|---|---|---|---|---|---|---|---|---|
| w | 0 | 0 | ... | 1 | ... | 0 | 0 | 0 | ... | 0 |

| | $y_{2,1}$ | $y_{2,2}$ | ... | $y_{2,r}$ | ... | $y_{2,n}$ | $y_{2,n+1}$ | $y_{2,n+2}$ | ... | $y_{2,N}$ |
|---|---|---|---|---|---|---|---|---|---|---|
| $y_2 = (e_2 \vee w)$ | 1 | 1 | ... | 1 | ... | 1 | 0 | 1 | ... | 1 |

FIG. 8

|  | $k_1$ | $k_2$ | ... | $k_r$ | ... | $k_n$ | $k_{n+1}$ | $k_{n+2}$ | ... | $k_N$ |
|---|---|---|---|---|---|---|---|---|---|---|
| k | $k_1$ | $k_2$ | ... | * | ... | $k_n$ | null | null | ... | null |

|  | $x_{3,1}$ | $x_{3,2}$ | ... | $x_{3,r}$ | ... | $x_{3,n-1}$ | $x_{3,n}$ | $x_{3,n+1}$ | $x_{3,n+2}$ | ... | $x_{3,N}$ |
|---|---|---|---|---|---|---|---|---|---|---|---|
| $x_3$ | $x_{3,1}$ | $x_{3,2}$ | ... | $x_{3,r}$ | ... | $x_{3,n-1}$ | null | null | null | ... | null |

|  | $e_{3,1}$ | $e_{3,2}$ | ... | $e_{3,r}$ | ... | $e_{3,n}$ | $e_{3,n+1}$ | $e_{3,n+2}$ | ... | $e_{3,N}$ |
|---|---|---|---|---|---|---|---|---|---|---|
| $e_3$ | 1 | 1 | ... | 0 | ... | 0 | 1 | 1 | ... | 1 |

|  | $w_1$ | $w_2$ | ... | $w_r$ | ... | $w_n$ | $w_{n+1}$ | $w_{n+2}$ | ... | $w_N$ |
|---|---|---|---|---|---|---|---|---|---|---|
| w | 0 | 0 | ... | 1 | ... | 0 | 0 | 0 | ... | 0 |

|  | $y_{3,1}$ | $y_{3,2}$ | ... | $y_{3,r}$ | ... | $y_{3,n}$ | $y_{3,n+1}$ | $y_{3,n+2}$ | ... | $y_{3,N}$ |
|---|---|---|---|---|---|---|---|---|---|---|
| $y_3=(e_3 \vee w)$ | 1 | 1 | ... | 1 | ... | 0 | 1 | 1 | ... | 1 |

FIG. 9

|   | $k_1$ | $k_2$ | ... | $k_{n-1}$ | $k_n$ | $k_{n+1}$ | $k_{n+2}$ | ... | $k_N$ |
|---|---|---|---|---|---|---|---|---|---|
| k | $k_1$ | $k_2$ | ... | $k_{n-1}$ | * | null | null | ... | null |

|   | $x_{i,1}$ | $x_{i,2}$ | ... | $x_{i,r}$ | ... | $x_{i,n}$ | $x_{i,n+1}$ | $x_{i,n+2}$ | ... | $x_{i,N}$ |
|---|---|---|---|---|---|---|---|---|---|---|
| $x_1$ | $x_{1,1}$ | $x_{1,2}$ | ... | $x_{1,r}$ | ... | $x_{1,n}$ | null | null | ... | null |
| $x_2$ | $x_{2,1}$ | $x_{2,2}$ | ... | $x_{2,r}$ | ... | $x_{2,n}$ | $x_{2,n+1}$ | null | ... | null |
| $x_3$ | $x_{3,1}$ | $x_{3,2}$ | ... | $x_{3,r}$ | ... | $x_{3,n-1}$ | null | null | ... | null |
| ⋮ | | | | | ⋮ | | | | | |
| $x_m$ | $x_{m,1}$ | $x_{m,2}$ | ... | $x_{m,r}$ | ... | $x_{m,n}$ | null | null | ... | null |

FIG. 11

| | $k_1$ | $k_2$ | ... | $k_{n-1}$ | $k_n$ | $k_{n+1}$ | $k_{n+2}$ | ... | $k_N$ |
|---|---|---|---|---|---|---|---|---|---|
| k | $k_1$ | $k_2$ | ... | $k_{n-1}$ | * | null | null | ... | null |

| | $x_{1,1}$ | $x_{1,2}$ | ... | $x_{1,n-1}$ | $x_{1,n}$ | $x_{1,n+1}$ | $x_{1,n+2}$ | ... | $x_{1,N}$ |
|---|---|---|---|---|---|---|---|---|---|
| $x_1$ | $x_{1,1}$ | $x_{1,2}$ | ... | $x_{1,n-1}$ | $x_{1,n}$ | null | null | ... | null |

| | $e_{1,1}$ | $e_{1,2}$ | ... | $e_{1,n-1}$ | $e_{1,n}$ | $e_{1,n+1}$ | $e_{1,n+2}$ | ... | $e_{1,N}$ |
|---|---|---|---|---|---|---|---|---|---|
| $e_1$ | 1 | 1 | ... | 1 | 0 | 1 | 1 | ... | 1 |

| | $w_1$ | $w_2$ | ... | $w_{n-1}$ | $w_n$ | $w_{n+1}$ | $w_{n+2}$ | ... | $w_N$ |
|---|---|---|---|---|---|---|---|---|---|
| w | 0 | 0 | ... | 0 | 1 | 0 | 0 | ... | 0 |

| | $\mu_{1,1}$ | $\mu_{1,2}$ | ... | $\mu_{1,n-1}$ | $\mu_{1,n}$ | $\mu_{1,n+1}$ | $\mu_{1,n+2}$ | ... | $\mu_{1,N}$ |
|---|---|---|---|---|---|---|---|---|---|
| $\mu_1$ | 1 | 1 | ... | 1 | 1 | 0 | 0 | ... | 0 |

| | $v_{1,1}$ | $v_{1,2}$ | ... | $v_{1,n-1}$ | $v_{1,n}$ | $v_{1,n+1}$ | $v_{1,n+2}$ | ... | $v_{1,N}$ |
|---|---|---|---|---|---|---|---|---|---|
| $v_1 = (w \wedge \mu_1)$ | 0 | 0 | ... | 0 | 1 | 0 | 0 | ... | 0 |

| | $y_{1,1}$ | $y_{1,2}$ | ... | $y_{1,n-1}$ | $y_{1,n}$ | $y_{1,n+1}$ | $y_{1,n+2}$ | ... | $y_{1,N}$ |
|---|---|---|---|---|---|---|---|---|---|
| $y_1 = (e_1 \vee v_1)$ | 1 | 1 | ... | 1 | 1 | 1 | 1 | ... | 1 |

FIG. 12

| | $k_1$ | $k_2$ | ... | $k_{n-1}$ | $k_n$ | $k_{n+1}$ | $k_{n+2}$ | ... | $k_N$ |
|---|---|---|---|---|---|---|---|---|---|
| k | $k_1$ | $k_2$ | ... | $k_{n-1}$ | * | null | null | ... | null |

| | $x_{3,1}$ | $x_{3,2}$ | ... | $x_{3,n-1}$ | $x_{3,n}$ | $x_{3,n+1}$ | $x_{3,n+2}$ | ... | $x_{3,N}$ |
|---|---|---|---|---|---|---|---|---|---|
| $x_3$ | $x_{3,1}$ | $x_{3,2}$ | ... | $x_{3,n-1}$ | null | null | null | ... | null |

| | $e_{3,1}$ | $e_{3,2}$ | ... | $e_{3,n-1}$ | $e_{3,n}$ | $e_{3,n+1}$ | $e_{3,n+2}$ | ... | $e_{3,N}$ |
|---|---|---|---|---|---|---|---|---|---|
| $e_3$ | 1 | 1 | ... | 1 | 0 | 1 | 1 | ... | 1 |

| | $w_1$ | $w_2$ | ... | $w_{n-1}$ | $w_n$ | $w_{n+1}$ | $w_{n+2}$ | ... | $w_N$ |
|---|---|---|---|---|---|---|---|---|---|
| w | 0 | 0 | ... | 0 | 1 | 0 | 0 | ... | 0 |

| | $\mu_{3,1}$ | $\mu_{3,2}$ | ... | $\mu_{3,n-1}$ | $\mu_{3,n}$ | $\mu_{3,n+1}$ | $\mu_{3,n+2}$ | ... | $\mu_{3,N}$ |
|---|---|---|---|---|---|---|---|---|---|
| $\mu_3$ | 1 | 1 | ... | 1 | 0 | 0 | 0 | ... | 0 |

| | $v_{3,1}$ | $v_{3,2}$ | ... | $v_{3,n-1}$ | $v_{3,n}$ | $v_{3,n+1}$ | $v_{3,n+2}$ | ... | $v_{3,N}$ |
|---|---|---|---|---|---|---|---|---|---|
| $v_3=(w \wedge \mu_3)$ | 0 | 0 | ... | 0 | 0 | 0 | 0 | ... | 0 |

| | $y_{3,1}$ | $y_{3,2}$ | ... | $y_{3,n-1}$ | $y_{3,n}$ | $y_{3,n+1}$ | $y_{3,n+2}$ | ... | $y_{3,N}$ |
|---|---|---|---|---|---|---|---|---|---|
| $y_3=(e_3 \vee v_3)$ | 1 | 1 | ... | 1 | 0 | 1 | 1 | ... | 1 |

FIG. 13

| | $k_1$ | $k_2$ | ... | $k_r$ | ... | $k_n$ | $k_{n+1}$ | $k_{n+2}$ | ... | $k_N$ |
|---|---|---|---|---|---|---|---|---|---|---|
| $k$ | $k_1$ | $k_2$ | ... | * | ... | $k_n$ | null | null | ... | null |

| | $x_{2,1}$ | $x_{2,2}$ | ... | $x_{2,r}$ | ... | $x_{2,n}$ | $x_{2,n+1}$ | $x_{2,n+2}$ | ... | $x_{2,N}$ |
|---|---|---|---|---|---|---|---|---|---|---|
| $x_2$ | $x_{2,1}$ | $x_{2,2}$ | ... | $x_{2,r}$ | ... | $x_{2,n}$ | $x_{2,n+1}$ | null | ... | null |

| | $e_{2,1}$ | $e_{2,2}$ | ... | $e_{2,r}$ | ... | $e_{2,n}$ | $e_{2,n+1}$ | $e_{2,n+2}$ | ... | $e_{2,N}$ |
|---|---|---|---|---|---|---|---|---|---|---|
| $e_2$ | 1 | 1 | ... | 0 | ... | 1 | 0 | 1 | ... | 1 |

| | $w_1$ | $w_2$ | ... | $w_r$ | ... | $w_n$ | $w_{n+1}$ | $w_{n+2}$ | ... | $w_N$ |
|---|---|---|---|---|---|---|---|---|---|---|
| $w$ | 0 | 0 | ... | 1 | ... | 0 | 0 | 0 | ... | 0 |

| | $u_1$ | $u_2$ | ... | $u_r$ | ... | $u_n$ | $u_{n+1}$ | $u_{n+2}$ | ... | $u_N$ |
|---|---|---|---|---|---|---|---|---|---|---|
| $u$ | 0 | 0 | ... | 0 | ... | 0 | 1 | 1 | ... | 1 |

| | $y_{2,1}$ | $y_{2,2}$ | ... | $y_{2,r}$ | ... | $y_{2,n}$ | $y_{2,n+1}$ | $y_{2,n+2}$ | ... | $y_{2,N}$ |
|---|---|---|---|---|---|---|---|---|---|---|
| $y_2 = (e_2 \vee w \vee u)$ | 1 | 1 | ... | 1 | ... | 1 | 1 | 1 | ... | 1 |

FIG. 15

|   | $k_1$ | $k_2$ | ... | $k_r$ | ... |  | $k_n$ | $k_{n+1}$ | $k_{n+2}$ | ... | $k_N$ |
|---|---|---|---|---|---|---|---|---|---|---|---|
| k | $k_1$ | $k_2$ | ... | * | ... |  | $k_n$ | null | null | ... | null |

|   | $x_{3,1}$ | $x_{3,2}$ | ... | $x_{3,r}$ | ... | $x_{3,n-1}$ | $x_{3,n}$ | $x_{3,n+1}$ | $x_{3,n+2}$ | ... | $x_{3,N}$ |
|---|---|---|---|---|---|---|---|---|---|---|---|
| $x_3$ | $x_{3,1}$ | $x_{3,2}$ | ... | $x_{3,r}$ | ... | $x_{3,n-1}$ | null | null | null | ... | null |

|   | $e_{3,1}$ | $e_{3,2}$ | ... | $e_{3,r}$ | ... |  | $e_{3,n}$ | $e_{3,n+1}$ | $e_{3,n+2}$ | ... | $e_{3,N}$ |
|---|---|---|---|---|---|---|---|---|---|---|---|
| $e_3$ | 1 | 1 | ... | 0 | ... |  | 0 | 1 | 1 | ... | 1 |

|   | $w_1$ | $w_2$ | ... | $w_r$ | ... |  | $w_n$ | $w_{n+1}$ | $w_{n+2}$ | ... | $w_N$ |
|---|---|---|---|---|---|---|---|---|---|---|---|
| w | 0 | 0 | ... | 1 | ... |  | 0 | 0 | 0 | ... | 0 |

|   | $u_1$ | $u_2$ | ... | $u_r$ | ... |  | $u_n$ | $u_{n+1}$ | $u_{n+2}$ | ... | $u_N$ |
|---|---|---|---|---|---|---|---|---|---|---|---|
| u | 0 | 0 | ... | 0 | ... |  | 0 | 1 | 1 | ... | 1 |

|   | $y_{3,1}$ | $y_{3,2}$ | ... | $y_{3,r}$ | ... |  | $y_{3,n}$ | $y_{3,n+1}$ | $y_{3,n+2}$ | ... | $y_{3,N}$ |
|---|---|---|---|---|---|---|---|---|---|---|---|
| $y_3 = (e_3 \vee w \vee u)$ | 1 | 1 | ... | 1 | ... |  | 0 | 1 | 1 | ... | 1 |

FIG. 16

| | $k_1$ | $k_2$ | ... | $k_{n-1}$ | $k_n$ | $k_{n+1}$ | $k_{n+2}$ | ... | $k_N$ |
|---|---|---|---|---|---|---|---|---|---|
| k | $k_1$ | $k_2$ | ... | $k_{n-1}$ | * | null | null | ... | null |

| | $x_{1,1}$ | $x_{1,2}$ | ... | $x_{1,n-1}$ | $x_{1,n}$ | $x_{1,n+1}$ | $x_{1,n+2}$ | ... | $x_{1,N}$ |
|---|---|---|---|---|---|---|---|---|---|
| $x_1$ | $x_{1,1}$ | $x_{1,2}$ | ... | $x_{1,n-1}$ | $x_{1,n}$ | null | null | ... | null |

| | $e_{1,1}$ | $e_{1,2}$ | ... | $e_{1,n-1}$ | $e_{1,n}$ | $e_{1,n+1}$ | $e_{1,n+2}$ | ... | $e_{1,N}$ |
|---|---|---|---|---|---|---|---|---|---|
| $e_1$ | 1 | 1 | ... | 1 | 0 | 1 | 1 | ... | 1 |

| | $w_1$ | $w_2$ | ... | $w_{n-1}$ | $w_n$ | $w_{n+1}$ | $w_{n+2}$ | ... | $w_N$ |
|---|---|---|---|---|---|---|---|---|---|
| w | 0 | 0 | ... | 0 | 1 | 0 | 0 | ... | 0 |

| | $u_1$ | $u_2$ | ... | | $u_n$ | $u_{n+1}$ | $u_{n+2}$ | ... | $u_N$ |
|---|---|---|---|---|---|---|---|---|---|
| u | 0 | 0 | ... | | 0 | 1 | 1 | ... | 1 |

| | $\mu_{1,1}$ | $\mu_{1,2}$ | ... | $\mu_{1,n-1}$ | $\mu_{1,n}$ | $\mu_{1,n+1}$ | $\mu_{1,n+2}$ | ... | $\mu_{1,N}$ |
|---|---|---|---|---|---|---|---|---|---|
| $\mu_1$ | 1 | 1 | ... | 1 | 1 | 0 | 0 | ... | 0 |

| | $v_{1,1}$ | $v_{1,2}$ | ... | $v_{1,n-1}$ | $v_{1,n}$ | $v_{1,n+1}$ | $v_{1,n+2}$ | ... | $v_{1,N}$ |
|---|---|---|---|---|---|---|---|---|---|
| $v_1 = (w \wedge \mu_1)$ | 0 | 0 | ... | 0 | 1 | 0 | 0 | ... | 0 |

| | $y_{1,1}$ | $y_{1,2}$ | ... | $y_{1,n-1}$ | $y_{1,n}$ | $y_{1,n+1}$ | $y_{1,n+2}$ | ... | $y_{1,N}$ |
|---|---|---|---|---|---|---|---|---|---|
| $y_1 = (e_1 \vee v_1 \vee u)$ | 1 | 1 | ... | 1 | 1 | 1 | 1 | ... | 1 |

FIG. 18

| | $k_1$ | $k_2$ | ... | $k_{n-1}$ | $k_n$ | $k_{n+1}$ | $k_{n+2}$ | ... | $k_N$ |
|---|---|---|---|---|---|---|---|---|---|
| k | $k_1$ | $k_2$ | ... | $k_{n-1}$ | * | null | null | ... | null |

| | $x_{3,1}$ | $x_{3,2}$ | ... | $x_{3,n-1}$ | $x_{3,n}$ | $x_{3,n+1}$ | $x_{3,n+2}$ | ... | $x_{3,N}$ |
|---|---|---|---|---|---|---|---|---|---|
| $x_3$ | $x_{3,1}$ | $x_{3,2}$ | ... | $x_{3,n-1}$ | null | null | null | ... | null |

| | $e_{1,1}$ | $e_{1,2}$ | ... | $e_{1,n-1}$ | $e_{1,n}$ | $e_{1,n+1}$ | $e_{1,n+2}$ | ... | $e_{1,N}$ |
|---|---|---|---|---|---|---|---|---|---|
| $e_3$ | 1 | 1 | ... | 1 | 0 | 1 | 1 | ... | 1 |

| | $w_1$ | $w_2$ | ... | $w_{n-1}$ | $w_n$ | $w_{n+1}$ | $w_{n+2}$ | ... | $w_N$ |
|---|---|---|---|---|---|---|---|---|---|
| w | 0 | 0 | ... | 0 | 1 | 0 | 0 | ... | 0 |

| | $u_1$ | $u_2$ | ... | $u_{n-1}$ | $u_n$ | $u_{n+1}$ | $u_{n+2}$ | ... | $u_N$ |
|---|---|---|---|---|---|---|---|---|---|
| u | 0 | 0 | ... | 0 | 0 | 1 | 1 | ... | 1 |

| | $\mu_{3,1}$ | $\mu_{3,2}$ | ... | $\mu_{3,n-1}$ | $\mu_{3,n}$ | $\mu_{3,n+1}$ | $\mu_{3,n+2}$ | ... | $\mu_{3,N}$ |
|---|---|---|---|---|---|---|---|---|---|
| $\mu_3$ | 1 | 1 | ... | 1 | 0 | 0 | 0 | ... | 0 |

| | $v_{3,1}$ | $v_{3,2}$ | ... | $v_{3,n-1}$ | $v_{3,n}$ | $v_{3,n+1}$ | $v_{3,n+2}$ | ... | $v_{3,N}$ |
|---|---|---|---|---|---|---|---|---|---|
| $v_3=(w \wedge \mu_3)$ | 0 | 0 | ... | 0 | 0 | 0 | 0 | ... | 0 |

| | $y_{3,1}$ | $y_{3,2}$ | ... | $y_{3,n-1}$ | $y_{3,n}$ | $y_{3,n+1}$ | $y_{3,n+2}$ | ... | $y_{3,N}$ |
|---|---|---|---|---|---|---|---|---|---|
| $y_3=(e_3 \vee v_3 \vee u)$ | 1 | 1 | ... | 1 | 0 | 1 | 1 | ... | 1 |

FIG. 19

| | $k_1$ | $k_2$ | | $k_{n-1}$ | $k_n$ | $k_{n+1}$ | $k_{n+2}$ | ... | $k_{N-1}$ | $k_N$ |
|---|---|---|---|---|---|---|---|---|---|---|
| k | $k_1$ | $k_2$ | ... | * | $k_n$ | null | null | ... | null | null |

| | $x_{1,1}$ | $x_{1,2}$ | | $x_{1,n-1}$ | $x_{1,n}$ | $x_{1,n+1}$ | $x_{1,n+2}$ | ... | $x_{1,N(1)}$ |
|---|---|---|---|---|---|---|---|---|---|
| $x_1$ | $x_{1,1}$ | $x_{1,2}$ | ... | $x_{1,n-1}$ | $x_{1,n}$ | null | null | ... | null |

| | $e_{1,1}$ | $e_{1,2}$ | | $e_{1,n-2}$ | $e_{1,n-1}$ | $e_{1,n}$ | $e_{1,n+1}$ | $e_{1,n+2}$ | ... | $e_{1,N(1)}$ |
|---|---|---|---|---|---|---|---|---|---|---|
| $e_1$ | 1 | 1 | ... | 1 | 0 | 1 | 1 | ... | 1 |

| | $w_1$ | $w_2$ | | $w_{n-2}$ | $w_{n-1}$ | $w_n$ | $w_{n+1}$ | $w_{n+2}$ | ... | $w_{N(1)}$ |
|---|---|---|---|---|---|---|---|---|---|---|
| w | 0 | 0 | ... | 0 | 1 | 0 | 0 | ... | 0 |

| | $u'_N$ |
|---|---|
| u' | 1 |

| | $e'_{1,1}$ | $e'_{1,2}$ | | $e'_{1,n-2}$ | $e'_{1,n-1}$ | $e'_{1,n}$ | $e'_{1,n+1}$ | $e'_{1,n+2}$ | ... | $e'_{1,N(1)}$ |
|---|---|---|---|---|---|---|---|---|---|---|
| $e'_1$ = $(e_1 \vee w)$ | 1 | 1 | ... | 1 | 1 | 1 | 1 | ... | 1 |

$\mu'_1$

| | $e'_{1,1}$ | $e'_{1,2}$ | | $e'_{1,n-2}$ | $e'_{1,n-1}$ | $e'_{1,n}$ | $e'_{1,n+1}$ | $e'_{1,n+2}$ | ... | $e'_{1,N(1)}$ | $u'_N$ |
|---|---|---|---|---|---|---|---|---|---|---|---|
| $y_1$ | 1 | 1 | ... | 1 | 1 | 1 | 1 | ... | 1 | 1 |

FIG. 22

| | $k_1$ | $k_2$ | | $k_{n-1}$ | $k_n$ | $k_{n+1}$ | $k_{n+2}$ | ... | $k_{N-1}$ | $k_N$ |
|---|---|---|---|---|---|---|---|---|---|---|
| k | $k_1$ | $k_2$ | ... | * | $k_n$ | null | null | ... | null | null |

| | $x_{2,1}$ | $x_{2,2}$ | ... | $x_{2,n-1}$ | $x_{2,n}$ | $x_{2,n+1}$ | $x_{2,n+2}$ | ... | $x_{2,N}$ |
|---|---|---|---|---|---|---|---|---|---|
| $x_2$ | $x_{2,1}$ | $x_{2,2}$ | ... | $x_{2,n-1}$ | $x_{2,n}$ | $x_{2,n+1}$ | null | ... | null |

| | $e_{2,1}$ | $e_{2,2}$ | ... | $e_{2,n-2}$ | $e_{2,n-1}$ | $e_{2,n}$ | $e_{2,n+1}$ | $e_{2,n+2}$ | ... | $e_{2,N}$ |
|---|---|---|---|---|---|---|---|---|---|---|
| $e_2$ | 1 | 1 | ... | 1 | 0 | 1 | 0 | 1 | ... | 1 |

| | $w_1$ | $w_2$ | ... | $w_{n-2}$ | $w_{n-1}$ | $w_n$ | $w_{n+1}$ | $w_{n+2}$ | ... | $w_N$ |
|---|---|---|---|---|---|---|---|---|---|---|
| w | 0 | 0 | ... | 0 | 1 | 0 | 0 | 0 | ... | 0 | u'

| | $e'_{2,1}$ | $e'_{2,2}$ | ... | $e'_{2,n-2}$ | $e'_{2,n-1}$ | $e'_{2,n}$ | $e'_{2,n+1}$ | $e'_{2,n+2}$ | ... | $e'_{2,N}$ |
|---|---|---|---|---|---|---|---|---|---|---|
| $e'_2 = (e_2 \lor w)$ | 1 | 1 | ... | 1 | 1 | 1 | 0 | 1 | ... | 1 |

$\mu'_2$

| | $e'_{2,1}$ | $e'_{2,2}$ | ... | $e'_{2,n-2}$ | $e'_{2,n-1}$ | $e'_{2,n}$ | $e'_{2,n+1}$ | $e'_{2,n+2}$ | ... | $e'_{2,N}$ |
|---|---|---|---|---|---|---|---|---|---|---|
| $y_2$ | 1 | 1 | ... | 1 | 1 | 1 | 0 | 1 | ... | 1 |

FIG. 23

| | $k_1$ | $k_2$ | | $k_{n-1}$ | $k_n$ | $k_{n+1}$ | $k_{n+2}$ | | $k_{N-1}$ | $k_N$ |
|---|---|---|---|---|---|---|---|---|---|---|
| $k$ | $k_1$ | $k_2$ | ... | * | $k_n$ | null | null | ... | null | null |

| | $x_{3,1}$ | $x_{3,2}$ | | $x_{3,n-1}$ | $x_{3,n}$ | $x_{3,n+1}$ | $x_{3,n+2}$ | | | $x_{3,N(3)}$ |
|---|---|---|---|---|---|---|---|---|---|---|
| $x_3$ | $x_{3,1}$ | $x_{3,2}$ | ... | $x_{3,n-1}$ | null | null | null | ... | null | null | null |

| | $e_{3,1}$ | $e_{3,2}$ | | $e_{3,n-2}$ | $e_{3,n-1}$ | $e_{3,n}$ | $e_{3,n+1}$ | $e_{3,n+2}$ | | $e_{3,N}$ |
|---|---|---|---|---|---|---|---|---|---|---|
| $e_3$ | 1 | 1 | ... | 1 | 0 | 0 | 1 | 1 | ... | 1 |

| | $w_1$ | $w_2$ | | $w_{n-2}$ | $w_{n-1}$ | $w_n$ | $w_{n+1}$ | $w_{n+2}$ | | $w_N$ |
|---|---|---|---|---|---|---|---|---|---|---|
| $w$ | 0 | 0 | ... | 0 | 1 | 0 | 0 | 0 | ... | 0 |

$u'$

| | $e'_{3,1}$ | $e'_{3,2}$ | | $e'_{3,n-2}$ | $e'_{3,n-1}$ | $e'_{3,n}$ | $e'_{3,n+1}$ | $e'_{3,n+2}$ | | $e'_{3,N}$ |
|---|---|---|---|---|---|---|---|---|---|---|
| $e'_3 = (e_3 \vee w)$ | 1 | 1 | ... | 1 | 1 | 0 | 1 | 1 | ... | 1 |

| | | $\mu'_{2,N(3)}$ |
|---|---|---|
| $\mu'_3$ | | 1 |

| | $e'_{3,1}$ | $e'_{3,2}$ | | $e'_{3,n-2}$ | $e'_{3,n-1}$ | $e'_{3,n}$ | $e'_{3,n+1}$ | $e'_{3,n+2}$ | | $e'_{3,N}$ | $\mu'_{2,N(3)}$ |
|---|---|---|---|---|---|---|---|---|---|---|---|
| $y_3$ | 1 | 1 | ... | 1 | 1 | 0 | 1 | 1 | ... | 1 | 1 |

FIG. 24

| | $k_1$ | $k_2$ | ... | $k_{n-1}$ | $k_n$ | $k_{n+1}$ | $k_{n+2}$ | ... | $k_{N-1}$ | $k_N$ |
|---|---|---|---|---|---|---|---|---|---|---|
| $k$ | $k_1$ | $k_2$ | ... | * | $k_n$ | null | null | ... | null | null |

| | $x_{1,1}$ | $x_{1,2}$ | ... | $x_{1,n-1}$ | $x_{1,n}$ | $x_{1,n+1}$ | $x_{1,n+2}$ | ... | $x_{1,N(1)}$ |
|---|---|---|---|---|---|---|---|---|---|
| $x_1$ | $x_{1,1}$ | $x_{1,2}$ | ... | $x_{1,n-1}$ | $x_{1,n}$ | null | null | ... | null |

| | $e_{1,1}$ | $e_{1,2}$ | ... | $e_{1,n-2}$ | $e_{1,n-1}$ | $e_{1,n}$ | $e_{1,n+1}$ | $e_{1,n+2}$ | ... | $e_{1,N(1)}$ |
|---|---|---|---|---|---|---|---|---|---|---|
| $e_1$ | 1 | 1 | ... | 1 | 0 | 1 | 1 | 1 | ... | 1 |

| | $w_1$ | $w_2$ | ... | $w_{n-2}$ | $w_{n-1}$ | $w_n$ | $w_{n+1}$ | $w_{n+2}$ | | $w_{N(1)}$ |
|---|---|---|---|---|---|---|---|---|---|---|
| $w$ | 0 | 0 | ... | 0 | 1 | 0 | 0 | 0 | ... | 0 |

| | $u''_1$ | $u''_2$ | ... | $u''_{n-2}$ | $u''_{n-1}$ | $u''_n$ | $u''_{n+1}$ | $u''_{n+2}$ | ... | $u''_{N(1)}$ | $u''_N$ |
|---|---|---|---|---|---|---|---|---|---|---|---|
| $u''$ | 0 | 0 | ... | 0 | 0 | 0 | 1 | 1 | ... | 1 | 1 |

| | $w'_1$ | $w'_2$ | ... | $w'_{n-2}$ | $w'_{n-1}$ | $w'_n$ | $w'_{n+1}$ | $w'_{n+2}$ | ... | $w'_{N(1)}$ |
|---|---|---|---|---|---|---|---|---|---|---|
| $w' = (w \vee u'')$ | 0 | 0 | ... | 0 | 1 | 0 | 1 | 1 | ... | 1 |

| | $e'_{1,1}$ | $e'_{1,2}$ | ... | $e'_{1,n-2}$ | $e'_{1,n-1}$ | $e'_{1,n}$ | $e'_{1,n+1}$ | $e'_{1,n+2}$ | ... | $e'_{1,N(1)}$ |
|---|---|---|---|---|---|---|---|---|---|---|
| $e'_1 = (e_1 \vee w')$ | 1 | 1 | ... | 1 | 1 | 1 | 1 | 1 | ... | 1 |

| | $e'_{1,1}$ | $e'_{1,2}$ | ... | $e'_{1,n-2}$ | $e'_{1,n-1}$ | $e'_{1,n}$ | $e'_{1,n+1}$ | $e'_{1,n+2}$ | ... | $e'_{1,N(1)}$ | $u''_N$ |
|---|---|---|---|---|---|---|---|---|---|---|---|
| $y_1$ | 1 | 1 | ... | 1 | 1 | 1 | 1 | 1 | ... | 1 | 1 |

| | $k_1$ | $k_2$ | ... | $k_{n-1}$ | $k_n$ | $k_{n+1}$ | $k_{n+2}$ | ... | $k_{N-1}$ | $k_N$ |
|---|---|---|---|---|---|---|---|---|---|---|
| k | $k_1$ | $k_2$ | ... | * | $k_n$ | null | null | ... | null | null |

| | $x_{3,1}$ | $x_{3,2}$ | ... | $x_{3,n-1}$ | $x_{3,n}$ | $x_{3,n+1}$ | $x_{3,n+2}$ | ... | | $x_{3,N(3)}$ |
|---|---|---|---|---|---|---|---|---|---|---|
| $x_3$ | $x_{3,1}$ | $x_{3,2}$ | ... | $x_{3,n-1}$ | null | null | null | ... | null | null | null |

| | $e_{3,1}$ | $e_{3,2}$ | ... | $e_{3,n-2}$ | $e_{3,n-1}$ | $e_{3,n}$ | $e_{3,n+1}$ | $e_{3,n+2}$ | ... | $e_{3,N}$ |
|---|---|---|---|---|---|---|---|---|---|---|
| $e_3$ | 1 | 1 | ... | 1 | 0 | 0 | 1 | 1 | ... | 1 |

| | $w_1$ | $w_2$ | ... | $w_{n-2}$ | $w_{n-1}$ | $w_n$ | $w_{n+1}$ | $w_{n+2}$ | ... | $w_N$ |
|---|---|---|---|---|---|---|---|---|---|---|
| w | 0 | 0 | ... | 0 | 1 | 0 | 0 | 0 | ... | 0 |

| | $u''_1$ | $u''_2$ | ... | $u''_{n-2}$ | $u''_{n-1}$ | $u''_n$ | $u''_{n+1}$ | $u''_{n+2}$ | ... | $u''_N$ |
|---|---|---|---|---|---|---|---|---|---|---|
| $u''$ | 0 | 0 | ... | 0 | 0 | 0 | 1 | 1 | ... | 1 |

| | $w'_1$ | $w'_2$ | ... | $w'_{n-2}$ | $w'_{n-1}$ | $w'_n$ | $w'_{n+1}$ | $w'_{n+2}$ | ... | $w'_N$ |
|---|---|---|---|---|---|---|---|---|---|---|
| $w' = (w \vee u'')$ | 0 | 0 | ... | 0 | 1 | 0 | 1 | 1 | ... | 1 |

| | $e'_{3,1}$ | $e'_{3,2}$ | ... | $e'_{3,n-2}$ | $e'_{3,n-1}$ | $e'_{3,n}$ | $e'_{3,n+1}$ | $e'_{3,n+2}$ | ... | $e'_{3,N}$ |
|---|---|---|---|---|---|---|---|---|---|---|
| $e'_3 = (e_3 \vee w')$ | 1 | 1 | ... | 1 | 1 | 0 | 1 | 1 | ... | 1 |

| | $e'_{3,1}$ | $e'_{3,2}$ | ... | $e'_{3,n-2}$ | $e'_{3,n-1}$ | $e'_{3,n}$ | $e'_{3,n+1}$ | $e'_{3,n+2}$ | ... | $e'_{3,N}$ |
|---|---|---|---|---|---|---|---|---|---|---|
| $y_3$ | 1 | 1 | ... | 1 | 1 | 0 | 1 | 1 | ... | 1 |

FIG. 28

RETRIEVAL DEVICE, RETRIEVAL METHOD, PROGRAM, AND RECORDING MEDIUM

TECHNICAL FIELD

The present invention relates to a secure computation technique and especially relates to a technique for performing retrieval while concealing data.

BACKGROUND ART

A secure computation technique for performing match retrieval while concealing a search word and a search target word group is well known (see Non-patent Literature 1, for example).

PRIOR ART LITERATURE

Non-Patent Literature

Non-patent Literature 1: Koki Hamada, Naoto Kiribuchi, Dai Ikarashi, "A Round-Efficient Pattern Matching Algorithm for Secure Multi-Party Computation", Computer Security Symposium (CSS), 2014.

SUMMARY OF THE INVENTION

Problems to be Solved by the Invention

Though retrieval using a search word, which includes a wildcard character, while concealing the search word is realized in a method of related art, communication efficiency is low and $O(N^2 \log N)$ of communication volume is required when a concealed search target word length and a concealed search word length are both set to N.

An object of the present invention is to efficiently perform match retrieval for concealed database while concealing a search word including a wildcard character.

Means to Solve the Problems

Concealed database $[x_1], \ldots, [x_m]$ is stored in a storage. A concealed search target word $[x_i]$ included in the concealed database $[x_1], \ldots, [x_m]$ is obtained by concealing a search target word $x_i=(x_{i,1}, \ldots, x_{i,t(i)}, \ldots, x_{i,N})$ including $t(i)$ pieces of characters $x_{i,1}, \ldots, x_{i,t(i)}$. An input unit receives an input of a concealed search word $[k]$. The concealed search word $[k]$ is obtained by concealing a search word $k=(k_1, \ldots, k_n, \ldots, k_N)$ including n pieces of characters $k_1, \ldots, k_n$ including a wildcard character. An equality determination unit obtains a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, by secure computation using the concealed search target word $[x_i]$ and the concealed search word $[k]$. A wildcard determination unit obtains a concealed operation result $[w]$ in which an operation result $w=(w_1, \ldots, w_N)$ is concealed, the operation result $w$ in which $w_j=b_1$ is established when $k_j$ is a wildcard character and $w_j=b_0$ is established when $k_j$ is not a wildcard character, by secure computation using the concealed search word $[k]$. An OR operation unit obtains a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w_j=b_1$ is satisfied and $y_{i,j}=d_0$ is established when both of $e_{i,j}=a_0$ and $w_j=b_0$ are satisfied, by secure computation using the concealed operation result $[e_i]$ and the concealed operation result $[w]$. Here, m, n, t(i), and N are positive integers, i=1, ..., m, j=1, ..., N, n≤N, and t(i)≤N.

Effects of the Invention

Accordingly, match retrieval for concealed database can be performed with less communication volume than that of related art.

BRIEF DESCRIPTION OF THE DRAWINGS

FIG. 4 is a conceptual diagram for explaining the retrieval method according to the first embodiment.

FIG. 5 is a conceptual diagram for explaining the retrieval method according to the first embodiment.

FIG. 6 is a conceptual diagram for explaining the retrieval method according to the first embodiment.

FIG. 7 is a conceptual diagram for explaining the retrieval method according to the first embodiment.

FIG. 8 is a conceptual diagram for explaining the retrieval method according to the first embodiment.

FIG. 9 is a conceptual diagram for explaining the retrieval method according to the first embodiment.

FIG. 11 is a conceptual diagram for explaining the retrieval method according to the second embodiment.

FIG. 12 is a conceptual diagram for explaining the retrieval method according to the second embodiment.

FIG. 13 is a conceptual diagram for explaining the retrieval method according to the second embodiment.

FIG. 15 is a conceptual diagram for explaining the retrieval method according to the third embodiment.

FIG. 16 is a conceptual diagram for explaining the retrieval method according to the third embodiment.

FIG. 18 is a conceptual diagram for explaining the retrieval method according to the fourth embodiment.

FIG. 19 is a conceptual diagram for explaining the retrieval method according to the fourth embodiment.

FIG. 22 is a conceptual diagram for explaining the retrieval method according to the fifth embodiment.

FIG. 23 is a conceptual diagram for explaining the retrieval method according to the fifth embodiment.

FIG. 24 is a conceptual diagram for explaining the retrieval method according to the fifth embodiment.

FIG. 26 is a conceptual diagram for explaining the retrieval method according to the sixth embodiment.

FIG. 27 is a conceptual diagram for explaining the retrieval method according to the sixth embodiment.

FIG. 28 is a conceptual diagram for explaining the retrieval method according to the sixth embodiment.

DETAILED DESCRIPTION OF THE EMBODIMENTS

Embodiments according to the present invention are described below with reference to the accompanying drawings.

First Embodiment

A first embodiment is described. In the present embodiment, exact match search for concealed database is performed while concealing a search word including a wildcard character.

<Configuration>

Figure 1:
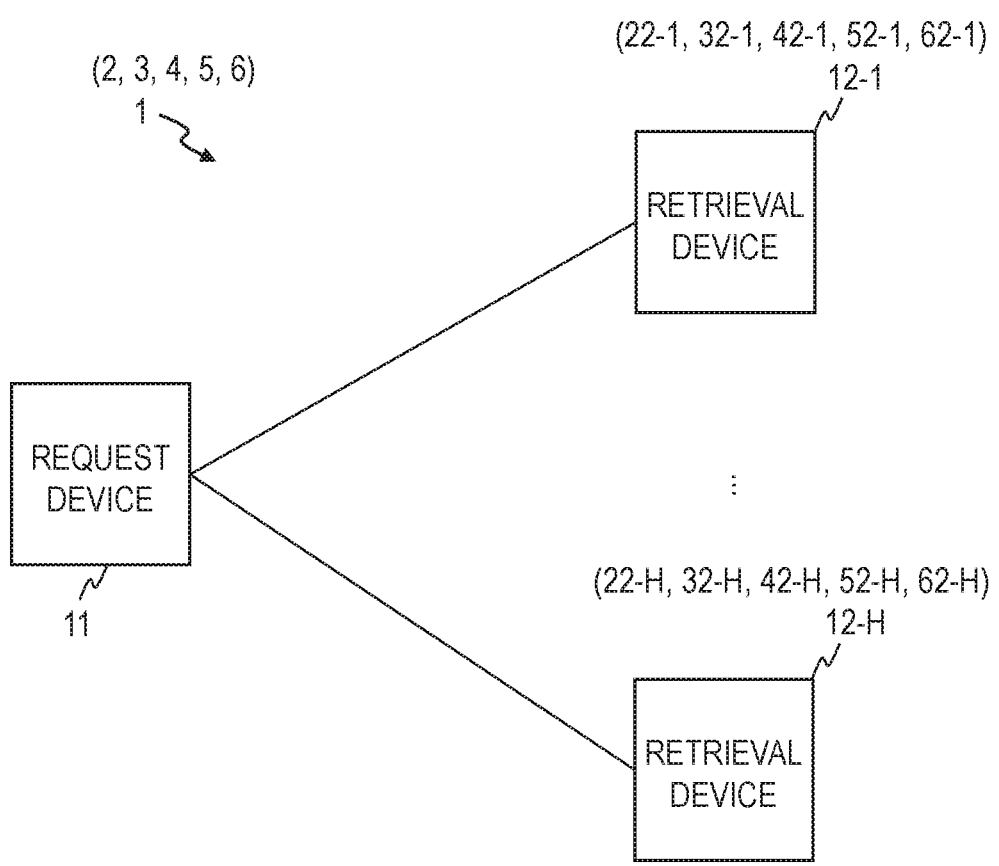
FIG. 1 is a block diagram illustrating a retrieval system according to embodiments.

As illustrated in FIG. 1, a retrieval system 1 according to the present embodiment includes a request device 11 which requests retrieval and retrieval devices 12-$h$ which perform retrieval, and the retrieval system 1 performs retrieval processing based on secure computation. Here, $h=1, \ldots, H$ and $H$ is an integer which is 1 or greater. $H \geq 2$ is established when secure computation based on a secret sharing scheme is performed and $H=1$ is established when secure computation based on a homomorphic cryptosystem is performed.

Figure 2:
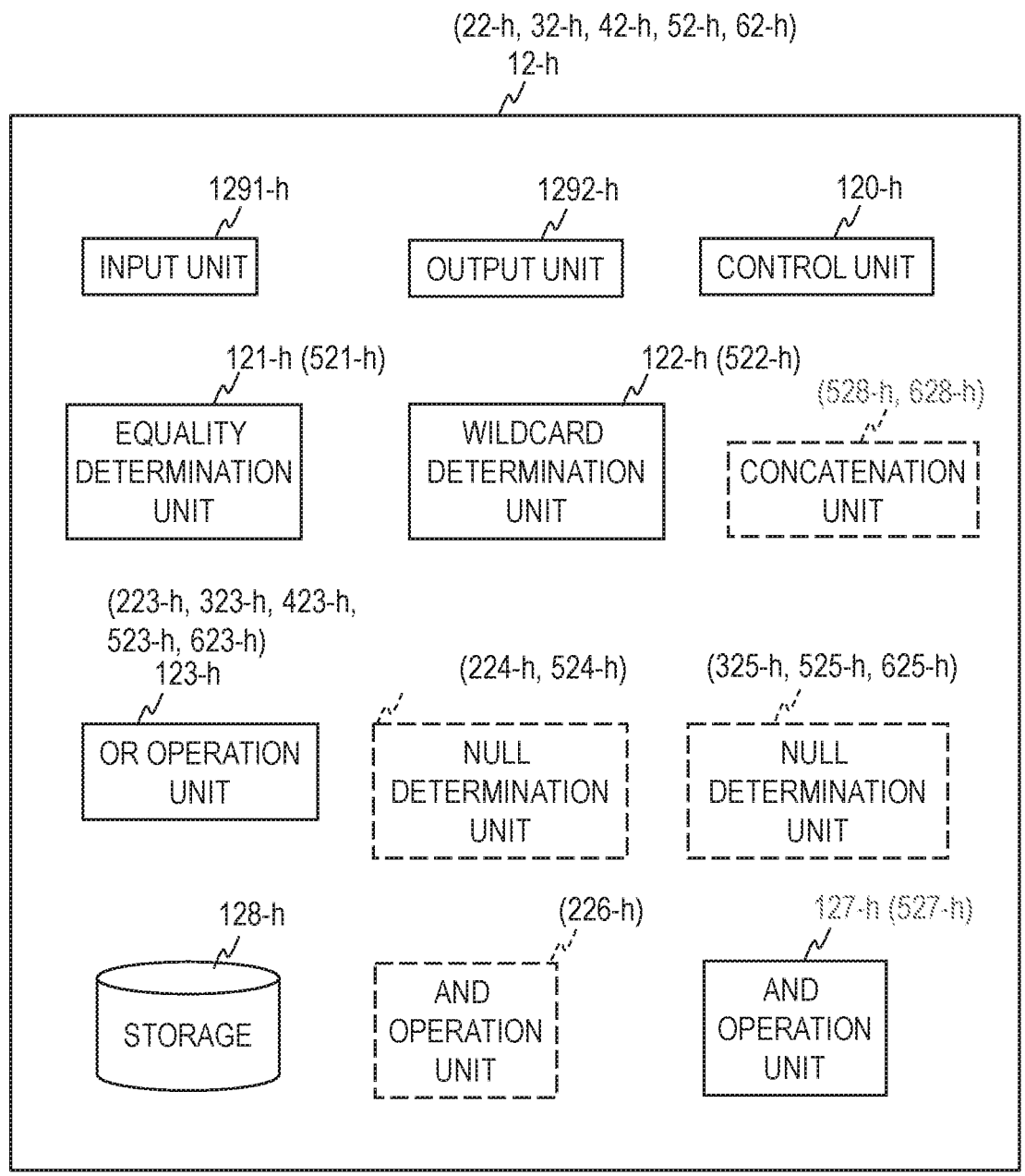
FIG. 2 is a block diagram illustrating a retrieval device according to the embodiments.

As illustrated in FIG. 2, the retrieval device 12-$h$ of the present embodiment includes a control unit 120-$h$, an equality determination unit 121-$h$, a wildcard determination unit 122-$h$, an OR operation unit 123-$h$, an AND operation unit 127-$h$, a storage 128-$h$, an input unit 1291-$h$, and an output unit 1292-$h$. The retrieval device 12-$h$ executes each processing under the control of the control unit 120-$h$. Further, data obtained in respective units are stored in the storage 128-$h$ one by one and read out as needed to be used for other processing.

<Preprocessing>

The storage 128-$h$ stores concealed database $[x_1], \ldots, [x_m]$ including a concealed search target word $[x_i]$ in which a search target word $x_i=(x_{i,1}, \ldots, x_{i,t(i)}, \ldots, x_{i,N})$ (see DB in FIG. 4 and FIG. 6, for example) including $t(i)$ pieces of characters $x_{i,1}, \ldots, x_{i,t(i)}$ is concealed. Here, $m$, $t(i)$, and $N$ are positive integers, $i=1, \ldots, m$, $j=1, \ldots, N$, and $t(i) \leq N$. $t(i)$ pieces of characters $x_{i,1}, \ldots, x_{i,t(i)}$ included in the search target word $x_i$ are normal characters which are retrieval targets. On the other hand, the remaining $N-t(i)$ pieces of characters $x_{i,t(i)+1}, \ldots, x_{i,N}$ included in the search target word $x_i$ are special characters (null characters) representing null values. Null characters are predetermined ("0", for example) and are not used as normal characters. When $t(i)=N$, the search target word $x_i$ does not include any null characters. Each character is expressed as an element of a finite field, for example. When secure computation based on the secret sharing scheme is performed, the concealed search target word $[x_i]$ is a secret sharing value of the search target word $x_i$. When secure computation based on the homomorphic cryptosystem is performed, the concealed search target word $[x_i]$ is a cipher text of the search target word $x_i$. A set of concealed values $[x_{i,1}], \ldots, [x_{i,t(i)}], \ldots, [x_{i,N}]$ obtained by separately concealing respective characters $x_{i,1}, \ldots, x_{i,t(i)}, \ldots, x_{i,N}$ may be defined as the concealed search target word $[x_i]$ or $N$ pieces of characters $x_{i,1}, \ldots, x_{i,t(i)}, \ldots, x_{i,N}$ may be collectively concealed to be defined as the concealed search target word $[x_i]$. Further, each concealed search target word $[x_i]$ may be associated with a concealed value of content information representing a content or a position of the content on a network.

<Retrieval Processing>

Figure 3:
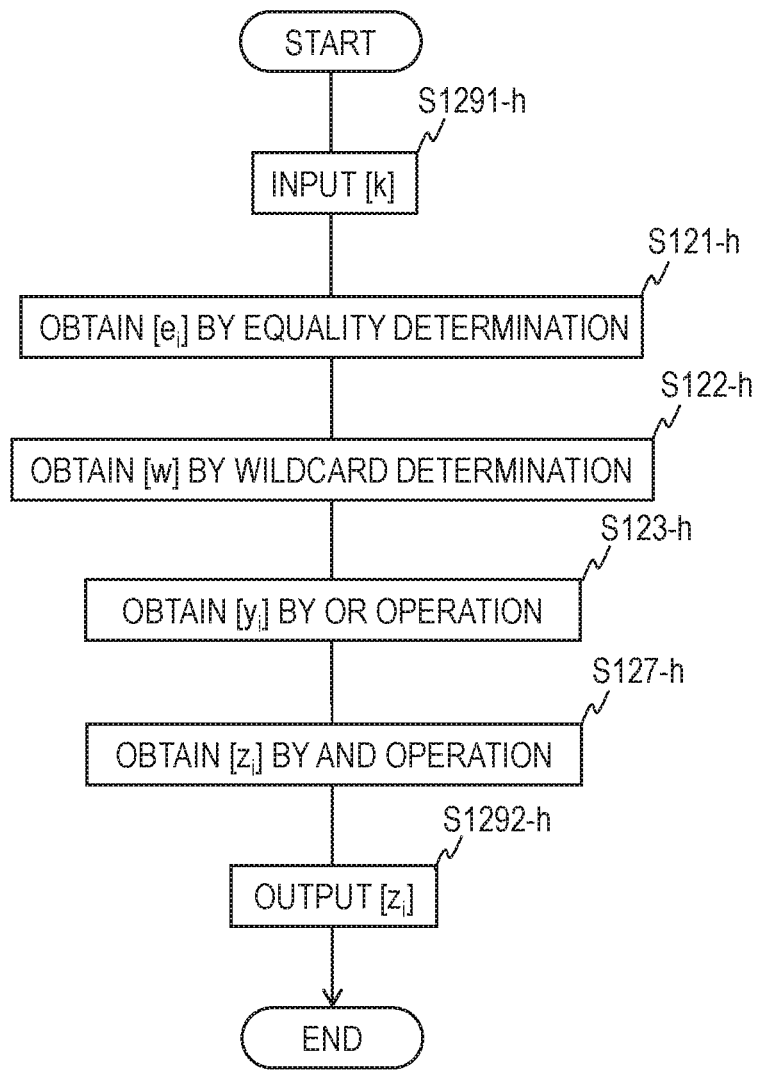
FIG. 3 is a flow diagram for explaining a retrieval method according to a first embodiment.

Retrieval processing of the present embodiment is described with reference to FIG. 3.

The request device 11 conceals a search word $k=(k_1, \ldots, k_n, \ldots, k_N)$ (see FIG. 4 and FIG. 6, for example) including $n$ pieces of characters $k_1, \ldots, k_n$ so as to obtain a concealed search word $[k]$. Here, $n$ is a positive integer and $n \leq N$. The characters $k_1, \ldots, k_n$ may include one or more wildcard characters. Characters other than a wildcard character among the characters $k_1, \ldots, k_n$ are normal characters. Wildcard characters are predetermined ("*", for example) and are not used as normal characters. Further, one wildcard character corresponds to one normal character or one null character (the same goes for each of the following embodiments). When the above-described search target word $x_i$ (here, $i=1, \ldots, m$) does not include any null characters, any character among the characters $k_1, \ldots, k_n$ may be a wildcard character. On the other hand, it is assumed that, when the search target word $x_i$ includes null characters $x_{i,t(i)+1}, \ldots, x_{i,N}$, $k_{t(i)+1}, \ldots, k_N$ do not include any wildcard characters in the present embodiment. $N-n$ pieces of characters $k_{n+1}, \ldots, k_N$ included in the search word $k$ are null characters. However, when $n=N$, the search word $k$ does not include any null characters (see FIG. 4, for example). A null character included in the search word $k$ is the same as the above-described null character included in the search target word $x_i$. When secure computation based on the secret sharing scheme is performed in the retrieval device 12-$h$, the concealed search word $[k]$ is a secret sharing value of the search word $k$. On the other hand, when secure computation based on the homomorphic cryptosystem is performed in the retrieval device 12-$h$, the concealed search word $[k]$ is a cipher text of the search word $k$. A set of concealed values $[k_1], \ldots, [k_n], \ldots, [k_N]$ obtained by separately concealing respective characters $k_1, \ldots, k_n, \ldots, k_N$ may be defined as the concealed search word $[k]$ or $N$ pieces of characters $k_1, \ldots, k_n, \ldots, k_N$ may be collectively concealed to be defined as the concealed search word $[k]$.

The request device 11 outputs the concealed search word $[k]$. The outputted concealed search word $[k]$ is transmitted to the retrieval device 12-$h$ via a network or the like. The concealed search word $[k]$ is inputted into the input unit 1291-$h$ of the retrieval device 12-$h$ to be stored in the storage 128-$h$ (step S1291-$h$). Subsequently, the following processing is executed for each $i=1, \ldots, m$.

First, the equality determination unit 121-$h$ obtains a concealed operation result $[e_i]$, in which an operation result $e_i=(e_{i,1}, \ldots, e_{i,N})$ is concealed, by secure computation using the concealed search target word $[x_i]$ and the concealed search word $[k]$, which are read from the storage 128-$h$, and outputs the concealed operation result $[e_i]$. Here, $e_{i,j}=a_1$ is established when $x_{i,j}$ is $k_j$ (when $x_{i,j}=k_j$) and $e_{i,j}=a_0$ is established when $x_{i,j}$ is not $k_j$ (when $x_{i,j} \neq k_j$). $e_{i,j} \in \{a_0, a_1\}$, in which $a_0=0$ and $a_1=1$, for example. Since a wildcard character is different from a normal character, $e_{i,j}=a_0$ is always established when $k_j$ is a wildcard character. In a similar manner, since a null character is different from a normal character, $e_{i,j}=a_0$ is always established when $k_j$ is a null character and $x_{i,j}$ is a normal character and when $k_j$ is a normal character and $x_{i,j}$ is a null character. Further, when both of $k_j$ and $x_{i,j}$ are null characters, $e_{i,j}=a_1$ is established. For example, the equality determination unit 121-$h$ performs equality determination (match determination) between $[k_j]$ and $[x_{i,j}]$ for $j=1, \ldots, N$ by secure computation, obtains $[e_{i,j}]$ in which $e_{i,j}$ is concealed, and obtains a set of $[e_{i,1}], \ldots, [e_{i,N}]$ as the concealed operation result $[e_i]$. Alternatively, the equality determination unit 121-$h$ may obtain the concealed operation result $[e_i]$ in which $e_{i,1}, \ldots, e_{i,N}$ are collectively concealed, by secure computation using the concealed search target word $[x_i]$ and the concealed search word $[k]$. The concealed operation result $[e_i]$ is stored in the storage 128-$h$ (step S121-$h$).

The wildcard determination unit 122-$h$ obtains a concealed operation result $[w]$, in which an operation result $w=(w_1, \ldots, w_N)$ is concealed, by secure computation using the concealed search word $[k]$ read from the storage 128-$h$ and outputs the concealed operation result $[w]$. Here, $w_j=b_1$ is established when $k_j$ is a wildcard character and $w_j=b_0$ is established when $k_j$ is not a wildcard character. $w_j \in \{b_0, b_1\}$, in which $b_0=0$ and $b_1=1$, for example. The wildcard determination unit 122-$h$ obtains the concealed operation result $[w]$ by secure computation by using the concealed search word $[k]$ and a concealed wildcard character which is obtained by concealing a wildcard character, for instance. As an example, the wildcard determination unit 122-$h$ performs equality determination between $[k_j]$ and the concealed wildcard character for $j=1, \ldots, N$ by secure computation, obtains $[w_j]$ in which $w_j$ is concealed, and obtains a set of $[w_1], \ldots, [w_N]$ as the concealed operation result $[w]$. Alternatively, the wildcard determination unit 122-$h$ may obtain the concealed operation result $[w]$ in which $w_1, \ldots, w_N$ are collectively concealed, by secure computation using the concealed search word $[k]$ and the concealed wildcard character. The concealed operation result $[w]$ is stored in the storage 128-$h$ (step S122-$h$).

The OR operation unit 123-$h$ obtains a concealed operation result $[y_i]$, in which an operation result $y_i=(y_{i,1}, \ldots, y_{i,N})$ is concealed, by secure computation using the concealed operation result $[e_i]$ and the concealed operation result $[w]$, which are read from the storage 128-$h$, and outputs the concealed operation result $[y_i]$. Here, $y_{i,j}=d_1$ is established when at least one of $e_{i,j}=a_1$ and $w_j=b_1$ is satisfied and $y_{i,j}=d_0$ is established when both of $e_{i,j}=a_0$ and $w_j=b_0$ are satisfied. $y_{i,j} \in \{d_0, d_1\}$, in which $d_0=0$ and $d_1=1$, for example. When $a_0=0$, $a_1=1$, $b_0=0$, $b_1=1$, $d_0=0$, and $d_1=1$, $y_{i,j}=e_{i,j} \vee w_j$ is established, for example. Here, "$\vee$" denotes a logical sum (OR). For example, the OR operation unit 123-$h$ performs an OR operation between $[e_{i,j}]$ and $[w_j]$ for $j=1, \ldots, N$ by secure computation, obtains $[y_{i,j}]$ in which $y_{i,j}=e_{i,j} \vee w_j$ is concealed, and obtains a set of $[y_{i,1}], \ldots, [y_{i,N}]$ as the concealed operation result $[y_i]$. Alternatively, the OR operation unit 123-$h$ may obtain the concealed operation result $[y_i]$ in which $y_{i,1} \ldots, y_{i,N}$ are collectively concealed, by secure computation using the concealed operation result $[e_i]$ and the concealed operation result $[w]$. The concealed operation result $[y_i]$ is stored in the storage 128-$h$ (step S123-$h$).

The AND operation unit 127-$h$ obtains a concealed match determination result $[z_i]$ in which a match determination result $z_i$ is concealed, by secure computation using the concealed operation result $[y_i]$ read from the storage 128-$h$ and outputs the concealed match determination result $[z_i]$. Here, $z_i=g_1$ is established when $y_{i,1}= \ldots =y_{i,N}=d_1$ is satisfied and $z_i=g_0$ is established when $y_{i,1}= \ldots =y_{i,N}=d_1$ is not satisfied. $z_i \in \{g_0, g_1\}$, in which $g_0=0$ and $g_1=1$, for example. When $d_0=0$, $d_1=1$, $g_0=0$, and $g_1=1$, $z_i=y_{i,1} \wedge \ldots \wedge y_{i,N}$ is established, for example. Here, "$\wedge$" denotes a logical product (AND). $z_i=g_1$ represents that the search target word $x_i$ is matched with the search word $k$ and $z_i=g_0$ represents that the search target word $x_i$ is not matched with the search word $k$. The concealed match determination result $[z_i]$ is stored in the storage 128-$h$ (step S127-$h$).

The output unit 1292-$h$ outputs the concealed match determination result $[z_i]$ for each $i=1, \ldots, m$ (step S1292-$h$).

The concealed match determination result $[z_i]$ is transmitted to the request device 11 via a network or the like. The request device 11 reconstructs the concealed match determination result $[z_i]$ for each $i=1, \ldots, m$ so as to obtain $z_i$. For example, when secure computation based on the secret sharing scheme is performed, the request device 11 reconstructs $z_i$ based on $[z_i]$ transmitted from a predetermined number or more of the retrieval devices 12-$h$. On the other hand, when secure computation based on the homomorphic cryptosystem is performed, the transmitted $[z_i]$ is decrypted to obtain $z_i$. Thus, retrieval results for respective $i$ are obtained. After that, processing using these retrieval results (request for concealed values of content information corresponding to the matched concealed search target word $[x_i]$, for example) is executed.

Specific Example

A specific example for the case where $a_0=0$, $a_1=1$, $b_0=0$, $b_1=1$, $d_0=0$, $d_1=1$, $g_0=0$, and $g_1=1$ is described below.

Figure 4:
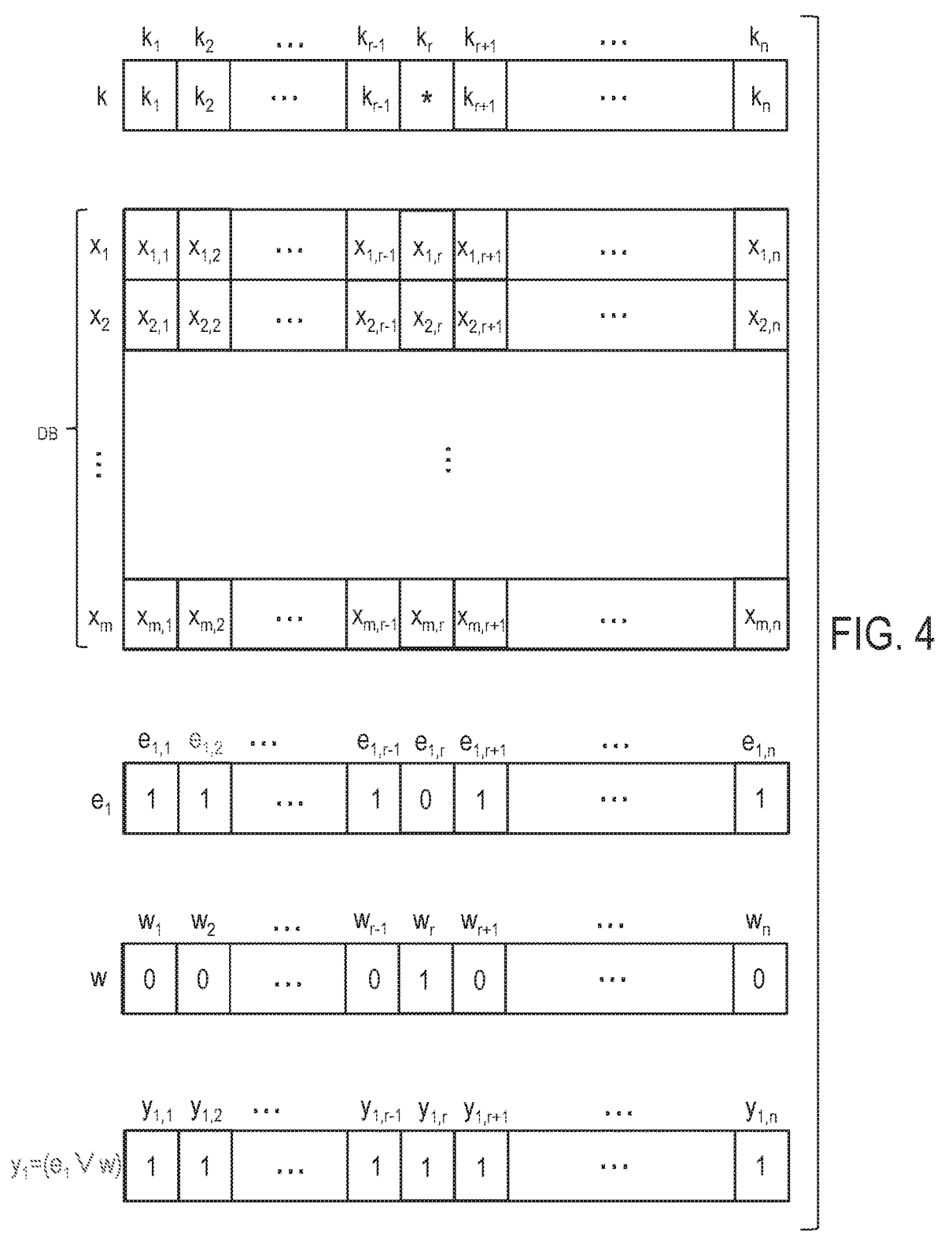

As illustrated in FIG. 4, $e_1=(1, \ldots, 1, 0, 1, \ldots, 1)$, $w=(0, \ldots, 0, 1, 0, \ldots, 0)$, and $y_1=(1, \ldots, 1, 1, 1, \ldots, 1)$ when $N=n=t(i)$, $k_r$ is a wildcard character "*", $1 \le r \le n$, and $x_{1,j}=k_j$ is satisfied for $j=1, \ldots, n$ other than $r$. Therefore, $z_1=1$ is established.

As illustrated in FIG. 5, $d_2=(0, 1, 1, 0, 1, \ldots, 1)$, $w=(0, 0, \ldots, 0, 1, 0, \ldots, 0)$, and $y_2=(0, 1, \ldots, 1, 1, 1, \ldots, 1)$ when $N=n=t(i)$ and $x_{2,j}=k_j$ is satisfied only for $j=2, \ldots, n$ other than 1 and $r$. Therefore, $z_2=0$ is established.

FIG. 6 to FIG. 9 illustrate examples of $n<N$ and $t(i)<N$. As illustrated in FIG. 6, $k_{n+1}, \ldots, k_N$ and $x_{i,t(i)+1}, \ldots, x_{i,N}$ are null characters.

As illustrated in FIG. 7, $e_1=(1, 1, \ldots, 0, \ldots, 1, \ldots, 1)$, $w=(0, 0, \ldots, 1, \ldots, 0, \ldots, 0)$, and $y_1=(1, 1, \ldots, 1, \ldots, 1, \ldots, 1)$ when $t(1)=n$, $k_r$ is a wildcard character "*", $1 \le r \le n$, and $x_{1,j}=k_j$ is satisfied for $j=1, \ldots, n$ other than $r$. Therefore, $z_1=1$ is established.

As illustrated in FIG. 8, $e_2=(1, 1, \ldots, 0, \ldots, 1, 0, 1, \ldots, 1)$, $w=(0, 0, \ldots, 1, \ldots, 0, 0, 0, \ldots, 0)$ and $y_2=(1, 1, \ldots, 1, \ldots, 1, 0, 1, \ldots, 1)$ when $t(2)=n+1$, $k_r$ is a wildcard character "*", $1 \le r \le n$, and $x_{2,j}=k_j$ is satisfied for $j=1, \ldots, n$ other than $r$. Therefore, $z_2=0$ is established.

As illustrated in FIG. 9, $e_3=(1, 1, \ldots, 0, \ldots, 0, 1, 1, \ldots, 1)$, $w=(0, 0, \ldots, 1, \ldots, 0, 0, 0, \ldots, 0)$, and $y_3=(1, 1, \ldots, 1, \ldots, 0, 1, 1, \ldots, 1)$ when $t(3)=n-1$, $k_r$ is a wildcard character "*", $1 \le r \le n-1$, and $x_{3,j}=k_j$ is satisfied only for $j=1, \ldots, n-1$ other than $r$. Therefore, $z_3=0$ is established.

Characteristics of Present Embodiment

As described above, exact match search of concealed database can be performed while concealing a search word including a wildcard character, in the present embodiment. Further, match retrieval of concealed database can be performed with less communication volume (communication volume of O(N), for example) than that of related art.

Second Embodiment

When characters $x_{i,t(i)+1}, \ldots, x_{i,N}$ of the search target word $x_i$ are null characters and characters $k_{t(i)+1}, \ldots, k_N$ of the search word $k$ may include a wildcard character, exact match search may not be able to be correctly performed by the method of the first embodiment. For instance, in the case of the example of FIG. 11, characters $x_{3,n}, \ldots, x_{i,N}$ of a search target word $x_3$ are null characters and a character $k_n$ of the search word $k$ is a wildcard character. Though a wildcard character has to be determined to match with any normal characters, the wildcard character has to be determined not to match with null characters. However, when $x_{3,j}=k_j$ is satisfied for $j=1, \ldots, n-1$, $y_3=(1, 1, \ldots, 1, \ldots, 1, 1, 1, \ldots, 1)$ is obtained and $z_3=1$ is established in the method of the first embodiment. The present embodiment describes a method for correctly performing exact match search in such a case. Note that differences from the above-described matters are mainly described and description of common matters is simplified by referring to the same reference characters below.

<Configuration>

As illustrated in FIG. 1, a retrieval system 2 according to the present embodiment includes a request device 11 which requests retrieval and retrieval devices 22-$h$ which perform retrieval, and the retrieval system 2 performs retrieval processing based on secure computation. Here, $h=1, \ldots, H$ and H is an integer which is 1 or greater.

As illustrated in FIG. 2, the retrieval device 22-$h$ of the present embodiment includes a control unit 120-$h$, an equality determination unit 121-$h$, a wildcard determination unit 122-$h$, an OR operation unit 223-$h$, a null determination unit 224-$h$, AND operation units 127-$h$ and 226-$h$, a storage 128-$h$, an input unit 1291-$h$, and an output unit 1292-$h$. The retrieval device 22-$h$ executes each processing under the control of the control unit 120-$h$. Further, data obtained in respective units are stored in the storage 128-$h$ one by one and read out as needed to be used for other processing.

<Preprocessing>

Same as the first embodiment.

<Retrieval Processing>

Figure 10:
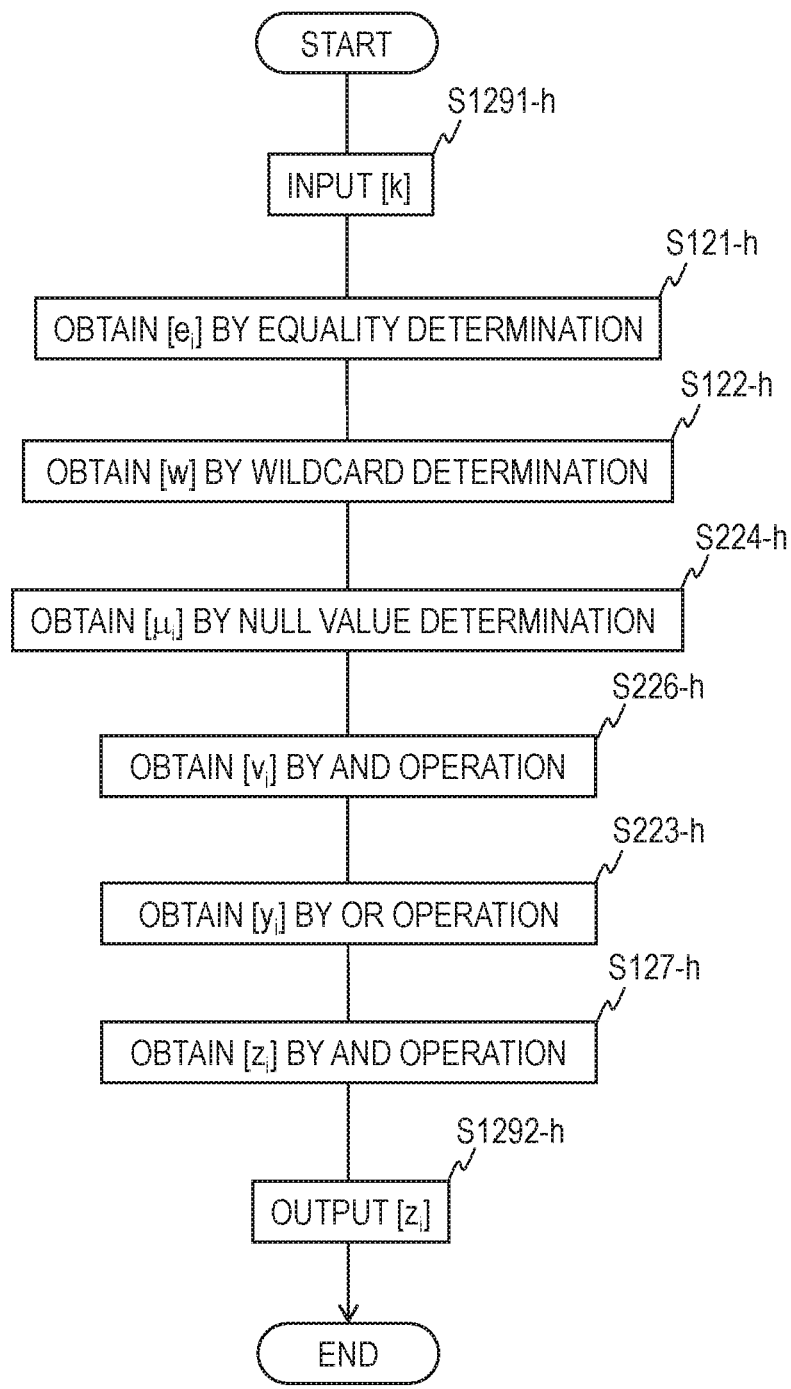
FIG. 10 is a flow diagram for explaining a retrieval method according to a second embodiment.

Retrieval processing of the present embodiment is described with reference to FIG. 10. The request device 11 conceals a search word $k=(k_1, \ldots, k_n, \ldots, k_N)$ including n pieces of characters $k_1, \ldots, k_n$ so as to obtain a concealed search word [k]. Here, n is a positive integer and $n \leq N$. The characters $k_1, \ldots, k_n$ may include a wildcard character. Different from the first embodiment, when the search target word $x_i$ includes null characters $x_{i,t(i)+1}, \ldots, x_{i,N}$, $k_{t(i)+1}, \ldots, k_N$ can include a wildcard character.

The request device 11 outputs the concealed search word [k]. The outputted concealed search word [k] is transmitted to the retrieval device 22-$h$ via a network or the like. The concealed search word [k] is inputted into the input unit 1291-$h$ of the retrieval device 22-$h$ to be stored in the storage 128-$h$ (step S1291-$h$). Subsequently, the following processing is executed for each $i=1, \ldots, m$.

First, the equality determination unit 121-$h$ obtains a concealed operation result [$e_i$], in which an operation result $e_i=(e_{i,1}, \ldots, e_{i,N})$ is concealed, by secure computation using the concealed search target word [$x_i$] and the concealed search word [k], which are read from the storage 128-$h$, and outputs the first concealed operation result [$e_i$]. Here, $e_{i,j}=a_1$ is established when $x_{i,j}$ is $k_j$ (when $x_{i,j}=k_j$) and $e_{i,j}=a_0$ is established when $x_{i,j}$ is not $k_j$ (when $x_{i,j} \neq k_j$). The concealed operation result [$e_i$] is stored in the storage 128-$h$ (step S121-$h$).

The wildcard determination unit 122-$h$ obtains a concealed operation result [w], in which an operation result $w=(w_1, \ldots, w_N)$ is concealed, by secure computation using the concealed search word [k] read from the storage 128-$h$ and outputs the concealed operation result [w]. Here, $w_j=b_1$ is established when $k_j$ is a wildcard character and $w_j=b_0$ is established when $k_j$ is not a wildcard character. The concealed operation result [w] is stored in the storage 128-$h$ (step S122-$h$).

The null determination unit 224-$h$ obtains a concealed operation result [$\mu_i$], in which an operation result $\mu_i=(\mu_{i,1}, \ldots, \mu_{i,N})$ is concealed, by secure computation using the concealed search target word [$x_i$], which is read from the storage 128-$h$, and outputs the concealed operation result [$\mu_i$]. Here, $\mu_{i,j}=\theta_0$ is established when $x_{i,j}$ is a null character and $\mu_{i,j}=\theta_1$ is established when $x_{i,j}$ is not a null character. $\mu_{i,j} \in \{\theta_0, \theta_1\}$, in which $\theta_0=0$ and $\theta_1=1$, for example. The null determination unit 224-$h$ obtains the concealed operation result [$\mu_i$] by secure computation by using the concealed search target word [$x_i$] and a concealed null character which is obtained by concealing a null character, for instance. As an example, the null determination unit 224-$h$ performs equality determination between [$x_{i,j}$] and the concealed null character for $j=1, \ldots, N$ by secure computation, obtains [$\mu_{i,j}$] in which $\mu_{i,j}$ is concealed, and obtains a set of [$\mu_{i,1}$], $\ldots$, [$\mu_{i,N}$] as the concealed operation result [$\mu_i$]. Alternatively, the null determination unit 224-$h$ may obtain the concealed operation result [$\mu_i$] in which $\mu_{i,1}, \ldots, \mu_{i,N}$ are collectively concealed, by secure computation using the concealed search target word [$x_i$] and the concealed null character. The concealed operation result [$\mu_i$] is stored in the storage 128-$h$ (step S224-$h$).

The AND operation unit 226-$h$ obtains a concealed operation result [$v_i$], in which an operation result $v_i=(v_{i,1}, \ldots, v_{i,N})$ is concealed, by secure computation using the concealed operation result [w] and the concealed operation result [$\mu_i$], which are read from the storage 128-$h$, and outputs the concealed operation result [$v_i$]. Here, $v_{i,j}=\rho_1$ is established when both of $w_j=b_1$ and $\mu_{i,j}=\theta_1$ are satisfied, and $v_{i,j}=\rho_0$ is established when at least one of $w_j=b_0$ and $\mu_{i,j}=\theta_0$ is satisfied. $v_{i,j} \in \{\rho_0, \rho_1\}$, in which $\rho_0=0$ and $\rho_1=1$, for example. When $b_0=0$, $b_1=1$, $\rho_0=0$, and $\rho_1=1$, $v_{i,j}=w_j \wedge \mu_{i,j}$ is established, for example. For instance, the AND operation unit 226-$h$ performs an AND operation between [$w_j$] and [$\mu_{i,j}$] for $j=1, \ldots, N$ by secure computation, obtains [$v_{i,j}$] in which $v_{i,j}=w_j \wedge \mu_{i,j}$ is concealed, and obtains a set of [$v_{i,1}$], $\ldots$, [$v_{i,N}$] as the concealed operation result [$v_i$]. Alternatively, the AND operation unit 226-$h$ may obtain the concealed operation result [$v_i$] in which $v_{i,1}, \ldots, v_{i,N}$ are collectively concealed, by secure computation using the concealed operation result [w] and the concealed operation result [$\mu_i$]. The concealed operation result [$v_i$] is stored in the storage 128-$h$ (step S226-$h$).

The OR operation unit 223-$h$ obtains a concealed operation result [$y_i$], in which an operation result $y_i=(y_{i,1}, \ldots, y_{i,N})$ is concealed, by secure computation using the concealed operation result [$e_i$] and the concealed operation result [$v_i$], which are read from the storage 128-$h$, and outputs the concealed operation result [$y_i$]. Here, $y_{i,j}=d_1$ is established when at least one of $e_{i,j}=a_1$ and $v_{i,j}=\rho_1$ is satisfied and $y_{i,j}=d_0$ is established when both of $e_{i,j}=a_0$ and $v_{i,j}=\rho_0$ are satisfied. $y_{i,j} \in \{d_0, d_1\}$, in which $d_0=0$ and $d_1=1$, for example. When $a_0=0$, $a_1=1$, $\rho_0=0$, $\rho_1=1$, $d_0=0$, and $d_1=1$, $y_{i,j}=e_{i,j} \vee v_{i,j}$ is established, for example. For example, the OR operation unit 223-$h$ performs an OR operation between [$e_{i,j}$] and [$v_{i,j}$] for $j=1, \ldots, N$ by secure computation, obtains [$y_{i,j}$] in which $y_{i,j}=e_{i,j} \vee v_{i,j}$ is concealed, and obtains a set of [$y_{i,1}$], $\ldots$, [$y_{i,N}$] as the concealed operation result [$y_i$]. Alternatively, the OR operation unit 223-$h$ may obtain the concealed operation result [$y_i$] in which $y_{i,1}, \ldots, y_{i,N}$ are collectively concealed, by secure computation using the concealed operation result [$e_i$] and the concealed operation result [$v_i$]. The concealed operation result [$y_i$] is stored in the storage 128-$h$ (step S223-$h$).

After that, the processing, which is described in the first embodiment, after step S127-$h$ is executed.

Specific Example

A specific example for the case where $a_0=0$, $a_1=1$, $b_0=0$, $b_1=1$, $\rho_0=0$, $\rho_1=1$, $d_0=0$, $d_1=1$, $g_0=0$ and $g_1=1$ is described below.

FIG. 11 to FIG. 13 illustrate examples of n<N and t(i)<N. As illustrated in FIG. 11, $k_n$ is a wildcard character "*", and $k_{n+1}, \ldots, k_N$ and $x_{i,t(i)+1}, \ldots, x_{i,N}$ are null characters.

As illustrated in FIG. 12, $e_1=(1, 1, \ldots, 1, 0, 1, 1, \ldots, 1)$, $w=(0, 0, \ldots, 0, 1, 0, 0, \ldots, 0)$, $\mu_1=(1, 1, \ldots, 1, 1, 0, 0, \ldots, 0)$, $v_1=(0, 0, \ldots, 0, 1, 0, 0, \ldots, 0)$, and $y_1=(1, 1, \ldots, 1, 1, 1, 1, \ldots, 1)$ when $t(1)=n$ and $x_{1,j}=k_j$ is satisfied for $j=1, \ldots, n-1$. Therefore, $z_1=1$ is established.

As illustrated in FIG. 13, $e_3=(1, 1, \ldots, 1, 0, 1, 1, \ldots, 1)$, $w=(0, 0, \ldots, 0, 1, 0, 0, \ldots, 0)$, $\mu_3=(1, 1, \ldots, 1, 0, 0, 0, \ldots, 0)$, $v_3=(0, 0, \ldots, 0, 0, 0, 0, \ldots, 0)$, and $y_3=(1, 1, \ldots, 1, 0, 1, 1, \ldots, 1)$ when $t(3)=n-1$ and $x_{i,j}=k_j$ is satisfied for $j=1, \ldots, n-1$. Therefore, $z_3=0$ is established.

Characteristics of Present Embodiment

As described above, even when characters $x_{i,t(i)+1}, \ldots, x_{i,N}$ of the search target word $x_i$ are null characters and characters $k_{t(i)+1}, \ldots, k_N$ of the search word k may include a wildcard character, exact match search of concealed database can be performed while concealing the search word including the wildcard character, in the present embodiment. Further, match retrieval of concealed database can be performed with less communication volume than that of related art.

Third Embodiment

A third embodiment is a modification of the first embodiment. In the present embodiment, prefix search of concealed database is performed while concealing a search word including a wildcard character.

<Configuration>

As illustrated in FIG. 1, a retrieval system 3 according to the present embodiment includes a request device 11 which requests retrieval and retrieval devices 32-h which perform retrieval, and the retrieval system 3 performs retrieval processing based on secure computation. Here, h=1, ..., H and H is an integer which is 1 or greater. H≥2 is established when secure computation based on a secret sharing scheme is performed and H=1 is established when secure computation based on a homomorphic cryptosystem is performed.

As illustrated in FIG. 2, the retrieval device 32-h of the present embodiment includes a control unit 120-h, an equality determination unit 121-h, a wildcard determination unit 122-h, an OR operation unit 323-h, a null determination unit 325-h, an AND operation unit 127-n, a storage 128-h, an input unit 1291-h, and an output unit 1292-h. The retrieval device 32-h executes each processing under the control of the control unit 120-h. Further, data obtained in respective units are stored in the storage 128-h one by one and read out as needed to be used for other processing.

<Preprocessing>

Same as the first embodiment.

<Retrieval Processing>

Figure 14:
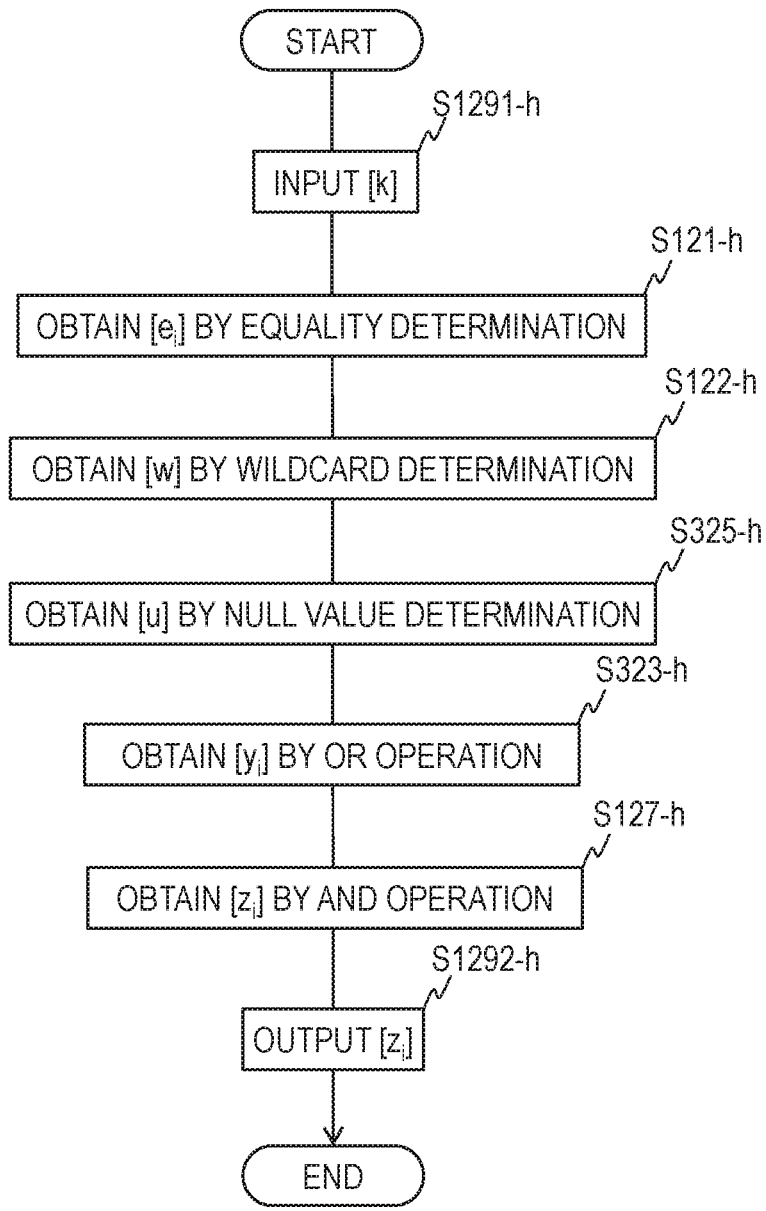
FIG. 14 is a flow diagram for explaining a retrieval method according to a third embodiment.

Retrieval processing of the present embodiment is described with reference to FIG. 14. The request device 11 conceals a search word $k=(k_1, \ldots, k_n, \ldots, k_N)$ including n pieces of characters $k_1, \ldots, k_n$ so as to obtain a concealed search word [k]. Here, n is a positive integer and n≤N. The characters $k_1, \ldots, k_n$ may include a wildcard character. When the search target word $x_i$ (here, i=1, ..., m) does not include any null characters, any character among the characters $k_1, \ldots, k_n$ may be a wildcard character. On the other hand, it is assumed that, when the search target word $x_i$ includes null characters $x_{i,t(i)+1}, \ldots, x_{i,N}$, $k_{t(i)+1}, \ldots, k_N$ do not include any wildcard characters in the present embodiment.

The request device 11 outputs the concealed search word [k]. The outputted concealed search word [k] is transmitted to the retrieval device 32-h via a network or the like. The concealed search word [k] is inputted into the input unit 1291-h of the retrieval device 32-h to be stored in the storage 128-h (step S1291-h). Subsequently, the following processing is executed for each i=1, ..., m.

First, the equality determination unit 121-h obtains a concealed operation result $[e_i]$, in which an operation result $e_i=(e_{i,1}, \ldots, e_{i,N})$ is concealed, by secure computation using the concealed search target word $[x_i]$ and the concealed search word [k], which are read from the storage 128-h, and outputs the concealed operation result $[e_i]$. Here, $e_{i,j}=a_1$ is established when $x_{i,j}$ is $k_j$ (when $x_{i,j}=k_j$) and $e_{i,j}=a_0$ is established when $x_{i,j}$ is not $k_j$ (when $x_{i,j}\neq k_j$). The concealed operation result $[e_i]$ is stored in the storage 128-h (step S121-h).

The wildcard determination unit 122-h obtains a concealed operation result [w], in which an operation result $w=(w_1, \ldots, w_N)$ is concealed, by secure computation using the concealed search word [k] read from the storage 128-h and outputs the concealed operation result [w]. Here, $w_j=b_1$ is established when $k_j$ is a wildcard character and $w_j=b_0$ is established when $k_j$ is not a wildcard character. The concealed operation result [w] is stored in the storage 128-h (step S122-h).

The null determination unit 325-h obtains a concealed operation result [u], in which an operation result $u=(u_1, \ldots, u_N)$ is concealed, by secure computation using the concealed search word [k], which is read from the storage 128-h, and outputs the concealed operation result [u]. Here, $u_j=c_1$ is established when $k_j$ is a null value and $u_j=c_0$ is established when $k_j$ is not a null value. $u_j \in \{c_0, c_1\}$, in which $c_0=0$ and $c_1=1$, for example. The null determination unit 325-h obtains the concealed operation result [u] by secure computation by using the concealed search word [k] and a concealed null character which is obtained by concealing a null character, for instance. As an example, the null determination unit 325-h performs equality determination between $[k_j]$ and the concealed null character for j=1, ..., N by secure computation, obtains $[u_j]$ in which $u_j$ is concealed, and obtains a set of $[u_1], \ldots, [u_N]$ as the concealed operation result [u]. Alternatively, the null determination unit 325-h may obtain the concealed operation result [u], in which $u_1, \ldots, u_N$ are collectively concealed, by secure computation using the concealed search word [k] and the concealed null character. The concealed operation result [u] is stored in the storage 128-h (step S325-h).

The OR operation unit 323-h obtains a concealed operation result $[y_i]$, in which an operation result $y_i=(y_{i,1}, \ldots, y_{i,N})$ is concealed, by secure computation using the concealed operation result $[e_i]$, the concealed operation result [w], and the concealed operation result [u], which are read from the storage 128-h, and outputs the concealed operation result $[y_i]$. Here, $y_{i,j}=d_1$ is established when at least any one of $e_{i,j}=a_1$, $w_j=b_1$, and $u_j=c_1$ is satisfied, and $y_{i,j}=d_0$ is established when all of $e_{i,j}=a_0$, $w_j=b_0$, and $u_j=c_0$ are satisfied. $y_{i,j} \in \{d_0, d_1\}$, in which $d_0=0$ and $d_1=1$, for example. When $a_0=0$, $a_1=1$, $b_0=0$, $b_1=1$, $c_0=0$, $c_1=1$, $d_0=0$, and $d_1=1$, $y_{i,j}=e_{i,j} \lor w_j \lor u_j$ is established, for example. For example, the OR operation unit 323-h performs an OR operation among $[e_{i,j}]$, $[w_j]$, and $[u_j]$ for $j=1, \ldots, N$ by secure computation, obtains which $[y_{i,j}]$ in which $y_{i,j}=e_{i,j} \vee w_j \vee u_j$ is concealed, and obtains a set of $[y_{i,1}], \ldots, [y_{i,N}]$ as the concealed operation result $[y_i]$. Alternatively, the OR operation unit 323-$h$ may obtain the concealed operation result $[y_i]$ in which $y_{i,1} \ldots, y_{i,N}$ are collectively concealed, by secure computation using the concealed operation result $[e_i]$, the concealed operation result $[w]$, and the concealed operation result $[u]$. The concealed operation result $[y_i]$ is stored in the storage 128-$h$ (step S323-$h$).

After that, the processing, which is described in the first embodiment, after step S127-$h$ is executed.

Specific Example

A specific example for the case where $a_0=0$, $a_1=1$, $b_0=0$, $b_1=1$, $c_0=0$, $c_1=1$, $d_0=0$, $d_1=1$, $g_0=0$, and $g_1=1$ is described below.

As illustrated in FIG. 15, $e_2=(1, 1, \ldots, 0, \ldots, 1, 0, 1, \ldots, 1)$, $w=(0, 0, \ldots, 1, \ldots, 0, 0, 0, \ldots, 0)$ $u=(0, 0, \ldots, 0, \ldots, 0, 1, 1, \ldots, 1)$ and $y_2=(1, 1, \ldots, 1, \ldots, 1, 1, 1, \ldots, 1)$ when $t(2) \leq n+1$ and $x_{1,j}=k_j$ is satisfied for $j=1, \ldots, n$. Therefore, $z_2=1$ is established.

As illustrated in FIG. 16, $e_3=(1, 1, \ldots, 0, \ldots, 0, 1, 1, \ldots, 1)$, $w=(0, 0, \ldots, 1, \ldots, 0, 0, 0, \ldots, 0)$, $u=(0, 0, \ldots, 0, \ldots, 0, 1, 1, \ldots, 1)$, and $y_3=(1, 1, \ldots, 1, \ldots, 0, 1, 1, \ldots, 1)$ when $t(3)=n-1$ and $x_{1,j}=k_j$ is satisfied for $j=1, \ldots, n-1$. Therefore, $z_3=0$ is established.

Characteristics of Present Embodiment

As described above, prefix search of concealed database can be performed while concealing a search word including a wildcard character, in the present embodiment. Further, match retrieval of concealed database can be performed with less communication volume than that of related art.

Fourth Embodiment

A fourth embodiment is a modification of the second and third embodiments. In the present embodiment, prefix search of concealed database is performed while concealing a search word including a wildcard character. When characters $x_{i,t(i)+1}, \ldots, x_{i,N}$ of the search target word $x_i$ are null characters and characters $k_{t(i)+1}, \ldots, k_N$ of the search word k may include a wildcard character, prefix search may not be able to be correctly performed by the method of the third embodiment, as is the case with the exact match search. The present embodiment describes a method for correctly performing prefix search in such a case.

<Configuration>

As illustrated in FIG. 1, a retrieval system 4 according to the present embodiment includes a request device 11 which requests retrieval and retrieval devices 42-$h$ which perform retrieval, and the retrieval system 4 performs retrieval processing based on secure computation. Here, $h=1, \ldots, H$ and H is an integer which is 1 or greater. $H \geq 2$ is established when secure computation based on a secret sharing scheme is performed and H=1 is established when secure computation based on a homomorphic cryptosystem is performed.

As illustrated in FIG. 2, the retrieval device 42-$h$ of the present embodiment includes a control unit 120-$h$, an equality determination unit 121-$h$, a wildcard determination unit 122-$h$, an OR operation unit 423-$h$, null determination units 224-$h$ and 325-$h$, AND operation units 127-$h$ and 226-$h$, a storage 128-$h$, an input unit 1291-$h$, and an output unit 1292-$h$. The retrieval device 42-$h$ executes each processing under the control of the control unit 120-$h$. Further, data obtained in respective units are stored in the storage 128-$h$ one by one and read out as needed to be used for other processing.

<Preprocessing>

Same as the first embodiment.

<Retrieval Processing>

Figure 17:
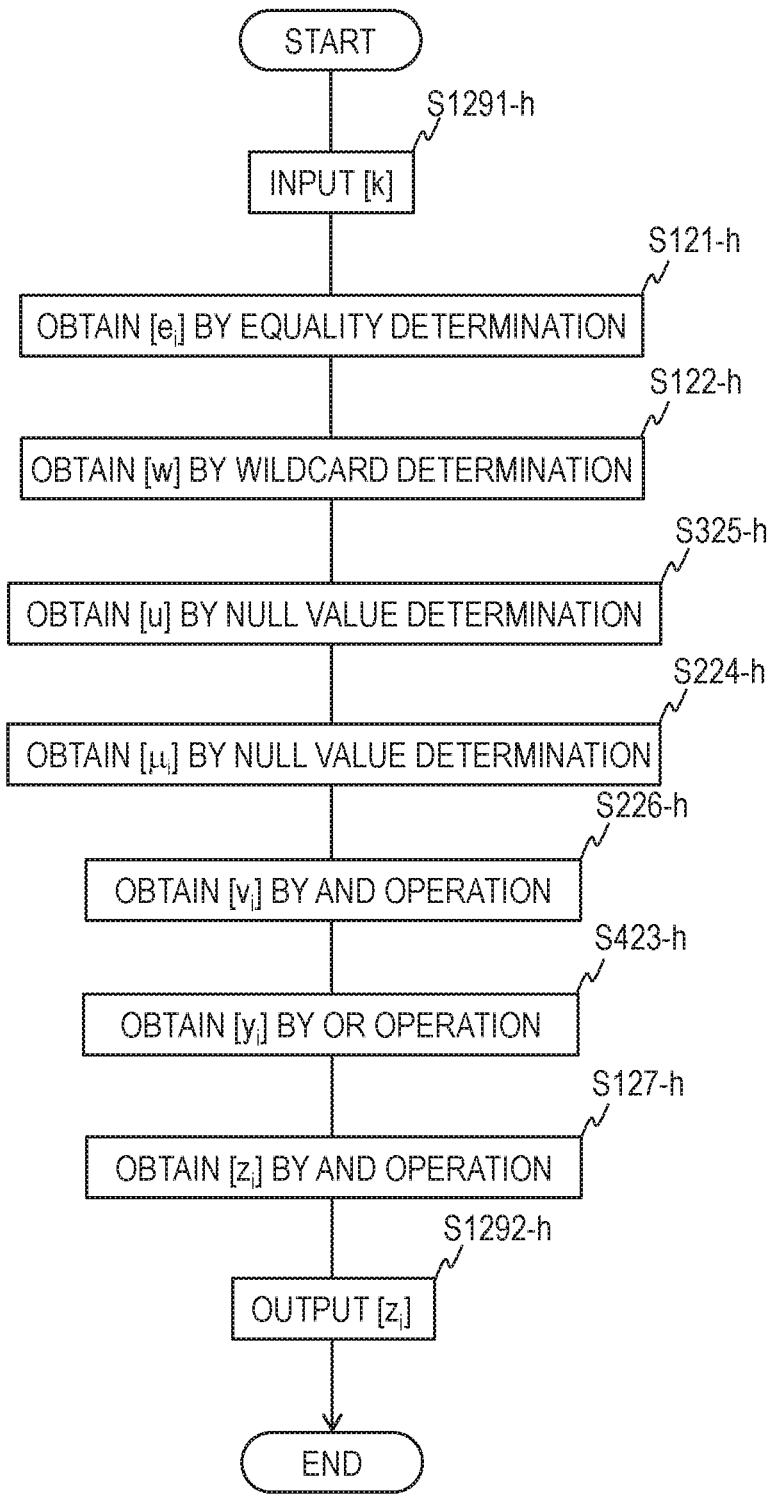
FIG. 17 is a flow diagram for explaining a retrieval method according to a fourth embodiment.

Retrieval processing of the present embodiment is described with reference to FIG. 17. The request device 11 conceals a search word $k=(k_1, \ldots, k_n, \ldots, k_N)$ including n pieces of characters $k_1, \ldots, k_n$ so as to obtain a concealed search word $[k]$. Here, n is a positive integer and $n \geq N$. The characters $k_1, \ldots, k_n$ may include a wildcard character. Different from the third embodiment, when the search target word $x_i$ includes null characters $x_{i,t(i)+1}, \ldots, x_{i,N}$, $k_{t(i)+1}, \ldots, k_N$ can include a wildcard character.

The request device 11 outputs the concealed search word $[k]$. The outputted concealed search word $[k]$ is transmitted to the retrieval device 42-$h$ via a network or the like. The concealed search word $[k]$ is inputted into the input unit 1291-$h$ of the retrieval device 42-$h$ to be stored in the storage 128-$h$ (step S1291-$h$). Subsequently, the following processing is executed for each $i=1, \ldots, m$.

First, the equality determination unit 121-$h$ obtains a concealed operation result $[e_i]$, in which an operation result $e_i=(e_{i,1}, \ldots, e_{i,N})$ is concealed, by secure computation using the concealed search target word $[x_i]$ and the concealed search word $[k]$, which are read from the storage 128-$h$, and outputs the concealed operation result $[e_i]$. Here, $e_{i,j}=a_1$ is established when $x_{i,j}$ is $k_j$ (when $x_{i,j}=k_j$) and $e_{i,j}=a_0$ is established when $x_{i,j}$ is not $k_j$ (when $x_{i,j} \neq k_j$). The concealed operation result $[e_i]$ is stored in the storage 128-$h$ (step S121-$h$).

The wildcard determination unit 122-$h$ obtains a concealed operation result $[w]$, in which an operation result $w=(w_1, \ldots, w_N)$ is concealed, by secure computation using the concealed search word $[k]$ read from the storage 128-$h$ and outputs the concealed operation result $[w]$. Here, $w_j=b_1$ is established when $k_j$ is a wildcard character and $w_j=b_0$ is established when $k_j$ is not a wildcard character. The concealed operation result $[w]$ s stored in the storage 128-$h$ (step S122-$h$).

The null determination unit 325-$h$ obtains a concealed operation result $[u]$, in which an operation result $u=(u_1, \ldots, u_N)$ is concealed, by secure computation using the concealed search word $[k]$, which is read from the storage 128-$h$, and outputs the concealed operation result $[u]$. Here, $u_j=c_1$ is established when $k_j$ is a null value and $u_j=c_0$ is established when $k_j$ is not a null value. The null determination unit 325-$h$ obtains the concealed operation result $[u]$ by secure computation by using the concealed search word $[k]$ and a concealed null character which is obtained by concealing a null character, for instance. The concealed operation result $[u]$ is stored in the storage 128-$h$ (step S325-$h$).

The null determination unit 224-$h$ obtains a concealed operation result $[\mu_i]$, in which an operation result $\mu_i=(\mu_{i,1}, \ldots, \mu_{i,N})$ is concealed, by secure computation using the concealed search target word $[x_i]$, which is read from the storage 128-$h$, and outputs the concealed operation result $[\mu_i]$. Here, $\mu_{i,j}=\theta_0$ is established when $x_{i,j}$ is a null character and $\mu_{i,j}=\theta_1$ is established when $x_{i,j}$ is not a null character. The concealed operation result $[\mu_i]$ is stored in the storage 128-$h$ (step S224-$h$).

The AND operation unit 226-$h$ obtains a concealed operation result $[v_i]$, in which an operation result $v_i=(v_{i,1}, \ldots, v_{i,N})$ is concealed, by secure computation using the concealed operation result [w] and the concealed operation result [$\mu_j$], which are read from the storage 128-$h$, and outputs the concealed operation result [$v_i$]. Here, $v_{i,j}=\rho_1$ is established when both of $w_j=b_1$ and $\mu_{i,j}=\theta_1$ are satisfied, and $v_{i,j}=\rho_0$ is established when at least one of $w_j=b_0$ and $\mu_{i,j}=\theta_0$ is satisfied. The concealed operation result [$v_i$] is stored in the storage 128-$h$ (step S226-$h$).

The OR operation unit 423-$h$ obtains a concealed operation result [$y_i$], in which an operation result $y_i=(y_{i,1}, \ldots, y_{i,N})$ is concealed, by secure computation using the concealed operation result [$e_i$], the concealed operation result [$u$], and the concealed operation result [$v_i$], which are read from the storage 128-$h$, and outputs the concealed operation result [$y_i$]. Here, $y_{i,j}=d_1$ is established when at least any one of $e_{i,j}=a_1$, $v_{i,j}=\rho_1$, and $u_j=c_1$ is satisfied, and $y_{i,j}=d_0$ is established when all of $e_{i,j}=a_0$, $v_{i,j}=\rho_0$, and $u_j=c_0$ are satisfied. $y_{i,j} \in \{d_0, d_1\}$, in which $d_0=0$ and $d_1=1$, for example. When $a_0=0$, $a_1=1$, $\rho_0=0$, $\rho_1=1$, $c_0=0$, $c_1=1$, $d_0=0$, and $d_1=1$, $y_{i,j}=e_{i,j} \vee v_{i,j} \vee u_j$ is established, for example. For example, the OR operation unit 423-$h$ performs an OR operation among [$e_{i,j}$], [$v_{i,j}$], and [$u_j$] for $j=1, \ldots, N$ by secure computation, obtains [$y_{i,j}$] in which $y_{i,j}=e_{i,j} \vee v_{i,j} \vee u_j$ is concealed, and obtains a set of [$y_{i,1}$], ..., [$y_{i,N}$] as the concealed operation result [$y_i$]. Alternatively, the OR operation unit 423-$h$ may obtain the concealed operation result [$y_i$] in which $y_{i,1} \ldots, y_{i,N}$ are collectively concealed, by secure computation using the concealed operation result [$e_i$], the concealed operation result [$v_i$], and the concealed operation result [$u$]. The concealed operation result [$y_i$] is stored in the storage 128-$h$ (step S423-$h$).

After that, the processing, which is described in the first embodiment, after step S127-$h$ is executed.

Specific Example

A specific example for the case where $a_0=0$, $a_1=1$, $b_0=0$, $b_1=1$, $c_0=0$, $c_1=1$, $d_0=0$, $d_1=1$, $\rho_0=0$, $\rho_1=1$, $g_0=0$, and $g_1=1$ is described below. FIG. 18 and FIG. 19 illustrate examples of n<N and t(i)≤N. $k_n$ is a wildcard character "*", and $k_{n+1}, \ldots, k_N$ and $x_{i,t(i)+1}, \ldots, x_{i,N}$ are null characters.

As illustrated in FIG. 18, $e_1=(1, 1, \ldots, 1, 0, 1, 1, \ldots, 1)$, w=0, ..., 0, 1, 0, 0, ..., 0), u=(0, 0, ..., 0, 1, 1, ..., 1), $\mu_1=(1, 1, \ldots, 1, 1, 0, 0, \ldots, 0)$, $v_1=(0, 0, \ldots, 0, 1, 0, 0, \ldots, 0)$, and $y_1=(1, 1, \ldots, 1, 1, 1, 1, \ldots, 1)$ when t(1)=n and $x_{1,j}=k_j$ is satisfied for $j=1, \ldots, n-1$. Therefore, $z_1=1$ is established.

As illustrated in FIG. 19, $e_3=(1, 1, \ldots, 1, 0, 1, 1, \ldots, 1)$, w=(0, 0, ..., 0, 1, 0, 0, ..., 0), u=(0, 0, ..., 0, 0, 1, 1, ..., 1), $\mu_3=(1, 1, \ldots, 1, 0, 0, 0, \ldots, 0)$, $v_3=(0, 0, \ldots, 0, 0, 0, 0, \ldots, 0)$, and $y_3=(1, 1, \ldots, 1, 0, 1, 1, \ldots, 1)$ when t(3)=n−1 and $x_{1,j}=k_j$ is satisfied for $j=1, \ldots, n-1$. Therefore, $z_3=0$ is established.

Characteristics of Present Embodiment

As described above, even when characters $x_{i,t(i)+1}, \ldots, x_{i,N}$ of the search target word $x_i$ are null characters and characters $k_{t(i)+1}, \ldots, k_N$ of the search word k may include a wildcard character, prefix search of concealed database can be performed while concealing the search word including the wildcard character, in the present embodiment. Further, match retrieval of concealed database can be performed with less communication volume than that of related art.

Fifth Embodiment

A fifth embodiment is a modification of the first and second embodiments. It is assumed that the length of a concealed search target word and the length of a concealed search word are the same as each other, in the first and second embodiments. On the other hand, exact match search can be performed irrespective of whether or not the length of a concealed and the length of a concealed retrieval word are the same as each other, in the present embodiment.

<Configuration>

As illustrated in FIG. 1, a retrieval system 5 according to the present embodiment includes a request device 11 which requests retrieval and retrieval devices 52-$h$ which perform retrieval, and the retrieval system 5 performs retrieval processing based on secure computation. Here, h=1, ..., H and H is an integer which is 1 or greater. H≥2 is established when secure computation based on a secret sharing scheme is performed and H=1 is established when secure computation based on a homomorphic cryptosystem is performed.

As illustrated in FIG. 2, the retrieval device 52-$h$ of the present embodiment includes a control unit 120-$h$, an equality determination unit 521-$h$, a wildcard determination unit 522-$h$, an OR operation unit 523-$h$, null determination units 524-$h$ and 525-$h$, an AND operation unit 527$h$, a concatenation unit 528-$h$, a storage 128-$h$, an input unit 1291-$h$, and an output unit 1292-$h$. The retrieval device 52-$h$ executes each processing under the control of the control unit 120-$h$. Further, data obtained in respective units are stored in the storage 128-$h$ one by one and read out as needed to be used for other processing.

<Preprocessing>

Figure 21:
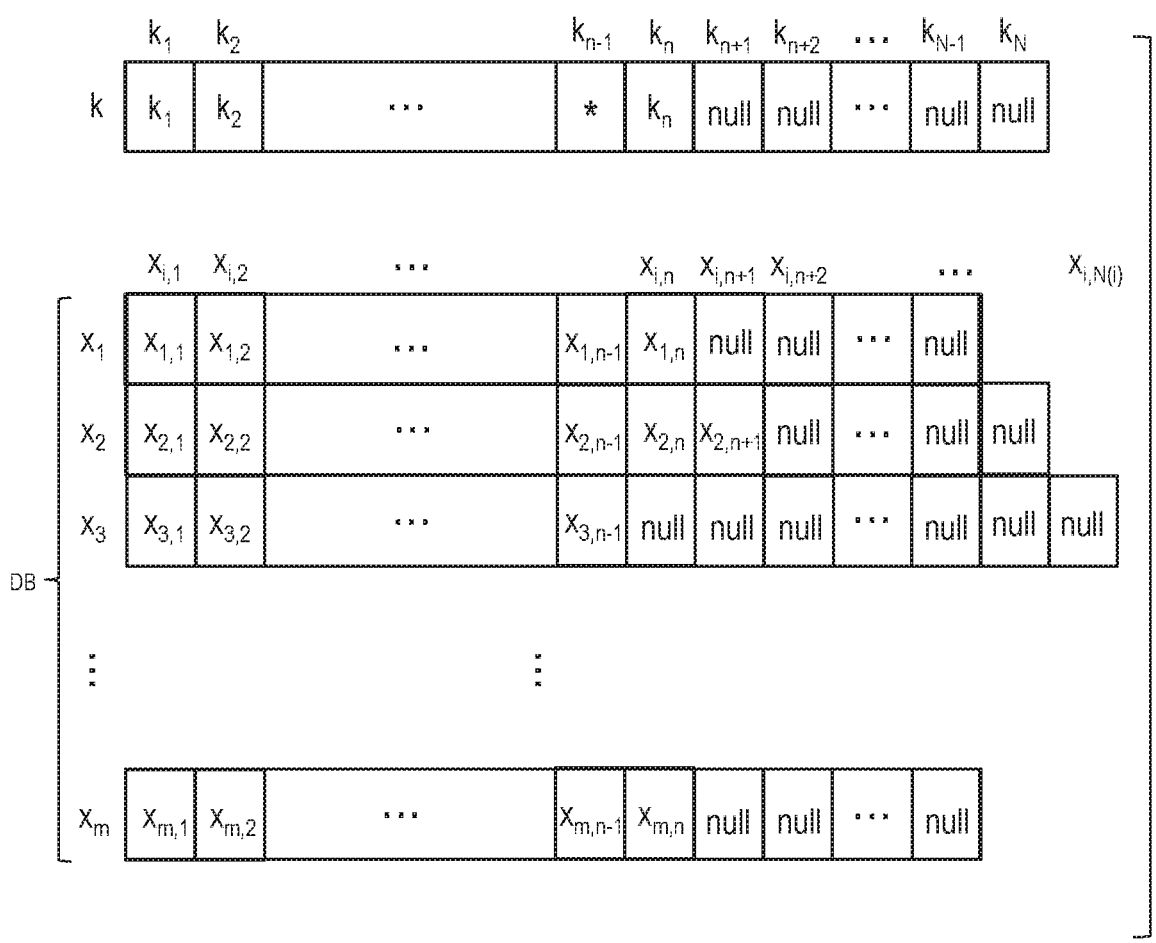
FIG. 21 is a conceptual diagram for explaining the retrieval method according to the fifth embodiment.

The storage 128-$h$ stores concealed database [$x_1$], ..., [$x_m$] including a concealed retrieval target word [$x_i$] in which a search target word $x_i=(x_{i,1}, \ldots, x_{i,t(i)}, \ldots, x_{i,N(i)})$ (See DB in FIG. 21, for example) including t(i) pieces of characters $x_{i,1}, \ldots, x_{i,t(i)}$ is concealed. Here, m, t(i), and N(i) are positive integers, i=1, ..., m, j(i)=1, ..., N(i), and t(i)≤N(i). t(i) pieces of characters $x_{i,1}, \ldots, x_{i,t(i)}$ included in the search target word $x_i$ are normal characters which are retrieval targets. On the other hand, the remaining N(i)−t(i) pieces of characters $x_{i,t(i)+1}, \ldots, x_{i,N(i)}$ included in the search target word $x_i$ are null characters. A set of concealed values [$x_{i,1}$], ..., [$x_{i,t(i)}$], ..., [$x_{i,N(i)}$] obtained by separately concealing respective characters $x_{i,1}, \ldots, x_{i,t(i)}, \ldots, x_{i,N(i)}$ may be defined as the concealed search target word [$x_i$] or N(i) pieces of characters $x_{i,1}, \ldots, x_{i,t(i)}, \ldots, x_{i,N(i)}$ may be collectively concealed to be defined as the concealed search target word [$x_i$]. Other matters are the same as those described in the first embodiment.

<Retrieval Processing>

Figure 20:
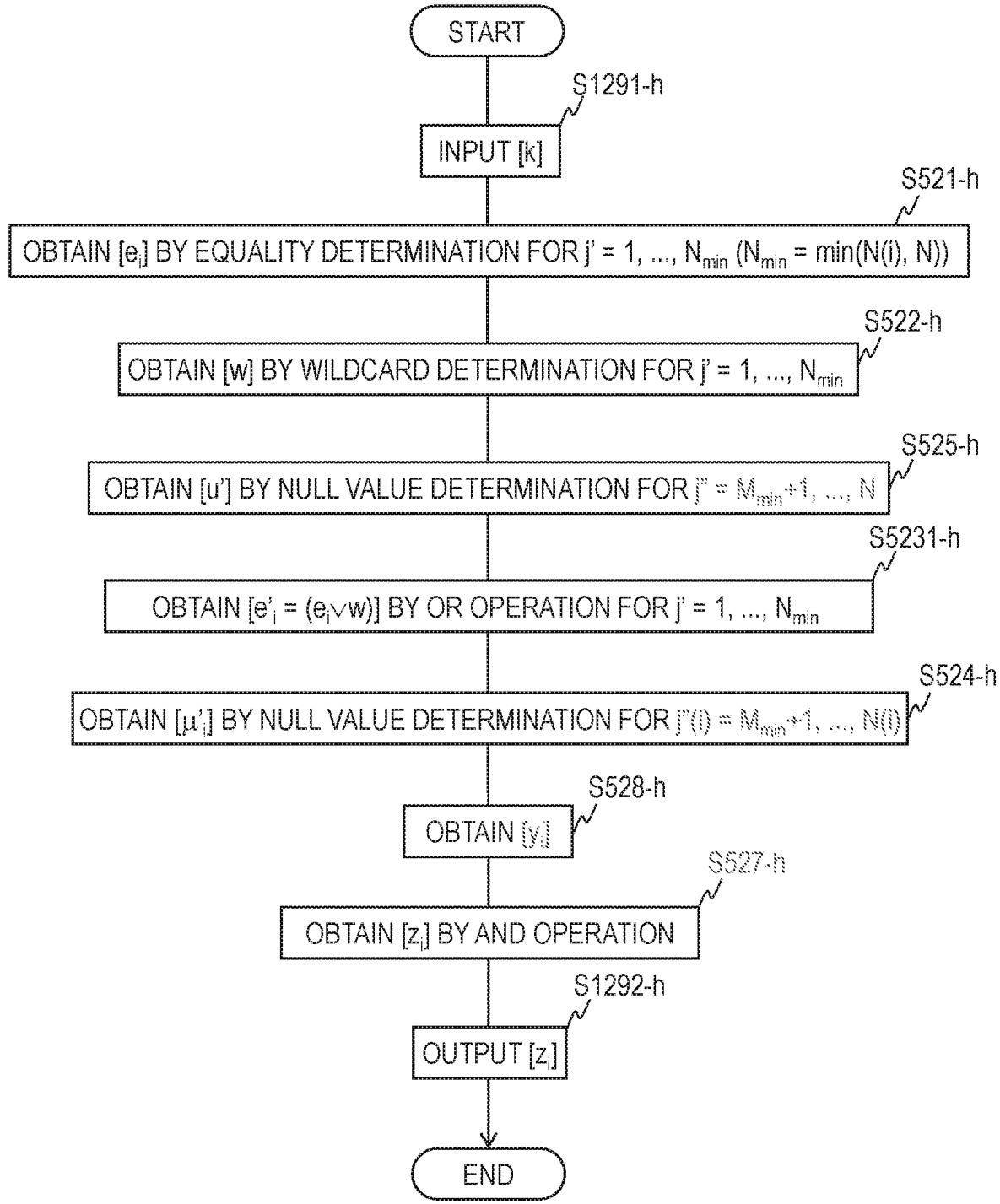
FIG. 20 is a flow diagram for explaining a retrieval method according to a fifth embodiment.

Retrieval processing of the present embodiment is described with reference to FIG. 20. The request device 11 conceals a search word $k=(k_1, \ldots, k_n, \ldots, k_N)$ including n pieces of characters $k_1, \ldots, k_n$ so as to obtain a concealed search word [k]. Here, j=1, ..., N, n is a positive integer, and n≤N. The characters $k_1, \ldots, k_n$ may include a wildcard character. When the search target word $x_i$ includes null characters $x_{i,t(i)+1}, \ldots, x_{i,N(i)}$, $k_{t(i)+1}, \ldots, k_N$ can include a wildcard character. n and N are positive integers and n≤N. $M_{min}=N$ is established when N≤N(i), and $M_{min}=N(i)$ is established when N>N(i). Such $M_{min}$ is expressed as $M_{min}=\min(N(i), N)$. Further, $N_{max}=N(i)$ is established when N≤N(i), and $N_{max}=N$ is established when N>N(i). Such $M_{max}$ is expressed as $M_{max}=\max(N(i), N)$. Due to the limit of notation, $N_{min}$ is sometimes written as "Nmin", and $N_{max}$ is sometimes written as "Nmax". j"=$M_{min}+1, \ldots, N$ and j"(i)=$M_{min}+1, \ldots, N(i)$. However, j" is nil when $M_{min}+1 \geq N$ and j"(i) is nil when $M_{min}+1 \geq N(i)$. As described above, a set of concealed values [$k_1$], ..., [$k_n$], ..., [$k_N$] Obtained by separately concealing respective characters $k_1, \ldots,$ $k_n, \ldots, k_N$ may be defined as the concealed search word $[k]$ or N pieces of characters $k_1, \ldots, k_n, \ldots, k_N$ may be collectively concealed to be defined as the concealed search word $[k]$.

The request device 11 outputs the concealed search word $[k]$. The outputted concealed search word $[k]$ is transmitted to the retrieval device 52-$h$ via a network or the like. The concealed search word $[k]$ is inputted into the input unit 1291-$h$ of the retrieval device 52-$h$ to be stored in the storage 128-$h$ (step S1291-$h$). Subsequently, the following processing is executed for each i=1, . . . , m.

First, the equality determination unit 521-$h$ obtains a concealed operation result $[e_i]$, in which an operation result $e_i = (e_{i,1}, \ldots, e_{i,Nmin})$ is concealed, by secure computation using the concealed search target word $[x_i]$ and the concealed search word $[k]$, which are read from the storage 128-$h$, and outputs the concealed operation result $[e_i]$. Here, $e_{i,j'} = a_1$ is established when $x_{i,j'}$ is $k_{j'}$ and $e_{i,j'} = a_0$ is established when $x_{i,j'}$ is not $k_{j'}$ for j'=1, . . . , $N_{min}$. $e_{i,j'} \in \{a_0, a_1\}$, in which $a_0 = 0$ and $a_1 = 1$, for example. For example, the equality determination unit 521-$h$ performs equality determination between $[k_{j'}]$ and $[x_{i,j'}]$ for j'=1, . . . , $N_{min}$ by secure computation, obtains $[e_{i,j'}]$ in which $e_{i,j'}$ is concealed, and obtains a set of $[e_{i,1}], \ldots, [e_{i,Nmin}]$ as the concealed operation result $[e_i]$. Alternatively, the equality determination unit 521-$h$ may obtain the concealed operation result $[e_i]$ in which $e_{i,1}, \ldots, e_{i,Nmin}$ are collectively concealed, by secure computation using the concealed search target word $[x_i]$ and the concealed search word $[k]$. The concealed operation result $[e_i]$ is stored in the storage 128-$h$ (step S521-$h$).

The wildcard determination unit 522-$h$ obtains a concealed operation result $[w]$, in which an operation result $w = (w_1, \ldots, w_{Nmin})$ is concealed, by secure computation using the concealed search word $[k]$ read from the storage 128-$h$ and outputs the concealed operation result $[w]$. Here, $w_{j'} = b_1$ is established when $k_{j'}$ is a wildcard character and $w_{j'} = b_0$ is established when $k_{j'}$ is not a wildcard character for j'=1, . . . , $N_{min}$. The wildcard determination unit 522-$h$ obtains the concealed operation result $[w]$ by secure computation by using the concealed search word $[k]$ and a concealed wildcard character which is obtained by concealing a wildcard character, for instance. As an example, the wildcard determination unit 522-$h$ performs equality determination between $[k_{j'}]$ and the concealed wildcard character for j'=1, . . . , $N_{min}$ by secure computation, obtains $[w_{j'}]$ in which $w_{j'}$ is concealed, and obtains a set of $[w_1], \ldots, [w_{Nmin}]$ as the concealed operation result $[w]$. Alternatively, the wildcard determination unit 522-$h$ may obtain the concealed operation result $[w]$ in which $w_1, \ldots, w_{Nmin}$ are collectively concealed, by secure computation using the concealed search word $[k]$ and the concealed wildcard character. The concealed operation result $[w]$ is stored in the storage 128-$h$ (step S522-$h$).

The null determination unit 525-$h$ obtains a concealed operation result $[u']$, in which operation results $u'_{Mmin+1}, \ldots, u'_N$ are concealed, by secure computation using at least a part of the concealed search word $[k]$, which is read from the storage 128-$h$, and outputs the concealed operation result $[u']$. Here, $u'_{j''} = c_1$ is established when $k_{j''}$ is a null character and $u'_{j''} = c_0$ is established when $k_{j''}$ is not a null character for j''=$M_{min}$+1, . . . , N. $u'_{j''} \in \{c_0, c_1\}$, in which $c_0 = 0$ and $c_1 = 1$, for example. The null determination unit 525-$h$ obtains the concealed operation result $[u']$ by secure computation by using at least a part of the concealed search word $[k]$ and a concealed null character which is obtained by concealing a null character, for instance. As an example, the null determination unit 525-$h$ performs equality determination between $[k_{j''}]$ and the concealed null character for j''=$M_{min}$+1, . . . , N by secure computation, obtains $[u'_{j''}]$ in which $u'_{j''}$ is concealed, and obtains a set of $[u'_{Mmin+1}], \ldots, [u'_N]$ as the concealed operation result $[u']$. Alternatively, the null determination unit 525-$h$ may obtain the concealed operation result $[u']$ in which $u'_{Mmin+1}, \ldots, u'_N$ are collectively concealed, by secure computation using the concealed search word $[k]$ and the concealed null character. The concealed operation result $[u']$ is stored in the storage 128-$h$ (step S525-$h$). Here, the processing of step S525-$h$ is not executed when $M_{min}+1 \geq N$.

The OR operation unit 523-$h$ obtains a concealed operation result $[e'_i]$, in which an operation result $e'_i = (e'_{i,1}, \ldots, e'_{i,Nmin})$ is concealed, by secure computation using the concealed operation result $[e_i]$ and the concealed operation result $[w]$, which are read from the storage 128-$h$, and outputs the concealed operation result $[e'_i]$. Here, $e'_{i,j'} = d_1$ is established when at least one of $e_{i,j'} = a_1$ and $w_{j'} = b_1$ is satisfied and $e'_{i,j'} = d_0$ is established when both of $e_{i,j'} = a_0$ and $w_{j'} = b_0$ are satisfied for j'1, . . . , $N_{min}$. $e'_{i,j'} \in \{d_0, d_1\}$, in which $d_0 = 0$ and $d_1 = 1$, for example. When $a_0 = 0$, $a_1 = 1$, $b_0 = 0$, $b_1 = 1$, $d_0 = 0$, and $d_1 = 1$, $e'_{i,j'} = e_{i,j'} \lor w_{j'}$ is established, for example. For example, the OR operation unit 523-$h$ performs an OR operation between $[e_{i,j'}]$ and $[w_{j'}]$ for j'=1, . . . , $N_{min}$ by secure computation, obtains $[e'_{i,j'}]$ in which $e'_{i,j'} = e_{i,j'} \lor w_{j'}$ is concealed, and obtains a set of $[e'_{i,1}], \ldots, [e'_{i,Nmin}]$ as the concealed operation result $[e'_i]$. Alternatively, the OR operation unit 523-$h$ may obtain the concealed operation result $[e'_i]$ in which $e'_{i,1}, \ldots, e'_{i,Nmin}$ are collectively concealed, by secure computation using the concealed operation result $[e_i]$ and the concealed operation result $[w]$. The concealed operation result $[e'_i]$ is stored in the storage 128-$h$ (step S5231-$h$).

The null determination unit 524-$h$ obtains a concealed operation result $[\mu'_i]$, in which an operation result $\mu'_i = (\mu'_{i,Mmin+1}, \ldots, \mu'_{i,N(i)})$ is concealed, by secure computation using at least a part of the concealed search target word $[x_i]$, which is read from the storage 128-$h$, and outputs the concealed operation result $[\mu'_i]$. Here, $\mu'_{i,j''(i)} = d_1$ is established when $x_{i,j''(i)}$ is a null character and $\mu'_{i,j''(i)} = d_0$ is established when $x_{i,j''(i)}$ is not a null character for j''(i)=$M_{min}$+1, . . . , N(i). $\mu'_{i,j''(i)} \in \{d_0, d_1\}$, in which $d_0 = 0$ and $d_1 = 1$, for example. The null determination unit 524-$h$ obtains the concealed operation result $[\mu'_i]$ by secure computation by using at least a part of the concealed search target word $[x_i]$ and a concealed null character which is obtained by concealing a null character. As an example, the null determination unit 524-$h$ performs equality determination between $[x_{i,j''(i)}]$ and the concealed null character for j''(i)=$M_{min}$+1, . . . , N(i) by secure computation, obtains $[\mu'_{i,j''(i)}]$ in which $\mu'_{i,j''(i)}$ is concealed, and obtains a set of $[\mu'_{i,Mmin+1}], \ldots, [\mu'_{i,N(i)}]$ as the concealed operation result $[\mu'_i]$. Alternatively, the null determination unit 524-$h$ may obtain the concealed operation result in which $[\mu'_i]$ in which $\mu'_{i,Mmin+1}, \ldots, \mu'_{i,N(i)}$ are collectively concealed, by secure computation using the concealed search target word $[x_i]$ and the concealed null character. The concealed operation result $[\mu'_i]$ is stored in the storage 128-$h$ (step S524-$h$). Here, the processing of step S524-$h$ is not executed when $M_{min}+1 \geq N$(i).

The concatenation unit 528-$h$ obtains a concealed operation result $[y_i]$, in which an operation result $y_i$ is concealed, by secure computation using at least the concealed operation result $[e'_i]$ and outputs the concealed operation result $[y_i]$. When N=N(i), the concatenation unit 528-$h$ outputs the concealed operation result $[e'_i]$ as the concealed operation result $[y_i]$. When $N>N(i)$, the concatenation unit 528-$h$ obtains the concealed operation result $[y_i]$, in which an operation result $y_i=(y_{i,1}, \ldots, y_{i,N})=(e'_{i,1}, \ldots, e'_{i,N(i)}, u'_{N(i)+1}, \ldots, u'_N)$ is concealed, by secure computation using the concealed operation result $[u']$ and the concealed operation result $[e'_i]$ and outputs the concealed operation result $[y_i]$. When $N<N(i)$, the concatenation unit 528-$h$ obtains the concealed operation result $[y_i]$, in which an operation result $y_i=(y_{i,1}, \ldots, y_{i,N(i)})=(e'_{i,1}, \ldots, e'_{i,N}, \mu'_{i,N+1}, \ldots, \mu'_{i,N(i)})$ is concealed, by secure computation using the concealed operation result $[e'_i]$ and the concealed operation result $[\mu'_i]$ and outputs the concealed operation result $[y_i]$. $[y_i]$ may be a set of concealed results obtained by concealing respective elements of $y_i$ or may be obtained by collectively concealing all elements of $y_i$. The concealed operation result $[y_i]$ is stored in the storage 128-$h$ (step S528-$h$).

The AND operation unit 527-$h$ obtains a concealed match determination result $[z_i]$ in which a match determination result $z_i$ is concealed, by secure computation using the concealed operation result $[y_i]$ read from the storage 128-$h$, and outputs the concealed match determination result $[z_i]$. Here, $z_i=g_1$ is established when $y_{i,1}= \ldots =y_{i,Nmax}=d_1$ is satisfied and $z_i=g_0$ is established when $y_{i,1}= \ldots =y_{i,Nmax}=d_1$ is not satisfied. $z_i \in \{g_0, g_1\}$, in which $g_0=0$ and $g_1=1$, for example. When $d_0=0$, $d_1=1$, $g_0=0$, and $g_1=1$, $z_i=y_{i,1} \vee \ldots \vee y_{i,Nmax}$ is established, for example. The concealed match determination result $[z_i]$ is stored in the storage 128-$h$ (step S527-$h$).

After that, the processing of step S1292-$h$, which is described in the first embodiment, is executed.

Specific Example

The followings are obtained when processing of the present embodiment is described in a separate manner to the case of $N=N(i)$, the case of $N>N(i)$, and the case of $N<N(i)$.

<<Case of $N=N(i)$>> m, n, t(i), N, and N(i) are positive integers, i=1, ..., m, j=1, ..., N, j(i)=1, ..., N(i), n≤N, and t(i)≤N(i). The equality determination unit 521-$h$ obtains a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, by secure computation using the concealed search target word $[x_i]$ and the concealed search word $[k]$ and outputs the concealed operation result $[e_i]$. The wildcard determination unit 522-$h$ obtains a concealed operation result $[w]$ in which an operation result $w=(w_1, \ldots, w_N)$ is concealed, the operation result $w$ in which $w_j=b_1$ is established when $k_j$ is a wildcard character and $w_j=b_0$ is established when $k_j$ is not a wildcard character, by secure computation using the concealed search word $[k]$ and outputs the concealed operation result $[w]$. The OR operation unit 523-$h$ obtains a concealed operation result $[y_i]=[e'_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w_j=b_1$ is satisfied and $y_{i,j}=d_0$ is established when both of $e_{i,j}=a_0$ and $w_j=b_0$ are satisfied, by secure computation using the concealed operation result $[e_i]$ and the concealed operation result $[w]$ and outputs the concealed operation result $[y_i]=[e'_i]$. For example, as illustrated in FIG. 23, when $a_0=0$, $a_1=1$, $b_0=0$, $b_1=1$, $d_0=0$, $d_1=1$, $g_0=0$, $g_1=1$, $k_{n-1}$ is a wildcard character "*", and $x_{2,j}=k_j$ is satisfied for j=1, ..., n-2, n, $e_2=(1, 1, \ldots, 1, 0, 1, 0, 1, \ldots, 1)$, $w=(0, 0, \ldots, 0, 1, 0, 0, 0, \ldots, 0)$, and $y_2=e'_2=(1, 1, \ldots, 1, 1, 1, 0, 1, \ldots, 1)$. Therefore, $z_2=0$ is established.

<<Case of $N>N(i)$>> m, n, t(i), N, and N(i) are positive integers, i=1, ..., m, j=1, ..., N, j(i)=1, ..., N(i), j''(i)=N(i)+1, ..., N, n≤N, and t(i)≤N(i). The equality determination unit 521-$h$ obtains a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, by secure computation using the concealed search target word $[x_i]$ and the concealed search word $[k]$ and outputs the concealed operation result $[e_i]$. The wildcard determination unit 522-$h$ obtains a concealed operation result $[w]$ in which an operation result $w=(w_1, \ldots, w_{N(i)})$ is concealed, the operation result $w$ in which $w_{j(i)}=b_1$ is established when $k_{j(i)}$ is a wildcard character and $w_{j(i)}=b_0$ is established when $k_{j(i)}$ is not a wildcard character, by secure computation using the concealed search word $[k]$ and outputs the concealed operation result $[w]$. The null determination unit 525-$h$ (first null determination unit) obtains a concealed operation result $[u']$ in which operation results $u'_{N(i)+1}, \ldots, u'_N$ are concealed, the operation results $u'_{N(i)+1}, \ldots, u'_N$ in which $u'_{j''(i)}=c_1$ is established when $k_{j''(i)}$ is a null character and $u'_{j''(i)}=c_0$ is established when $k_{j''(i)}$ is not a null character, by secure computation using at least a part of the concealed search word $[k]$ and outputs the concealed operation result $[u']$. The OR operation unit 523-$h$ obtains a concealed operation result $[e'_i]$ in which an operation result $e'_i=(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w_{j(i)}=b_1$ is satisfied and $e'_{i,j(i)}=d_0$ is established when both of $e_{i,j(i)}=a_0$ and $w_{j(i)}=b_0$ are satisfied, by secure computation using the concealed operation result $[e_i]$ and the concealed operation result $[w]$ and outputs the concealed operation result $[e'_i]$. The concatenation unit 528-$h$ obtains a concealed operation result $[y_i]$ in which an operation result $y_i=(y_{i,1}, \ldots, y_{i,N})=(e'_{i,1}, \ldots, e'_{i,N(i)}, u'_{N(i)+1}, \ldots, u'_N)$ is concealed, by secure computation using the concealed operation result $[u']$ and the concealed operation result $[e'_i]$ and outputs the concealed operation result $[y_i]$. For example, as illustrated in FIG. 22, when $a_0=0$, $a_1=1$, $b_0=0$, $b_1=1$, $d_0=0$, $d_1=1$, $g_0=0$, $g_1=1$, $k_{n-1}$ is a wildcard character "*", and $x_{1,j}=k_j$ is satisfied for j=1, ..., n-2, n, $e_1=(1, 1, \ldots, 0, 1, 1, 1, \ldots, 1)$, $w=(0, 0, \ldots, 0, 1, 0, 0, 0, \ldots, 0)$, $e'_1=(1, 1, \ldots, 1, 1, 1, 1, 1, \ldots, 1)$, and $y_1=(1, 1, \ldots, 1, 1, 1, 1, 1, \ldots, 1, 1)$. Therefore, $z_1=1$ is established.

<<Case of $N<N(i)$>> m, n, t(i), N, and N(i) are positive integers, N<N(i), i=1, ..., m, j=1, ..., N, j(i)=1, ..., N(i), n≤N, t(i)≤N(i), and j''(i)=N+1, ..., N(i). The equality determination unit 521-$h$ obtains a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, by secure computation using the concealed search target word $[x_i]$ and the concealed search word $[k]$ and outputs the concealed operation result $[e_i]$. The wildcard determination unit 522-$h$ obtains a concealed operation result $[w]$ in which an operation result $w=(w_1, \ldots, w_N)$ is concealed, the operation result $w$ in which $w_j=b_1$ is established when $k_j$ is a wildcard character and $w_j=b_0$ is established when $k_j$ is not a wildcard character, by secure computation using the concealed search word $[k]$ and outputs the concealed operation result $[w]$. The OR operation unit 523-$h$ obtains a concealed operation result $[e'_i]$ in which an operation result $e'_i=(e'_{i,1}, \ldots, e'_{i,N})$ is concealed, the operation result $e'_i$ in which $e'_{i,j}=d_1$ is established when at least one of $e_{i,j}=a_1$ and $w_j=b_1$ is satisfied and $e'_{i,j}=d_0$ is established when both of $e_{i,j}=a_0$ and $w_j=b_0$ are satisfied, by secure computation using the concealed operation result $[e_i]$ and the concealed operation result $[w]$ and outputs the concealed operation result $[e'_i]$. The null determination unit 524-$h$ (second null determination unit) obtains a concealed operation result $[\mu'_i]$ in which an operation result $\mu'_i=(\mu'_{i,N+1}, \ldots, \mu'_{i,N(i)})$ is concealed, the operation result $\mu'_i$ in which $\mu'_{i,j''(i)}=d_1$ is established when $x_{i,j''(i)}$ is a null character and $\mu'_{i,j''(i)}=d_0$ is established when $x_{i,j''(i)}$ is not a null character, by secure computation using at least a part of the concealed search target word $[x_i]$ and outputs the concealed operation result $[\mu'_i]$. The concatenation unit 528-$h$ obtains a concealed operation result $[y_i]$ in which an operation result $y_i=(y_{i,1}, \ldots, y_{i,N(i)})=(e'_{i,1}, \ldots, e'_{i,N}, u'_{i,N+1}, \ldots, \mu'_{i,N(i)})$ is concealed, by secure computation using the concealed operation result $[e'_i]$ and the concealed operation result $[\mu'_i]$ and outputs the concealed operation result $[y_i]$. For example, as illustrated in FIG. 24, when $a_0=0$, $a_1=1$, $b_0=0$, $b_1=1$, $d_0=0$, $d_1=1$, $g_0=0$, $g_1=1$, $k_{n-1}$ is a wildcard character "*", and $x_{3,j}=k_j$ is satisfied for $j=1, \ldots, n-2, n$, $e_3=(1, 1, \ldots, 1, 0, 0, 1, 1, \ldots, 1)$, $w=(0, 0, \ldots, 0, 1, 0, 0, 0, \ldots, 0)$, $e'_3=(1, 1, \ldots, 1, 1, 0, 1, 1, \ldots, 1)$, and $y_3=(1, 1, \ldots, 1, 1, 0, 1, 1, \ldots, 1, 1)$. Therefore, $z_3=0$ is established.

Characteristics of Present Embodiment

As described above, even when the search word k may include a wildcard character or even when at least one of the search word k and the search target word $x_i$ may include a null character, exact match search of concealed database can be performed while concealing the search word including the wildcard character, in the present embodiment. Further, exact match search can be performed irrespective of whether or not the length of the concealed search target word and the length of the concealed search word are the same as each other, in the present embodiment. Furthermore, match retrieval of concealed database can be performed with less communication volume than that of related art.

Sixth Embodiment

A sixth embodiment is a modification of the third and fourth embodiments. It is assumed that the length of a concealed search target word and the length of a concealed search word are the same as each other, in the third and fourth embodiments. On the other hand, prefix search can be performed irrespective of whether or not the length of a concealed search target word and the length of a concealed search word are the same as each other, in the present embodiment.

<Configuration>

As illustrated in FIG. 1, a retrieval system 6 according to the present embodiment includes a request device 11 which requests retrieval and retrieval devices 62-$h$ which perform retrieval, and the retrieval system 6 performs retrieval processing based on secure computation. Here, $h=1, \ldots, H$ and H is an integer which is 1 or greater. $H \geq 2$ is established when secure computation based on a secret sharing scheme is performed and $H=1$ is established when secure computation based on a homomorphic cryptosystem is performed.

As illustrated in FIG. 2, the retrieval device 62-$h$ of the present embodiment includes a control unit 120-$h$, an equality determination unit 521-$h$, a wildcard determination unit 522-$h$, an OR operation unit 623-$h$, a null determination unit 625-$h$, an AND operation unit 527-$h$, a concatenation unit 628-$h$, a storage 128-$h$, an input unit 1291-$h$, and an output unit 1292-$h$. The retrieval device 62-$h$ executes each processing under the control of the control unit 120-$h$. Further, data obtained in respective units are stored in the storage 128-$h$ one by one and read out as needed to be used for other processing.

<Preprocessing>

Same as the fifth embodiment.

<Retrieval Processing>

Figure 25:
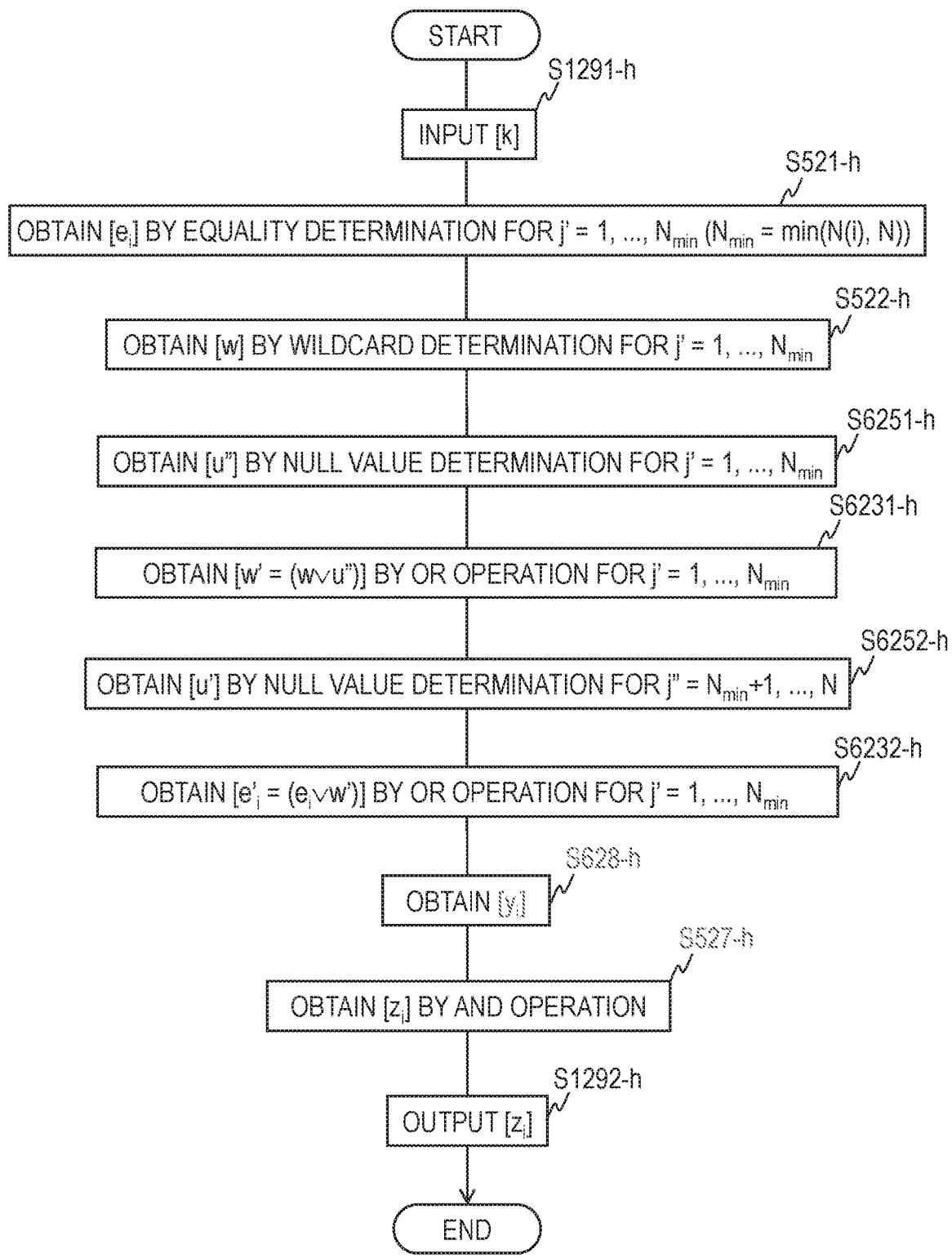
FIG. 25 is a flow diagram for explaining a retrieval method according to a sixth embodiment.

Retrieval processing of the present embodiment is described with reference to FIG. 25. The request device 11 conceals a search word $k=(k_1, \ldots, k_n, \ldots, k_N)$ including n pieces of characters $k_1, \ldots, k_n$ so as to obtain a concealed search word $[k]$. The request device 11 outputs the concealed search word $[k]$. The outputted concealed search word $[k]$ is transmitted to the retrieval device 62-$h$ via a network or the like. The concealed search word $[k]$ is inputted into the input unit 1291-$h$ of the retrieval device 62-$h$ to be stored in the storage 128-$h$ (step S1291-$h$). Subsequently, the following processing is executed for each $i=1, \ldots, m$.

First, the equality determination unit 521-$h$ obtains a concealed operation result $[e_i]$, in which an operation result $e_i=(e_{i,1}, \ldots, e_{i,Nmin})$ is concealed, by secure computation using the concealed search target word $[x_i]$ and the concealed search word $[k]$, which are read from the storage 128-$h$, and outputs the concealed operation result $[e_i]$. Here, $e_{i,j'}=a_1$ is established when $x_{i,j'}$ is $k_{j'}$ and $e_{i,j'}=a_0$ is established when $x_{i,j'}$ is not $k_{j'}$ for $j'=1, \ldots, N_{min}$. The concealed operation result $[e_i]$ is stored in the storage 128-$h$ (step S521-$h$).

The wildcard determination unit 522-$h$ obtains a concealed operation result $[w]$, in which an operation result $w=(w_1, \ldots, w_N)$ is concealed, by secure computation using the concealed search word $[k]$ read from the storage 128-$h$ and outputs the concealed operation result $[w]$. Here, $w_{j'}=b_1$ is established when $k_{j'}$ is a wildcard character and $w_{j'}=b_0$ is established when is not a wildcard character for $j'=1, \ldots, N_{min}$. The concealed operation result $[w]$ is stored in the storage 128-$h$ (step S522-$h$).

The null determination unit 625-$h$ obtains a concealed operation result $[u'']$, in which operation results $u''=(u''_1, \ldots, u''_N)$ are concealed, by secure computation using the concealed search word $[k]$, which is read from the storage 128-$h$, and outputs the concealed operation result $[u'']$. Here, $u''_j=c_1$ is established when $k_j$ is a null character and $u''_j=c_0$ is established when $k_j$ is not a null character for $j=1, \ldots, N$. $\mu''_j \in \{c_0, c_1\}$, in which $c_0=0$ and $c_1=1$, for example. The null determination unit 625-$h$ obtains the concealed operation result $[u'']$ by secure computation by using at least a part of the concealed search word $[k]$ and a concealed null character which is obtained by concealing a null character, for instance. As an example, the null determination unit 625-$h$ performs equality determination between $[k_j]$ and the concealed null character for $j=1, \ldots, N$ by secure computation, obtains $[u''_j]$ in which $u''_j$ is concealed, and obtains a set of $[u''_1], \ldots, [u''_N]$ as the concealed operation result $[u'']$. Alternatively, the null determination unit 625-$h$ may obtain the concealed operation result $[u'']$ in which $u''_1, \ldots, u''_N$ are collectively concealed, by secure computation using the concealed search word $[k]$ and the concealed null character. The concealed operation result $[u'']$ is stored in the storage 128-$h$ (step S6251-$h$).

The OR operation unit 623-$h$ (first OR operation unit) obtains a concealed operation result $[w']$, in which an operation result $w'=(w'_1, \ldots, w'_{Nmin})$ is concealed, by secure computation using at least a part of the concealed operation result $[w]$ and the concealed operation result $[u'']$, which are read from the storage 128-$h$, and outputs the concealed operation result $[w']$. Here, $w'_{j'}=b'_1$ is established when at least one of $u''_{j'}=c_1$ and $w_{j'}=b_1$ is satisfied, and $w'_{j'}=b'_0$ is established when both of $u''_{j'}=c_0$ and $w_{j'}=b_0$ are satisfied for $j'1, \ldots, N_{min}$. $w'_{j'} \in \{b'_0, b'_1\}$, in which $b'_0=0$ and $b'_1=1$, for example. When $b_0=0$, $b_1=1$, $c_0=0$, $c_1=1$, $b'_0=0$, and $b'_1=1$, $w'_{j'}=u''_{j'} \vee w_{j'}$ is established, for example. For example, the OR operation unit 623-$h$ performs an OR operation between $[u''_{j'}]$ and $[w_{j'}]$ for $j'=1, \ldots, N_{min}$ by secure computation, obtains $[w'_{j'}]$ in which $w'_{j'}=u''_{j'} \vee w_{j'}$ is concealed, and obtains a set of $[w'_1], \ldots, [w'_{Nmin}]$ as the concealed operation result $[w']$. Alternatively, the OR operation unit 623-$h$ may obtain the concealed operation result $[w']$ in which $w'_1, \ldots, w'_{Nmin}$ are collectively concealed, by secure computation using the concealed operation result $[w]$ and the concealed operation result $[u'']$. The concealed operation result $[w']$ is stored in the storage 128-$h$ (step S6231-$h$).

The OR operation unit 623-$h$ (second OR operation unit) obtains a concealed operation result $[e'_i]$, in which an operation result $e'_i=(e'_{i,1}, \ldots, e'_{i,Nmin})$ is concealed, by secure computation using the concealed operation result $[e_i]$ and the concealed operation result $[w']$, which are read from the storage 128-$h$, and outputs the concealed operation result $[e'_i]$. Here, $e'_{i,j}=d_1$ is established when at least one of $e_{i,j}=a_1$ and $w'_{j'}=b'_1$ is satisfied and $e'_{i,j}=d_0$ is established when both of $e_{i,j}=a_0$ and $w'_{j'}=b'_0$ are satisfied for $j'1, \ldots, N_{min}$. $e'_{i,j} \in \{d_0, d_1\}$, in which $d_0=0$ and $d_1=1$, for example. When $a_0=0$, $a_1=1$, $b'_0=0$, $b'_1=1$, $d_0=0$, and $d_1=1$, $e'_{i,j}=e_{i,j} \vee w'_{j'}$ is established, for example. For example, the OR operation unit 623-$h$ performs an OR operation between $[e_{i,j'}]$ and $[w'_{j'}]$ for $j'1, \ldots, N_{min}$ by secure computation, obtains $[e'_{i,j'}]$ in which $e'_{i,j'}=e_{i,j} \vee w'_{j'}$ is concealed, and obtains a set of $[e'_{i,1}], \ldots, [e'_{i,Nmin}]$ as the concealed operation result $[e'_i]$. Alternatively, the OR operation unit 623-$h$ may obtain the concealed operation result $[e'_i]$ in which $e'_{i,1}, \ldots, e'_{i,Nmin}$ are collectively concealed, by secure computation using the concealed operation result $[e_i]$ and the concealed operation result $[w']$. The concealed operation result $[e'_i]$ is stored in the storage 128-$h$ (step S6232-$h$).

The concatenation unit 628-$h$ obtains a concealed operation result $[y_i]$, in which an operation result $y_i$ is concealed, by secure computation using at least the concealed operation result $[e'_i]$ and outputs the concealed operation result $[y_i]$. When $N \leq N(i)$, the concatenation unit 628-$h$ outputs the concealed operation result $[e'_i]$ as the concealed operation result $[y_i]$. When $N > N(i)$, the concatenation unit 628-$h$ obtains the concealed operation result $[y_i]$, in which an operation result $y_i=(y_{i,1}, \ldots, y_{i,N})=(e'_{i,1}, \ldots, e'_{i,N(i)}, u''_{N(i)+1}, \ldots, u''_N)$ is concealed, by secure computation using at least a part of the concealed operation result $[e'_i]$ and the concealed operation result $[u'']$ and outputs the concealed operation result $[y_i]$. $[y_i]$ may be a set of concealed results obtained by concealing respective elements of $y_i$ or may be obtained by collectively concealing all elements of $y_i$. The concealed operation result $[y_i]$ is stored in the storage 128-$h$ (step S628-$h$).

After that, the processing of step S527-$h$ and the processing of step S1292-$h$, which is described in the first embodiment, are executed.

Specific Example

The followings are obtained when processing of the present embodiment is described in a separate manner to the case of $N > N(i)$ and the case of $N \leq N(i)$.

<<Case of $N > N(i)$>> m, n, t(i), N, and N(i) are positive integers, $i=1, \ldots, m$, $j=1, \ldots, N$, $j(i)=1, \ldots, N(i)$, $j''(i)=N(i)+1, \ldots, N$, $n \leq N$, and $t(i) \leq (i)$. The equality determination unit 521-$h$ obtains a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, by secure computation using the concealed search target word $[x_i]$ and the concealed search word $[k]$ and outputs the concealed operation result $[e_i]$. The wildcard determination unit 522-$h$ obtains a concealed operation result $[w]$ in which an operation result $w=(w_1, \ldots, w_{N(i)})$ is concealed, the operation result $w$ in which $w_{j(i)}=b_1$ is established when $k_{j(i)}$ is a wildcard character and $w_{j(i)}=b_0$ is established when $k_{j(i)}$ is not a wildcard character, by secure computation using the concealed search word $[k]$ and outputs the concealed operation result $[w]$. The null determination unit 625-$h$ obtains a concealed operation result $[u'']$ in which an operation result $u''=(u''_1, \ldots, u''_N)$ is concealed, the operation result $u''$ in which $u''_j=c_1$ s established when $k_j$ is a null character and $u''_j=c_0$ is established when $k_j$ is not a null character, by secure computatioi using the concealed search word $[k]$ and outputs the concealed operation result $[u'']$. The OR operation unit 623-$h$ obtains a concealed operation result $[w']$ which an operation result $w'=(w'_1, \ldots, w'_{N(i)})$ is concealed, the operation result $w'$ in which $w'_{j(i)}=b'_1$ is established when at least one of $u''_{j(i)}=c_1$ and $w_{j(i)}=b_1$ is satisfied and $w'_{j(i)}=b'_0$ is established when both of $u''_{j(i)}=c_0$ and $w_{j(i)}=b_0$ are satisfied, by secure computation using at least a part of the concealed operation result $[w]$ and the concealed operation result $[u'']$ and outputs the concealed operation result $[w']$. The OR operation unit 623-$h$ obtains a concealed operation result $[e'_i]$ in which an operation result $e'_i=(e'_{i,1}, \ldots, e'_{i,N(i)})$ is concealed, the operation result $e'_1$ in which $e'_{i,j(i)}=d_1$ is established when at least one of $e_{i,j(i)}=a_1$ and $w'_{j(i)}=b'_1$ is satisfied and $e'_{i,j(i)}=d_0$ is established when both of $e_{i,j(i)}=a_0$ and $w'_{j(i)}=b'_0$ are satisfied, by secure computation using the concealed operation result $[e_i]$ and the concealed operation result $[w']$ and outputs the concealed operation result $[e'_i]$. The concatenation unit 628-$h$ obtains a concealed operation result $[y_i]$, in which an operation result $y_i=(y_{i,1}, \ldots, y_{i,N})=(e'_{i,1}, \ldots, e'_{i,N(i)}, u''_{N(i)+1}, \ldots, u''_N)$ is concealed, by secure computation using at least a part of the concealed operation result $[e'_i]$ and the concealed operation result $[u'']$ and outputs the concealed operation result $[y_i]$. For example, as illustrated in FIG. 26, when $a_0=0$, $a_1=1$, $b_0=0$, $b_1=1$, $b'_0=0$, $b'_1=1$, $c_0=0$, $c_1=1$, $d_0=0$, $d_1=1$, $g_0=0$, $g_1=1$, $k_{n-1}$ is a wildcard character "*", and $x_{1,j}=k_j$ is satisfied for $j=1, \ldots, n-2, n$, $e_1=(1, 1, \ldots, 1, 0, 1, 1, 1, \ldots, 1)$, $w=(0, 0, \ldots, 0, 1, 0, 0, 0, \ldots, 0)$, $u''=(0, 0, \ldots, 0, 0, 0, 1, 1, \ldots, 1, 1)$, $w'=(0, 0, \ldots, 1, 0, 1, 1, \ldots, 1)$, $e'_1=(1, 1, \ldots, 1, 1, 1, 1, 1, \ldots, 1)$, and $y_1=(1, 1, \ldots, 1, 1, 1, 1, \ldots, 1, 1)$. Therefore, $z_1=1$ is established.

Figure 27:
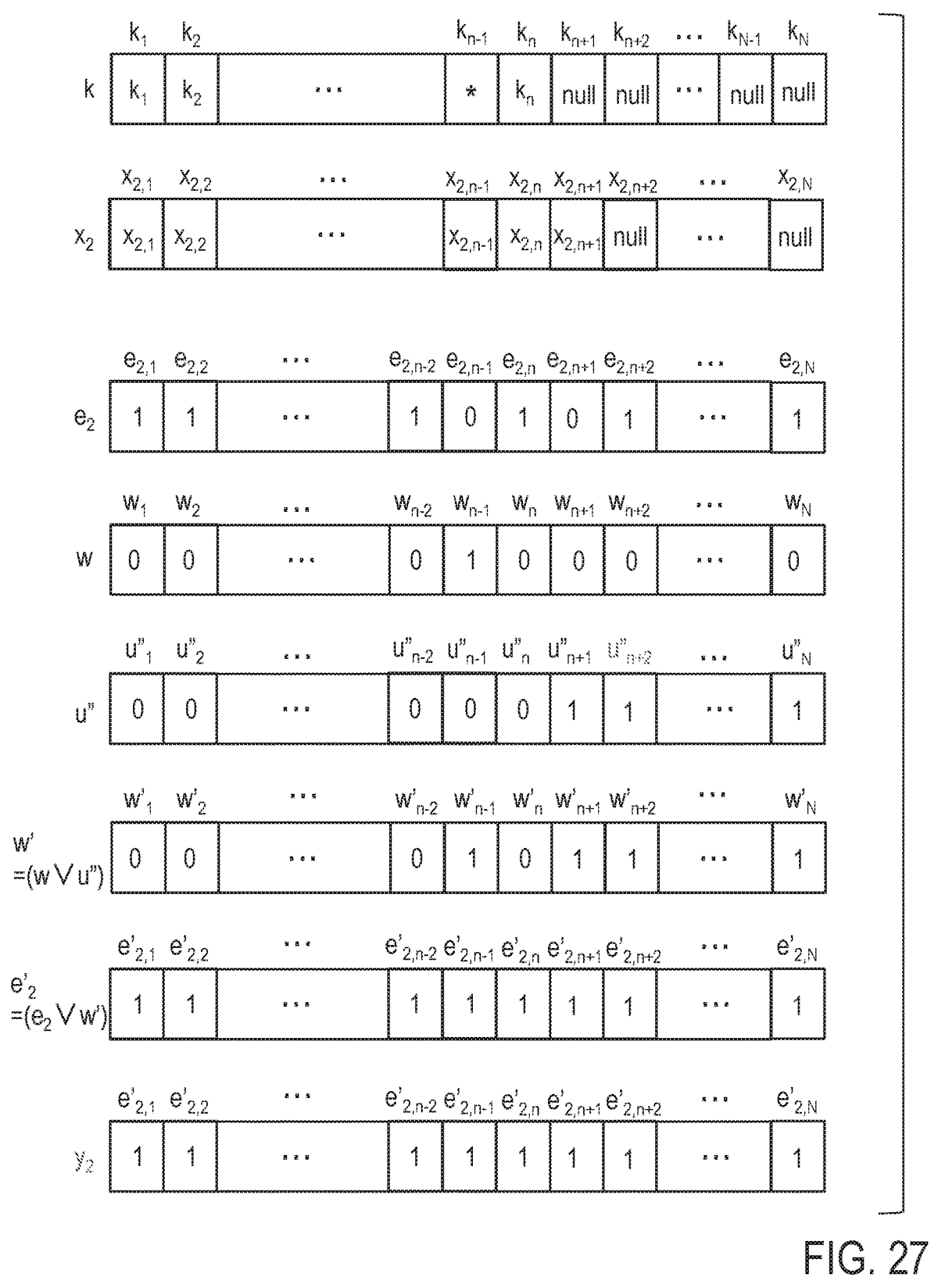

<<Case of $N \leq N(i)$>> m, n, t(i), N, and N(i) are positive integers, $i=1, \ldots, m$, $j=1, \ldots, N$, $j(i)=1, \ldots, N(i)$, $n \leq N$, and $t(i) \leq N(i)$. The equality determination unit 521-$h$ obtains a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, by secure computation using the concealed search target word $[x_i]$ and the concealed search word $[k]$ and outputs the concealed operation result $[e_i]$. The wildcard determination unit 522-$h$ obtains a concealed operation result $[w]$ in which an operation result $w=(w_1, \ldots, w_N)$ is concealed, the operation result $w$ in which $w_j=b_1$ is established when $k_j$ is a wildcard character and $w_j=b_0$ is established when $k_j$ is not a wildcard character, by secure computation using the concealed search word $[k]$ and outputs the concealed operation result $[w]$. The null determination unit 625-$h$ obtains a concealed operation result $[u'']$ in which an operation result $u''=(u''_1, \ldots, u''_N)$ is concealed, the operation result u" in which $u'_j=c_1$ is established when $k_j$ is a null character and $u"_j=c_0$ is established when $k_j$ is not a null character, by secure computation using the concealed search word [k] and outputs the concealed operation result [u"]. The OR operation unit 623-$h$ obtains a concealed operation result [w] in which an operation result $w'=(w'_1, \ldots, w'_N)$ is concealed, the operation result w' in which $w'_j=b'_1$ is established when at least one of $u"_j=c_1$ and $w_j=b_1$ is satisfied and $w'_j=b'_0$ is established when both of $u"_j=c_0$ and $w_j=b_0$ are satisfied, by secure computation using the concealed operation result [w] and the concealed operation result [e"] and outputs the concealed operation result [w']. The OR operation unit 623-$h$ obtains a concealed operation result $[y_i]$ in which an operation result $e'_i=y_i=(y_{i,1}, \ldots, y_{i,N})$ is concealed, the operation result $e'_i$ in which $y_{i,j}=d_1$ is established when at least one of $e_{i,j}=a_1$ and $w'_j=b'_1$ is satisfied and $y_{i,j}=d_0$ is established when both of $e_{i,j}=a_0$ and $w'_j=b'_0$ are satisfied, by secure computation using the concealed operation result $[e_i]$ and the concealed operation result [w'] and outputs the concealed operation result $[y_i]$. For example, as illustrated in FIG. 27, when $a_0=0$, $a_1=1$, $b_0=0$, $b_1=1$, $b'_0=0$, $b'_1=1$, $c_0=0$, $c_1=1$, $d_0=0$, $d_1=1$, $g_0=0$, $g_1=1$, $k_{n-1}$ is a wildcard character "*", $x_{1,j}=k_j$ is satisfied for $j=1, \ldots, n-2, n$, and $N=N(2)$, $e_2=(1, 1, \ldots, 1, 0, 1, 1, 1, \ldots, 1)$, $w=(0, 0, \ldots, 0, 1, 0, 0, 0, \ldots, 0)$, $u"=(0, 0, \ldots, 0, 0, 0, 1, 1, \ldots, 1)$, $w'=(0, 0, \ldots, 0, 1, 0, 1, 1, \ldots, 1)$, $e'_2=(1, 1, \ldots, 1, 1, 1, 1, 1, \ldots, 1)$, and $y_2=(1, 1, \ldots, 1, 1, 1, 1, 1, \ldots, 1)$. Therefore, $z_1=1$ is established. For example, as illustrated in FIG. 28, when $N<N(3)$, $e_3=(1, 1, \ldots, 1, 0, 0, 1, 1, \ldots, 1)$, $w=(0, 0, \ldots, 0, 1, 0, 0, 0, \ldots, 0)$, $u"=(0, 0, \ldots, 0, 0, 0, 1, 1, \ldots, 1)$, $w'=(0, 0, \ldots, 0, 1, 0, 1, 1, \ldots, 1)$, $e'_3=(1, 1, \ldots, 1, 1, 0, 1, 1, \ldots, 1)$, and $y_3=(1, 1, \ldots, 1, 1, 0, 1, 1, \ldots, 1)$. Therefore, $z_3=0$ is established.

Characteristics of Present Embodiment

As described above, even when the search word k may include a wildcard character or even when at least one of the search word k and the search target word $x_i$ may include a null character, prefix search of concealed database can be performed while concealing the search word including the wildcard character, in the present embodiment. Further, prefix search can be performed irrespective of whether or not the length of the concealed search target word and the length of the concealed search word are the same as each other, in the present embodiment. Furthermore, match retrieval of concealed database can be performed with less communication volume than that of related art.

[Modification Etc.]

Note that the present invention is not limited to the above-described embodiments. For example, the retrieval device may directly output the concealed operation result $[y_i]$, or may execute secure computation which is different from that of step S127-$h$ with respect to the concealed operation result $[y_i]$ and output the obtained result.

The secure computation system is not limited as described above. As long as equality determination and logical operations (OR operation, AND operation) based on secure computation are possible, secure computation based on the secret sharing scheme may be used or secure computation based on the homomorphic cryptosystem may be used. For example, a secure computation system described below may be employed.

Reference Literature 1: Ivan Damgard, Matthias Fitzi, Eike Kiltz, Jesper Buus Nielsen, Tomas Toft, "Unconditionally Secure Constant-Rounds Multi-party Computation for Equality, Comparison, Bits and Exponentiation", TCC 2006, pp. 285-304.

Reference Literature 2: Koji Chida, Koki Hamada, Dai Ikarashi, Katsumi Takahashi, "A Three-party Secure Function Evaluation with Lightweight Verifiability Revisited", In CSS, 2010.

Reference Literature 3: Takashi Nishide, Kazuo Ohta, "Multiparty computation for interval, equality, and comparison without bit-decomposition protocol", PKC, pp. 343-360, 2007.

The above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

DESCRIPTION OF REFERENCE NUMERALS 1-4 retrieval system
12-1 to 12-H, 22-1 to 22-H, 32-1 to 32-H, 42-1 to 42-H retrieval device

What is claimed is:

1. A retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), and N are positive integers, i=1, ..., m, j=1, ..., N, n≤N, and t(i)≤N, the retrieval device comprising:

a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to
receive an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtain a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];

obtain a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];

obtain a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w_j=b_1$ is satisfied and $y_{i,j}=d_0$ is established when both of $e_{i,j}=a_0$ and $w_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result [w];

obtain a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein the request device is configured to receive $[z_i]$ transmitted from at least a predetermined number of the retrieval devices.

2. A retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), and N are positive integers, i=1, ..., m, j=1, ..., N, n≤N, and t(i)≤N, the retrieval device comprising:

a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to
receive an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtain a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];

obtain a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];

obtain a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;

obtain a concealed operation result $[v_i]$ in which an operation result $v_i$ ($v_{i,1}, \ldots, v_{i,N}$) is concealed, the operation result $v_i$ in which $v_{i,j}=\rho_1$ is established when both of $w_j=b_j$ and $\mu_{i,j}=\theta_1$ are satisfied and $v_{i,j}=\rho_0$ is established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result [w] and the concealed operation result $[\mu_i]$;

obtain a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $v_{i,j}=\rho_1$ is satisfied and $y_{i,j}=d_0$ is established when both of $e_{i,j}=a_0$ and $v_{i,j}=\rho_0$ are satisfied, $d_0$ and $d_1$ are elements of a set $\{d_0, d_1\}$, and $d_0 \neq d_1$, by secure computation using the concealed operation result $[e_i]$ and the concealed operation result $[v_i]$;

obtain a concealed match determination result $[z_i]$ in which a match determination result $z_i$ is concealed from the retrieval device, the match determination result $z_i$ in which $z_i=g_1$ is established when $y_{i,1}= \ldots =y_{i,N}=d_1$ is satisfied and $z_i=g_0$ is established when $y_{i,1}= \ldots =y_{i,N}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein the request device is configured to receive $[z_i]$ transmitted from at least a predetermined number of the retrieval devices.

3. A retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, $i=1, \ldots, m$, $j=1, \ldots, N$, $n \leq N$, and $t(i) \leq N$, the retrieval device comprising:

a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to receive an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtain a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];

obtain a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0\ b_1\}$, and $b_0 \neq b_1$, by secure computation using the concealed search word [k];

obtain a concealed operation result [u] in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word [k];

obtain a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $w_j=b_1$, and $u_j=c_1$ is satisfied and $y_{i,j}=d_0$ is established when all of $e_{i,j}=a_0$, $w_j=b_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result [w], and the concealed operation result [u];

obtain a concealed match determination result $[z_i]$ in which a match determination result $z_i$ is concealed from the retrieval device, the match determination result $z_i$ in which $z_i=g_1$ is established when $y_{i,1}= \ldots =y_{i,N}=d_1$ is satisfied and $z_i=g_0$ is established when $y_{i,1}= \ldots =y_{i,N}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein the request device is configured to receive $[z_i]$ transmitted from at least a predetermined number of the retrieval devices.

4. A retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, $i=1, \ldots, m$, $j=1, \ldots, N$, $n \leq N$, and $t(i) \leq N$, the retrieval device comprising:

a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to
  receive an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;
  obtain a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];
  obtain a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];
  obtain a concealed operation result [u] in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word [k];
  obtain a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;
  obtain a concealed operation result $[v_i]$ in which an operation result $v_i=(v_{i,1}, \ldots, v_{i,N})$ is concealed, the operation result $v_i$ in which $v_{i,j}=\rho_1$ is established when both of $w_j=b_1$ and $\mu_{i,j}=\theta_1$ are satisfied and $v_{i,j}=\rho_0$ is established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result [w] and the concealed operation result $[\mu_i]$;
  obtain a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $v_{i,j}=\rho_1$, and $u_j=c_1$ is satisfied and $y_{i,j}=d_0$ is established when all of $e_{i,j}=a_0$, $v_{i,j}=\rho_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result [u], and the concealed operation result $[v_i]$;
  obtain a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$; and
  output the concealed match determination result $[z_i]$ to the request device via the network,
  wherein the request device is configured to receive $[z_i]$ transmitted from at least a predetermined number of the retrieval devices.

5. A retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), N, and N(i) are positive integers, N>N(i), i=1, ..., m, j=1, ..., N, j(i)=1, ..., N(i), j"(i)=N(i)+1, ..., N, n≤N, and t(i)≤N(i), the retrieval device comprising:
a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and
processing circuitry configured to
  receive an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;
  obtain a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, $a_0$ and $a_1$ are elements of a set $\{a_0, a_1\}$, and $a_0 \neq a_1$, by secure computation using the concealed search target word $[x_i]$ and the concealed search word [k];
  obtain a concealed operation result [w] in which an operation result $w=(w_1, \ldots, w_{N(i)})$ is concealed, the operation result w in which $w_{j(i)}=b_1$ is established when $k_{j(i)}$ is the wildcard character and $w_{j(i)}=b_0$ is established when $k_{j(i)}$ is not the wildcard character, $b_0$ and $b_1$ are elements of a set $\{b_0, b_1\}$, and $b_0 \neq b_1$, by secure computation using the concealed search word [k];
  obtain a concealed operation result [u'] in which operation results $u'_{N(i)+1}, \ldots, u'_N$ are concealed, the operation results $u'_{N(i)+1}, \ldots, u'_N$ in which $u'_{j''(i)}=c_1$ is established when $k_{j''(i)}$ is a null character and $u'_{j''(i)}=c_0$ is established when $k_{j''(i)}$ is not a null character, $c_0$ and $c_1$ are elements of a set $\{c_0, c_1\}$, and $c_0 \neq c_1$, by secure computation using at least a part of the concealed search word [k];
  obtain a concealed operation result $[e'_i]$ in which an operation result $e'_i=(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w_{j(i)}=b_1$ is satisfied and $e'_{i,j(i)}=d_0$ is established when both of $e_{i,j(i)}=a_0$ and $w_{j(i)}=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$;

obtain a concealed operation result $[y_i]$ in which an operation result $y_i=(y_{i,1}, \ldots, y_{i,N})=(e'_{i,1}, \ldots, e'_{i,N(i)}, u'_{N(i)+1}, \ldots, u'_N)$ is concealed, by secure computation using the concealed operation result $[u']$ and the concealed operation result $[e'_i]$;

obtain a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

6. A retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), N, and N(i) are positive integers, N<N(i), i=1, ..., m, j=1, ..., N, j(i)=1, ..., N(i), n≤N, t(i)≤N(i), and j"(i)=N+1, ..., N(i), the retrieval device comprising:

a storage that stores a concealed database $[x_1], \ldots, [x_m]$ including a concealed search target word $[x_i]$ in which a search target word $x_i=(x_{i,1}, \ldots, x_{i,1(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to receive an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtain a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtain a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtain a concealed operation result $[e'_i]$ in which an operation result $e'_i=(e'_{i,1}, \ldots, e'_{i,N})$ is concealed, the operation result $e'_i$ in which $e'_{i,j}=d_1$ is established when at least one of $e_{i,j}=a_1$ and $w_j=b_1$ is satisfied and $e'_{i,j}=d_0$ is established when both of $e_{i,j}=a_0$ and $w_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$;

obtain a concealed operation result $[\mu'_i]$ in which an operation result $\mu'_i=(\mu'_{i,N+1}, \ldots, \mu'_{i,N(i)})$ is concealed, the operation result $\mu'_i$ in which $\mu'_{i,j"(i)}=d_1$ is established when $x_{i,j"(i)}$ is a null character and $\mu'_{i,j"(i)}=d_0$ is established when $x_{i,j"(i)}$ is not a null character, by secure computation using at least a part of the concealed search target word $[x_i]$;

obtain a concealed operation result $[y_i]$ in which an operation result $y_i=(y_{i,1}, \ldots, y_{i,N(i)})=(e'_{i,1}, \ldots, e'_{i,N}, \mu'_{i,N+1}, \ldots, \mu'_{i,N(i)})$ is concealed, by secure computation using the concealed operation result $[e'_i]$ and the concealed operation result $[\mu'_i]$;

obtain a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

7. A retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) are positive integers, N≤N(i), i=1, ..., m, j=1, ..., N, j(i)=1, ..., N(i), n≤N, and t(i)≤N(i), the retrieval device comprising:

a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$; and processing circuitry configured to receive an input of a concealed search word $[k]$ from the request device via the network, such that the concealed search word [k] is a secret sharing value of a search word k=($k_1$, ..., $k_n$, ..., $k_N$) and each of the plurality of retrieval devices receives the different concealed search word [k] from the request device over the network, and in which the search word k=($k_1$, ..., $k_n$, ..., $k_N$) is concealed from each of the plurality of retrieval devices, the search word k including n pieces of characters $k_1$, ..., $k_n$ including a wildcard character;

obtain a concealed operation result [$e_i$] in which an operation result $e_i$=($e_{i,1}$, ..., $e_{i,N}$) is concealed, the operation result $e_i$ in which $e_{i,j}$=$a_1$ is established when $x_{i,j}$ is $k_j$ and $e_{i,j}$=$a_0$ is established when $x_{i,j}$ is not $k_j$, $a_0$ and $a_1$ are elements of a set {$a_0$, $a_1$}, and $a_0 \neq a_1$, by secure computation using the concealed search target word [$x_i$] and the concealed search word [k];

obtains a concealed operation result [w] in which an operation result w=($w_1$, ..., $w_N$) is concealed, the operation result w in which $w_j$=$b_1$ is established when $k_j$ is the wildcard character and $w_j$=$b_0$ is established when $k_j$ is not the wildcard character, $b_0$ and $b_1$ are elements of a set {$b_0$, $b_1$}, and $b_0 \neq b_1$, by secure computation using the concealed search word [k];

obtain a concealed operation result [u″] in which an operation result u″=($u″_1$, ..., $u″_N$) is concealed, the operation result u″ in which $u″_j$=$c_1$ is established when $k_j$ is a null character and $u″_j$=$c_0$ is established when $k_j$ is not a null character, $c_0$ and $c_1$ are elements of a set {$c_0$, $c_1$}, and $c_0 \neq c_1$, by secure computation using the concealed search word [k];

obtain a concealed operation result [w'] in which an operation result w'=($w'_1$, ..., $w'_N$) is concealed, the operation result w' in which $w'_j$=$b'_1$ is established when at least one of $u″_j$=$c_1$ and $w_j$=$b_1$ is satisfied and $w'_j$=$b'_0$ is established when both of $u″_j$=$c_0$ and $w_j$=$b_0$ are satisfied, $b'_0$ and $b'_1$ are elements of a set {$b'_0$, $b'_1$}, and $b'_0 \neq b'_1$, by secure computation using the concealed operation result [w] and the concealed operation result [u″]; a second OR operation unit that obtains a concealed operation result [$y_i$] in which an operation result $y_i$=($y_{i,1}$, ..., $y_{i,N}$) is concealed, the operation result $y_i$ in which $y_{i,j}$=$d_1$ is established when at least one of $e_{i,j}$=$a_1$ and $w'_j$=$b'_1$ is satisfied and $y_{i,j}$=$d_0$ is established when both of $e_{i,j}$=$a_0$ and $w'_j$=$b'_0$ are satisfied, $d_0$ and $d_1$ are elements of a set {$d_0$, $d_1$}, and $d_0 \neq d_1$, by secure computation using the concealed operation result [$e_i$] and the concealed operation result [w']; and obtain a concealed match determination result [$z_i$] in which a match determination result $z_i$ is concealed from the retrieval device, the match determination result $z_i$ in which $z_i$=$g_1$ is established when $y_{i,1}$= ... =$y_{i,Nmax}$=$d_1$ is satisfied and $z_i$=$g_0$ is established when $y_{i,1}$= ... =$y_{i,Nmax}$=$d_1$ is not satisfied, $g_0$ and $g_1$ are elements of a set {$g_0$, $g_1$}, and $g_0 \neq g_1$, by secure computation using the concealed operation result [$y_i$]; and output the concealed match determination result [$z_i$] to the request device via the network, wherein $N_{max}$=N(i) is established when N≤N(i), and $N_{max}$=N is established when N>N(i), and wherein the request device is configured to receive [$z_i$] transmitted from at least a predetermined number of the retrieval devices.

8. A retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) are positive integers, N>N(i), i=1, ..., m, j=1, ..., N, j(i)=1, ..., N(i), j″(i)=N(i)+1, ..., N, n≤N, and t(i)≤N(i), the retrieval device comprising:

a storage that stores a concealed database [$x_1$], ..., [$x_m$] including a concealed search target word [$x_i$] in which a search target word $x_i$=($x_{i,1}$, ..., $x_{i,1(i)}$, ..., $x_{i,N}$) is concealed from each of the plurality of retrieval devices, the search target word $x_i$ including t(i) pieces of characters $x_{i,1}$, ..., $x_{i,t(i)}$, wherein the concealed search target word [$x_i$] is a secret sharing value of the search target word $x_i$ and each of the plurality of retrieval devices stores the different concealed search target word [$x_i$]; and processing circuitry configured to receive an input of a concealed search word [k] from the request device via the network, such that the concealed search word [k] is a secret sharing value of a search word k=($k_1$, ..., $k_n$, ..., $k_N$) and each of the plurality of retrieval devices receives the different concealed search word [k] from the request device over the network, and in which the search word k=($k_1$, ..., $k_n$, ..., $k_N$) is concealed from each of the plurality of retrieval devices, the search word k including n pieces of characters $k_1$, ..., $k_n$ including a wildcard character;

obtain a concealed operation result [$e_i$] in which an operation result $e_i$=($e_{i,1}$, ..., $e_{i,N(i)}$) is concealed, the operation result $e_i$ in which $e_{i,j(i)}$=$a_1$ is established when $x_{i,j(i)}$ is $k_{j(i)}$ and $e_{i,j(i)}$=$a_0$ is established when $x_{i,j(i)}$ is not $k_{j(i)}$, $a_0$ and $a_1$ are elements of a set {$a_0$, $a_1$}, and $a_0 \neq a_1$, by secure computation using the concealed search target word [$x_i$] and the concealed search word [k];

obtain a concealed operation result [w] in which an operation result w=($w_1$, ..., $w_{N(i)}$) is concealed, the operation result w in which $w_{j(i)}$=$b_1$ is established when $k_{j(i)}$ is the wildcard character and $w_{j(i)}$=$b_0$ is established when $k_{j(i)}$ is not the wildcard character, $b_0$ and $b_1$ are elements of a set {$b_0$, $b_1$}, and $b_0 \neq b_1$, by secure computation using the concealed search word [k];

obtain a concealed operation result [u″] in which an operation result u″=($u″_1$, ..., $u″_N$) is concealed, the operation result u″ in which $u″_j$=$c_1$ is established when $k_j$ is a null character and $u″_j$=$c_0$ is established when $k_j$ is not a null character, $c_0$ and $c_1$ are elements of a set {$c_0$, $c_1$}, and $c_0 \neq c_1$, by secure computation using the concealed search word [k];

obtain a concealed operation result [w'] in which an operation result w'=($w'_1$, ..., $w'_{N(i)}$) is concealed, the operation result w' in which $w'_{j(i)}$=$b'_1$ is established when at least one of $u″_{j(i)}$=$c_1$ and $w_{j(i)}$=$b_1$ is satisfied and $w'_{j(i)}$=$b'_0$ is established when both of $u″_{j(i)}$=$c_0$ and $w_{j(i)}$=$b_0$ are satisfied, $b'_0$ and $b'_1$ are elements of a set {$b'_0$, $b'_1$} and $b'_0 \neq b'_1$, by secure computation using at least a part of the concealed operation result [w] and the concealed operation result [u″];

obtain a concealed operation result [$e'_i$] in which an operation result $e'_i$=($e'_{i,1}$, ..., $e'_{i,N(i)}$) is concealed, the operation result $e'_i$ in which $e'_{i,j(i)}$=$d_1$ is established when at least one of $e_{i,j(i)}$=$a_1$ and $w'_{j(i)}$=$b'_1$ is satisfied and $e'_{i,j(i)}$=$d_0$ is established when both of $e_{i,j(l)}=a_0$ and $w'_{j(l)}=b'_0$ are satisfied, $d_0$ and $d_1$ are elements of a set $\{d_0, d_1\}$, and $d_0 \neq d_1$, by secure computation using the concealed operation result $[e'_i]$ and the concealed operation result $[w']$;

obtain a concealed operation result $[y_i]$ in which an operation result $y_i=(y_{i,1}, \ldots, y_{i,N})=(e'_{i,1}, \ldots, e'_{i,N(i)}, u''_{N(i)+1}, \ldots, u''_N)$ is concealed, by secure computation using at least a part of the concealed operation result $[e'_i]$ and the concealed operation result $[u'']$;

obtain a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and output the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

9. A retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), and N are positive integers, $i=1, \ldots, m$, $j=1, \ldots, N$, $n \leq N$, and $t(i) \leq N$, the retrieval device comprises a storage that stores a concealed database $[x_1], \ldots, [x_m]$ including a concealed search target word $[x_i]$ in which a search target word $x_i(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$ wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w_j=b_1$ is satisfied and $y_{i,j}=d_0$ is established when both of $e_{i,j}=a_0$ and $w_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$; and obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$]; and outputting the concealed match determination result $[z_i]$ to the request device via the network, wherein the request device is configured to receive $[z_i]$ transmitted from at least a predetermined number of the retrieval devices.

10. A retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), and N are positive integers, $i=1, \ldots, m$, $j=1, \ldots, N$, $n \leq N$, and $t(i) \leq N$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];

obtaining a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;

obtaining a concealed operation result $[v_i]$ in which an operation result $v_i=(v_{i,1}, \ldots, v_{i,N})$ is concealed, the operation result $v_i$ in which $v_{i,j}=\rho_1$ is established when both of $w_j=b_1$ and $\mu_{i,j}=\theta_1$ are satisfied and $v_{i,j}=\rho_0$ is established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result [w] and the concealed operation result $[\mu_i]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $v_{i,j}=\rho_1$ is satisfied and $y_{i,j}=d_0$ is established when both of $e_{i,j}=a_0$ and $v_{i,j}=\rho_0$ are satisfied, $d_0$ and $d_1$ are elements of a set $\{d_0, d_1\}$, and $d_0 \neq d_1$, by secure computation using the concealed operation result $[e_i]$ and the concealed operation result $[v_i]$; and obtaining a concealed match determination result $[z_i]$ in which a match determination result $z_i$ is concealed from the retrieval device, the match determination result $z_i$ in which $z_i=g_1$ is established when $y_{i,1}= \ldots =y_{i,N}=d_1$ is satisfied and $z_i=g_0$ is established when $y_{i,1}= \ldots =y_{i,N}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein the request device is configured to receive $[z_i]$ transmitted from at least a predetermined number of the retrieval devices.

11. A retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, i=1, ..., m, j=1, ..., N, n≤N, and t(i)≤N, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots,$ $k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];

obtaining a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];

obtaining a concealed operation result [u] in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word [k];

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $w_j=b_1$, and $u_j=c_1$ is satisfied and $y_{i,j}=d_0$ is established when all of $e_{i,j}=a_0$, $w_j=b_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result [w], and the concealed operation result [u]; and obtaining a concealed match determination result $[z_i]$ in which a match determination result $z_i$ is concealed from the retrieval device, the match determination result $z_i$ in which $z_i=g_1$ is established when $y_{i,1}= \ldots =y_{i,N}=d_1$ is satisfied and $z_i=g_0$ is established when $y_{i,1}= \ldots =y_{i,N}=d_1$ is not satisfied, $g_0$ and $g_1$ are elements of a set $\{g_0, g_1\}$, and $g_0 \neq g_1$, by secure computation using the concealed operation result $[y_i]$]; and outputting the concealed match determination result $[z_i]$ to the request device via the network, wherein the request device is configured to receive $[z_i]$ transmitted from at least a predetermined number of the retrieval devices.

12. A retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, i=1, ..., m, j=1, ..., N, n≤N, and t(i)≤N, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u]$ in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;

obtaining a concealed operation result $[v_i]$ in which an operation result $v_i=(v_{i,1}, \ldots, v_{i,N})$ is concealed, the operation result $v_i$ in which $v_{i,j}=\rho_1$ is established when both of $w_j=b_1$ and $\mu_{i,j}=\theta_1$, are satisfied and $v_{i,j}=\rho_0$ established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result $[w]$ and the concealed operation result $[\mu_i]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $v_{i,j}=\rho_1$, and $u_j=c_1$ is satisfied and $y_{i,j}=d_0$ is established when all of $e_{i,j}=a_0$, $v_{i,j}=\rho_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result $[u]$, and the concealed operation result $[v_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein the request device is configured to receive $[z_i]$ transmitted from at least a predetermined number of the retrieval devices.

13. A retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), N, and N(i) are positive integers, $N>N(i)$, $i=1, \ldots, m$, $j=1, \ldots, N$, $j(i)=1, \ldots, N(i)$, $j''(i)=N(i)+1, \ldots, N$, $n \leq N$, and $t(i) \leq N(i)$, the retrieval device comprises a storage that stores a concealed database $[x_1], \ldots, [x_m]$ including a concealed search target word $[x_i]$ in which a search target word $x_i(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_{N(i)})$ is concealed, the operation result w in which $w_{j(i)}=b_1$ is established when $k_{j(i)}$ is the wildcard character and $w_{j(i)}=b_0$ is established when $k_{j(i)}$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u']$ in which operation results $u'_{N(i)+1}, \ldots, u'_N$ are concealed, the operation results $u'_{N(i)+1}, \ldots, u'_N$ in which $u'_{j''(i)}=c_1$ is established when $k_{j''(i)}$ is a null character and $u'_{j''(i)}=c_0$ is established when $k_{j''(i)}$ is not a null character, $c_0$ and $c_1$ are elements of a set $\{c_0, c_1\}$, and $c_0 \neq c_1$, by secure computation using at least a part of the concealed search word $[k]$;

obtaining a concealed operation result $[e'_i]$ in which an operation result $e'_i=(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w_{j(i)}=b_1$ is satisfied and $e'_{i,j(i)}=d_0$ is established when both of $e_{i,j(i)}=a_0$ and $w_{j(i)}=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$;

obtaining a concealed operation result $[y_i]$ in which an operation result $y_i=(y_{i,1}, \ldots, y_{i,N})=(e'_{i,1}, \ldots, e'_{i,N(i)}, u'_{N(i)+1}, \ldots, u'_N)$ is concealed, by secure computation using the concealed operation result $[u']$ and the concealed operation result $[e'_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

14. A retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), N, and N(i) are positive integers, $N<N(i)$, $i=1, \ldots, m$, $j=1, \ldots, N$, $j(i)=1, \ldots, N(i)$, $n \leq N$, $t(i) \leq N(i)$, and $j''(i)=N+1, \ldots, N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word $k$ including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result $w$ in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[e'_i]$ in which an operation result $e'_i=(e'_{i,1}, \ldots, e'_{i,N})$ is concealed, the operation result $e'_i$ in which $e'_{i,j}=d_1$ is established when at least one of $e_{i,j}=a_1$ and $w_j=b_1$ is satisfied and $e'_{i,j}=d_0$ is established when both of $e_{i,j}=a_0$ and $w_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$;

obtaining a concealed operation result $[\mu'_i]$ in which an operation result $\mu'_i=(\mu'_{i,N+1}, \ldots, \mu'_{i,N(i)})$ is concealed, the operation result $\mu'_i$ in which $\mu'_{i,j''(i)}=d_1$ is established when $x_{i,j''(i)}$ is a null character and $\mu'_{i,j''(i)}=d_0$ is established when $x_{i,j''(i)}$ is not a null character, by secure computation using at least a part of the concealed search target word $[x_i]$;

obtaining a concealed operation result $[y_i]$ in which an operation result $y_i=(y_{i,1}, \ldots, y_{i,N(i)})=(e'_{i,1}, \ldots, e'_{i,N}, \mu'_{i,N+1}, \ldots, \mu'_{i,N(i)})$ is concealed, by secure computation using the concealed operation result $[e'_i]$ and the concealed operation result $[\mu'_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

15. A retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) am positive integers, $N \leq N(i)$, $i=1, \ldots, m$, $j=1, \ldots, N$, $j(i)=1, \ldots, N(i)$, $n \leq N$, and $t(i) \leq N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$ wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u'']$ in which an operation result $u''=(u''_1, \ldots, u''_N)$ is concealed, the operation result $u''$ in which $u''_j=c_1$ is established when $k_j$ is a null character and $u''_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[w']$ in which an operation result $w'=(w'_1, \ldots, w'_N)$ is concealed, the operation result $w'$ in which $w'_j=b'_1$ is established when at least one of $u''_j=c_1$ and $w_j=b_1$ is satisfied and $w'_j=b'_0$ is established when both of $u''_j=c_0$ and $w_j=b_0$ are satisfied, $b'_0$ and $b'_1$ are elements of a set $\{b'_0, b'_1\}$, and $b'_0 \neq b'_1$, by secure computation using the concealed operation result $[w]$ and the concealed operation result $[u'']$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w'_j=b'_1$ is satisfied and $y_{i,j}=d_0$ is established when both of $e_{i,j}=a_0$ and $w'_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w']$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

16. A retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) are positive integers, $N>N(i)$, $i=1, \ldots, m$, $j=1, \ldots, N$, $j(i)=1, \ldots, N(i)$, $j''(i)=N(i)+1, \ldots, N$, $n \leq N$, and $t(i) \leq N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_{N(i)})$ is concealed, the operation result w in which $w_{j(i)}=b_1$ is established when $k_{j(i)}$ is the wildcard character and $w_{j(i)}=b_0$ is established when $k_{j(i)}$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u'']$ in which an operation result $u''=(u''_1, \ldots, u''_N)$ is concealed, the operation result $u''$ in which $u''_j=c_1$ is established when $k_j$ is a null character and $u''_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[w']$ in which an operation result $w'=(w'_1, \ldots, w'_{N(i)})$ is concealed, the operation result $w'$ in which $w'_{j(i)}=b'_1$ is established when at least one of $u''_{j(i)}=c_1$ and $w_{j(i)}=b_1$ is satisfied and $w'_{j(i)}=b'_0$ is established when both of $u''_{j(i)}=c_0$ and $w_{j(i)}=b_0$ are satisfied, $b'_0$ and $b'_1$ are elements of a set $\{b'_0, b'_1\}$, and $b'_0 \neq b'_1$, by secure computation using at least a part of the concealed operation result $[w]$ and the concealed operation result $[u'']$;

obtaining a concealed operation result $[e'_i]$ in which an operation result $e'_i=(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w'_{j(i)}=b'_1$ is satisfied and $e'_{i,j(i)}=d_0$ is established when both of $e_{i,j(i)}=a_0$ and $w'_{j(i)}=b'_0$ are satisfied, $d_0$ and $d_1$ are elements of a set $\{d_0, d_1\}$, and $d_0 \neq d_1$, by secure computation using the concealed operation result $[e_i]$ and the concealed operation result $[w']$;

obtaining a concealed operation result $[y_i]$ in which an operation result $y_i=(y_{i,1}, \ldots, y_{i,N})=(e'_{i,1}, \ldots, e'_{i,N(i)}, u''_{N(i)+1}, \ldots, u''_N)$ is concealed, by secure computation using at least a part of the concealed operation result [e'$_i$] and the concealed operation result [u"]:
obtaining a concealed match determination result [z$_i$] in which a match determination result z$_i$ is concealed from the retrieval device, the match determination result z$_i$ in which z$_i$=g$_1$ is established when y$_{i,1}$= ... =y$_{i,Nmax}$=d$_1$ is satisfied and z$_i$=g$_0$ is established when y$_{i,1}$= ... =y$_{i,Nmax}$=d$_1$ is not satisfied, g$_0$ and g$_1$ are elements of a set {g$_0$, g$_1$}, and g$_0$≠g$_1$, by secure computation using the concealed operation result [y$_i$]; and
outputting the concealed match determination result [z$_i$] to the request device via the network,
wherein
N$_{max}$=N(i) is established when N≤N(i), and N$_{max}$=N is established when N>N(i), and
wherein the request device is configured to receive [z$_i$] transmitted from at least a predetermined number of the retrieval devices.

17. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which
m, n, t(i), and N are positive integers, i=1, ..., m, j=1, ..., N, n≤N, and t(i)≤N, the retrieval device compress a storage that stores a concealed database [x$_1$], ..., [x$_m$] including a concealed search target word [x$_i$] in which a search target word x$_i$=(x$_{i,1}$, ..., x$_{i,t(i)}$, ..., x$_{i,N}$) is concealed from each of the plurality of retrieval devices, the search target word x$_i$ including t(i) pieces of characters x$_{i,1}$, ..., x$_{i,t(i)}$, wherein the concealed search target word [x$_i$] is a secret sharing value of the search target word x$_i$ and each of the plurality of retrieval devices stores the different concealed search target word [x$_i$], wherein
the retrieval method comprises:
receiving an input of a concealed search word [k] from the request device via the network, such that the concealed search word [k] is a secret sharing value of a search word k=(k$_1$, ..., k$_n$, ..., k$_N$) and each of the plurality of retrieval devices receives the different concealed search word [k] from the request device over the network, and in which the search word k=(k$_1$, ..., k$_n$, ..., k$_N$) is concealed from each of the plurality of retrieval devices, the search word k including n pieces of characters k$_1$, ..., k$_n$ including a wildcard character;
obtaining a concealed operation result [e$_i$] in which an operation result e$_i$=(e$_{i,1}$, ..., e$_{i,N}$) is concealed, the operation result e$_i$ in which e$_{i,j}$=a$_1$ is established when x$_{i,j}$ is k$_j$ and e$_{i,j}$=a$_0$ is established when x$_{i,j}$ is not k$_j$, a$_0$ and a$_1$ are elements of a set {a$_0$, a$_1$}, and a$_0$≠a$_1$, by secure computation using the concealed search target word [x$_i$] and the concealed search word [k];
obtaining a concealed operation result [w] in which an operation result w=(w$_1$, ..., w$_N$) is concealed, the operation result w in which w$_j$=b$_1$ is established when k$_j$ is the wildcard character and w$_j$=b$_0$ is established when k$_j$ is not the wildcard character, b$_0$ and b$_1$ are elements of a set {b$_0$, b$_1$}, and b$_0$≠b$_1$, by secure computation using the concealed search word [k];
obtaining a concealed operation result [y$_i$] in which an operation result y$_i$=(y$_{i,1}$, ..., y$_{i,N}$) is concealed, the operation result y$_i$ in which y$_{i,j}$=d$_1$ is established when at least one of e$_{i,j}$=a$_1$ and w$_j$=b$_1$ is satisfied and y$_{i,j}$=d$_0$ is established when both of e$_{i,j}$=a$_0$ and w$_j$=b$_0$ are satisfied, d$_0$ and d$_1$ are elements of a set {d$_0$, d$_1$}, and d$_0$≠d$_1$, by secure computation using the concealed operation result [e$_i$] and the concealed operation result [w];
obtaining a concealed match determination result [z$_i$] in which a match determination result z$_i$ is concealed from the retrieval device, the match determination result z$_i$ in which z$_i$=g$_1$ is established when y$_{i,1}$= ... y$_{i,N}$=d$_1$ is satisfied and z$_i$=g$_0$ is established when y$_{i,1}$= ... =y$_{i,N}$=d$_1$ is not satisfied, g$_0$ and g$_1$ are elements of a set {g$_0$, g$_1$}, and g$_0$≠g$_1$, by secure computation using the concealed operation result [y$_i$]]; and
outputting the concealed match determination result [z$_i$] to the request device via the network,
wherein the request device is configured to receive [z$_i$] transmitted from at least a predetermined number of the retrieval devices.

18. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which
m, n, t(i), and N are positive integers, i=1, ..., m, j=1, ..., N, n≤N, and t(i)≤N, the retrieval device comprises a storage that stores a concealed database [x$_1$], ..., [x$_m$] including a concealed search target word [x$_i$] in which a search target word x$_i$=(x$_{i,1}$, ..., x$_{i,t(i)}$, ..., x$_{i,N}$) is concealed from each of the plurality of retrieval devices, the search target word x$_i$ including t(i) pieces of characters x$_{i,1}$, ..., x$_{i,t(i)}$, wherein the concealed search target word [x$_i$] is a secret sharing value of the search target word x$_i$ and each of the plurality of retrieval devices stores the different concealed search target word [x$_i$], wherein
the retrieval method comprises:
receiving an input of a concealed search word [k] from the request device via the network, such that the concealed search word [k] is a secret sharing value of a search word k=(k$_1$, ..., k$_n$, ..., k$_N$) and each of the plurality of retrieval devices receives the different concealed search word [k] from the request device over the network, and in which the search word k=(k$_1$, ..., k$_n$, ..., k$_N$) is concealed from each of the plurality of retrieval devices, the search word k including n pieces of characters k$_1$, ..., k$_n$ including a wildcard character;
obtaining a concealed operation result [e$_i$] in which an operation result e$_i$=(e$_{i,1}$, ..., e$_{i,N}$) is concealed, the operation result e$_i$ in which e$_{i,j}$=a$_1$ is established when x$_{i,j}$ is k$_j$ and e$_{i,j}$=a$_0$ is established when x$_{i,j}$ is not k$_j$, a$_0$ and a$_1$ are elements of a set {a$_0$, a$_1$}, and a$_0$≠a$_1$, by secure computation using the concealed search target word [x$_i$] and the concealed search word [k];
obtaining a concealed operation result [w] in which an operation result w=(w$_1$, ..., w$_N$) is concealed, the operation result w in which w$_j$=b$_1$ is established when k$_j$ is the wildcard character and w$_j$=b$_0$ is established when k$_j$ is not the wildcard character, b$_0$ and b$_1$ are elements of a set {b$_0$, b$_1$}, and b$_0$≠b$_1$, by secure computation using the concealed search word [k];

obtaining a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;

obtaining a concealed operation result $[v_i]$ in which an operation result $v_i=(v_{i,1}, \ldots, v_{i,N})$ is concealed, the operation result $v_i$ in which $v_{i,j}=\rho_1$ is established when both of $w_j=b_1$ and $\mu_{i,j}=\theta_1$ are satisfied and $v_{i,j}\rho_0$ is established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result $[w]$ and the concealed operation result $[\mu_i]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $v_{i,j}=\rho_1$ is satisfied and $y_{i,j}=d_0$ is established when both of $e_{i,j}=a_0$ and $v_{i,j}=\rho_0$ are satisfied, $d_0$ and $d_1$ are elements of a set $\{d_0, d_1\}$, and $d_0 \neq d_1$, by secure computation using the concealed operation result $[e_i]$ and the concealed operation result $[v_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$]; and outputting the concealed match determination result $[z_i]$ to the request device via the network, wherein the request device is configured to receive $[z_i]$ transmitted from at least a predetermined number of the retrieval devices.

19. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, $i=1, \ldots, m$, $j=1, \ldots, N$, $n \leq N$, and $t(i) \leq N$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u]$ in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $w_j=b_1$, and $u_j=c_1$ is satisfied and $y_{i,j}=d_0$ is established when all of $e_{i,j}=a_0$, $w_j=b_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result $[w]$, and the concealed operation result $[u]$; and obtaining a concealed match determination result $[z_i]$ in which a match determination result $z_i$ is concealed from the retrieval device, the match determination result $z_i$ in which $z_i=g_1$ is established when $y_{i,1}=\ldots y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$]; and outputting the concealed match determination result $[z_i]$ to the request device via the network, wherein the request device is configured to receive $[z_i]$ transmitted from at least a predetermined number of the retrieval devices.

20. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), and N are positive integers, $i=1, \ldots, m$, $j=1, \ldots, N$, $n \leq N$, and $t(i) \leq N$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method comprises:

receiving an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word [k];

obtaining a concealed operation result [w] in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word [k];

obtaining a concealed operation result [u] in which an operation result $u=(u_1, \ldots, u_N)$ is concealed, the operation result u in which $u_j=c_1$ is established when $k_j$ is a null character and $u_j=c_0$ is established when $k_j$ is not a null character, $c_0$ and $c_1$ are elements of a set $\{c_0, c_1\}$, and $c_0 \neq c_1$, by secure computation using the concealed search word [k];

obtaining a concealed operation result $[\mu_i]$ in which an operation result $\mu_i=(\mu_{i,1}, \ldots, \mu_{i,N})$ is concealed, the operation result $\mu_i$ in which $\mu_{i,j}=\theta_0$ is established when $x_{i,j}$ is a null character and $\mu_{i,j}=\theta_1$ is established when $x_{i,j}$ is not a null character, $\theta_0$ and $\theta_1$ are elements of a set $\{\theta_0, \theta_1\}$, and $\theta_0 \neq \theta_1$, by secure computation using the concealed search target word $[x_i]$;

obtaining a concealed operation result $[v_i]$ in which an operation result $v_i=(v_{i,1}, \ldots, v_{i,N})$ is concealed, the operation result $v_i$ in which $v_{i,j}=\rho_1$ is established when both of $w_j=b_1$ and $\mu_{i,j}=\theta_1$ are satisfied and $v_{i,j}=\rho_0$ is established when at least one of $w_j=b_0$ and $\mu_{i,j}=\theta_0$ is satisfied, $\rho_0$ and $\rho_1$ are elements of a set $\{\rho_0, \rho_1\}$, and $\rho_0 \neq \rho_1$, by secure computation using the concealed operation result [w] and the concealed operation result $[\mu_i]$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least any one of $e_{i,j}=a_1$, $v_{i,j}=\rho_1$, and $u_j=c_1$ is satisfied and $y_{i,j}=d_0$ is established when all of $e_{i,j}=a_0$, $v_{i,j}=\rho_0$, and $u_j=c_0$ are satisfied, $d_0$ and $d_1$ are elements of a set $\{d_0, d_1\}$, and $d_0 \neq d_1$, by secure computation using the concealed operation result $[e_i]$, the concealed operation result [u], and the concealed operation result $[v_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,N}=d_1$ is satisfied and $z_i=g_0$ is established when $y_{i,1}=\ldots=y_{i,N}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein the request device is configured to receive $[z_i]$ transmitted from at least a predetermined number of the retrieval devices.

21. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs exact match search by secure computation in which m, n, t(i), N, and N(i) are positive integers, N>N(i), $i=1, \ldots, m$, $j=1, \ldots, N$, $j(i)=1, \ldots, N(i)$, $j''(i)=N(i)+1, \ldots, N$, $n \leq N$, and $t(i) \leq N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method comprises:

receiving an input of a concealed search word [k] from the request device via the network, such that the concealed search word [k] is a secret sharing value of a search word $k=(k_1, \ldots, k_n, \ldots, k_N)$ and each of the plurality of retrieval devices receives the different concealed search word [k] from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, $a_0$ and $a_1$ are elements of a set $\{a_0, a_1\}$, and $a_0 \neq a_1$, by secure computation using the concealed search target word $[x_i]$ and the concealed search word [k];

obtaining a concealed operation result [w] in which an operation result $w=(w_1, \ldots, w_{N(i)})$ is concealed, the operation result w in which $w_{j(i)}=b_1$ is established when $k_{j(i)}$ is the wildcard character and $w_{j(i)}=b_0$ is established when $k_{j(i)}$ is not the wildcard character, $b_0$ and $b_1$ are elements of a set $\{b_0, b_1\}$, and $b_0 \neq b_1$, by secure computation using the concealed search word [k];

obtaining a concealed operation result [u'] in which operation results $u'_{N(i)+1}, \ldots, u'_N$ are concealed, the operation results $u'_{N(i)+1}, \ldots, u'_N$ in which $u'_{j''(i)}=c_1$ is established when $k_{j''(i)}$ is a null character and $u'_{j''(i)}=c_0$ is established when $k_{j''(i)}$ is not a null character, $c_0$ and $c_1$ are elements of a set $\{c_0, c_1\}$, and $c_0 \neq c_1$, by secure computation using at least a part of the concealed search word [k];

obtaining a concealed operation result $[e'_i]$ in which an operation result $e'_i(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w_{j(i)}=b_1$ is satisfied and $e'_{i,j(i)}=d_0$ is established when both of $e_{i,j(i)}=a_0$ and $w_{j(i)}=b_0$ are satisfied, $d_0$ and $d_1$ are elements of a set $\{d_0, d_1\}$, and $d_0 \neq d_1$, by secure computation using the concealed operation result $[e_i]$ and the concealed operation result [w];

obtaining a concealed operation result $[y_i]$ in which an operation result $y_i=(y_{i,1}, \ldots, y_{i,N})=(e'_{i,1}, \ldots, e'_{i,N(i)}, u'_{N(i)+1}, \ldots, u'_N)$ is concealed, by secure computation using the concealed operation result $[u']$ and the concealed operation result $[e'_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N > N(i)$, and wherein the request device is configured to receive $[z_i]$ transmitted from at least a predetermined number of the retrieval devices.

22. A non-transitory computer-readable recording medium that stores a program for making a computer function of a retrieval method of a retrieval device that performs exact match search by secure computation in which m, n, t(i), N, and N(i) are positive integers, $N<N(i)$, $i=1, \ldots, m$, $j=1, \ldots, N$, $j(i)=1, \ldots, N(i)$, $n \leq N$, $t(i) \leq N(i)$, and $j''(i)=N+1 \ldots, N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ an each of the plurality of retrieval devices stores the different concealed search target word $[x_i]$, wherein the retrieval method comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result w in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[e'_i]$ in which an operation result $e'_i=(e'_{i,1}, \ldots, e'_{i,N})$ is concealed, the operation result $e'_i$ in which $e'_{i,j}=d_1$ is established when at least one of $e_{i,j}=a_1$ and $w_j=b_1$ is satisfied and $e'_{i,j}=d_0$ is established when both of $e_{i,j}=a_0$ and $w_j=b_0$ are satisfied, $d_0$ and $d_1$ are elements of a set $\{d_0, d_1\}$, and $d_0 \neq d_1$, by secure computation using the concealed operation result $[e_i]$ and the concealed operation result $[w]$;

obtaining a concealed operation result $[\mu'_i]$ in which an operation result $\mu'_i=(\mu'_{i,N+1}, \ldots, \mu'_{i,N(i)})$ is concealed, the operation result $\mu'_i$ in which $\mu'_{i,j''(i)}=d_1$ is established when $x_{i,j''(i)}$ is a null character and $\mu'_{i,j''(i)}=d_0$ is established when $x_{i,j''(i)}$ is not a null character, by secure computation using at least a part of the concealed search target word $[x_i]$;

obtaining a concealed operation result $[y_i]$ in which an operation result $y_i=(y_{i,1}, \ldots, y_{i,N(i)})=(e'_{i,1}, \ldots, e'_{i,N}, \mu'_{i,N+1}, \ldots, \mu'_{i,N(i)})$ is concealed, by secure computation using the concealed operation result $[e'_i]$ and the concealed operation result $[\mu'_i]$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N > N(i)$, and wherein the request device is configured to receive $[z_i]$ transmitted from at least a predetermined number of the retrieval devices.

23. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) am positive integers, $N \leq N(i)$, $i=1, \ldots, m$, $j=1, \ldots, N$, $j(i)=1, \ldots, N(i)$, $n \leq N$, and $t(i) \leq N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method, performed by processing circuitry of the retrieval device comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N})$ is concealed, the operation result $e_i$ in which $e_{i,j}=a_1$ is established when $x_{i,j}$ is $k_j$ and $e_{i,j}=a_0$ is established when $x_{i,j}$ is not $k_j$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_N)$ is concealed, the operation result $w$ in which $w_j=b_1$ is established when $k_j$ is the wildcard character and $w_j=b_0$ is established when $k_j$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u'']$ in which an operation result $u''=(u''_1, \ldots, u''_N)$ is concealed, the operation result $u''$ in which $u''_j=c_1$ is established when $k_j$ is a null character and $u''_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[w']$ in which an operation result $w'=(w'_1, \ldots, w'_N)$ is concealed, the operation result $w'$ in which $w'_j=b'_1$ is established when at least one of $u''_j=c_1$ and $w_j=b_1$ is satisfied and $w'_j=b'_0$ is established when both of $u''_j=c_0$ and $w_j=b_0$ are satisfied, $b'_0$ and $b'_1$ are elements of a set $\{b'_0, b'_1\}$, and $b'_0 \neq b'_1$, by secure computation using the concealed operation result $[w]$ and the concealed operation result $[u'']$;

obtaining a concealed operation result $[y_i]$ in which an operation result $y_i=(y_{i,1}, \ldots, y_{i,N})$ is concealed, the operation result $y_i$ in which $y_{i,j}=d_1$ is established when at least one of $e_{i,j}=a_1$ and $w'_j=b'_1$ is satisfied and $y_{i,j}=d_0$ is established when both of $e_{i,j}=a_0$ and $w'_j=b'_0$ are satisfied, $d_0$ and $d_1$ are elements of a set $\{d_0, d_1\}$, and $d_0 \neq d_1$, by secure computation using the concealed operation result $[e_i]$ and the concealed operation result $[w']$;

obtaining a concealed match determination result $[z_i]$ in which a match determination result $z_i$ is concealed from the retrieval device, the match determination result $z_i$ in which $z_i=g_1$ is established when $y_{i,1}=\ldots=y_{i,Nmax}=d_1$ is satisfied and $z_i=g_0$ is established when $y_{i,1}=\ldots=y_{i,Nmax}=d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max}=N(i)$ is established when $N \leq N(i)$, and $N_{max}=N$ is established when $N>N(i)$, and wherein the request device is configured to receive $[z_i]$ transmitted from at least a predetermined number of the retrieval devices.

24. A non-transitory computer-readable recording medium that stores a program for making a computer function of a retrieval method of a retrieval device among a plurality of retrieval devices of a system that further includes a request device, wherein the plurality of retrieval devices are configured to communicate with the request device over a network, wherein each of the plurality of retrieval devices performs prefix search by secure computation in which m, n, t(i), N, and N(i) are positive integers, $N>N(i)$, $i=1, \ldots, m$, $j=1, \ldots, N$, $j(i)=1, \ldots, N(i)$, $j''(i)=N(i)+1, \ldots, N$, $n \leq N$, and $t(i) \leq N(i)$, the retrieval device comprises a storage that stores a concealed database $[x_1], \ldots, [x_m]$ including a concealed search target word $[x_i]$ in which a search target word $x_i=(x_{i,1}, \ldots, x_{i,t(i)}, \ldots, x_{i,N})$ is concealed from each of the plurality of retrieval devices, the search target word $x_i$ including t(i) pieces of characters $x_{i,1}, \ldots, x_{i,t(i)}$, wherein the concealed search target word $[x_i]$ is a secret sharing value of the search target word $x_i$ and each of the plurality of retrieval devices stores the different concealed search target word $[x_i]$, wherein the retrieval method comprises:

receiving an input of a concealed search word $[k]$ from the request device via the network, such that the concealed search word $[k]$ is a secret sharing value of a search word $k=(k_1, \ldots, k_n, \ldots, k_N)$ and each of the plurality of retrieval devices receives the different concealed search word $[k]$ from the request device over the network, and in which the search word $k=(k_1, \ldots, k_n, \ldots, k_N)$ is concealed from each of the plurality of retrieval devices, the search word k including n pieces of characters $k_1, \ldots, k_n$ including a wildcard character;

obtaining a concealed operation result $[e_i]$ in which an operation result $e_i=(e_{i,1}, \ldots, e_{i,N(i)})$ is concealed, the operation result $e_i$ in which $e_{i,j(i)}=a_1$ is established when $x_{i,j(i)}$ is $k_{j(i)}$ and $e_{i,j(i)}=a_0$ is established when $x_{i,j(i)}$ is not $k_{j(i)}$, $a_0$ and $a_1$ are elements of a set $\{a_0, a_1\}$, and $a_0 \neq a_1$, by secure computation using the concealed search target word $[x_i]$ and the concealed search word $[k]$;

obtaining a concealed operation result $[w]$ in which an operation result $w=(w_1, \ldots, w_{N(i)})$ is concealed, the operation result $w$ in which $w_{j(i)}=b_1$ is established when $k_{j(i)}$ is the wildcard character and $w_{j(i)}=b_0$ is established when $k_{j(i)}$ is not the wildcard character, $b_0$ and $b_1$ are elements of a set $\{b_0, b_1\}$, and $b_0 \neq b_1$, by secure computation using the concealed search word $[k]$;

obtaining a concealed operation result $[u'']$ in which an operation result $u''=(u''_1, \ldots, u''_N)$ is concealed, the operation result $u''$ in which $u''_j=c_1$ is established when $k_j$ is a null character and $u''_j=c_0$ is established when $k_j$ is not a null character, $c_0$ and $c_1$ are elements of a set $\{c_0, c_1\}$, and $c_0 \neq c_1$, by secure computation using the concealed search word $[k]$;

obtaining a concealed operation result $[w']$ in which an operation result $w'=(w'_1, \ldots, w'_{N(i)})$ is concealed, the operation result $w'$ in which $w'_{j(i)}=b'_1$ is established when at least one of $u''_{j(i)}=c_1$ and $w_{j(i)}=b_1$ is satisfied and $w'_{j(i)}=b'_0$ is established when both of $u''_{j(i)}=c_0$ and $w_{j(i)}=b_0$ are satisfied, $b'_0$ and $b'_1$ are elements of a set $\{b'_0, b'_1\}$, and $b'_0 \neq b'_1$, by secure computation using at least a part of the concealed operation result $[w]$ and the concealed operation result $[u'']$;

obtaining a concealed operation result $[e'_i]$ in which an operation result $e'_i=(e'_{i,1}, \ldots, e'_{i,N(i)})$ is concealed, the operation result $e'_i$ in which $e'_{i,j(i)}=d_1$ is established when at least one of $e_{i,j(i)}=a_1$ and $w'_{j(i)}=b'_1$ is satisfied and $e'_{i,j(i)}=d_0$ is established when both of $e_{i,j(i)}=a_0$ and $w'_{j(i)}=b'_0$ are satisfied, $d_0$ and $d_1$ are elements of a set $\{d_0, d_1\}$, and $d_0 \neq d_1$, by secure computation using the concealed operation result $[e_i]$ and the concealed operation result $[w']$;

obtaining a concealed operation result $[y_i]$ in which an operation result $y_i=(y_{i,1}, \ldots, y_{i,N})=(e'_{i,1}, \ldots, e'_{i,N(i)}, u''_{N(i)+1}, \ldots, u''_N)$ is concealed, by secure computation using at least a part of the concealed operation result $[e'_i]$ and the concealed operation result $[u'']$;

obtaining a concealed match determination result $[z_i]$ in which a match determination result $z_i$ is concealed from the retrieval device, the match determination result $z_i$ in which $z_i = g_1$ is established when $y_{i,1} = \ldots y_{i,Nmax} = d_1$ is satisfied and $z_i = g_0$ is established when $y_{i,1} = \ldots = y_{i,Nmax} = d_1$ is not satisfied, $g_0$ and $g_1$ are elements of a set $\{g_0, g_1\}$, and $g_0 \neq g_1$, by secure computation using the concealed operation result $[y_i]$; and outputting the concealed match determination result $[z_i]$ to the request device via the network, wherein $N_{max} = N(i)$ is established when $N \leq N(i)$, and $N_{max} = N$ is established when $N > N(i)$, and wherein the request device is configured to receive $[z_i]$ transmitted from at least a predetermined number of the retrieval devices.

\* \* \* \* \*